US012430554B2

(12) United States Patent
Ozcan et al.

(10) Patent No.: US 12,430,554 B2
(45) Date of Patent: Sep. 30, 2025

(54) DEVICE AND METHOD FOR NEURAL-NETWORK BASED ON-CHIP SPECTROSCOPY USING A PLASMONIC ENCODER

(71) Applicant: THE REGENTS OF THE UNIVERSITY OF CALIFORNIA, Oakland, CA (US)

(72) Inventors: Aydogan Ozcan, Los Angeles, CA (US); Calvin Brown, Los Angeles, CA (US); Artem Goncharov, Los Angeles, CA (US); Zachary Ballard, Los Angeles, CA (US); Yair Rivenson, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 675 days.

(21) Appl. No.: 17/503,312

(22) Filed: Oct. 17, 2021

(65) Prior Publication Data
US 2022/0121940 A1  Apr. 21, 2022

Related U.S. Application Data

(60) Provisional application No. 63/094,257, filed on Oct. 20, 2020.

(51) Int. Cl.
  *G06N 3/08* (2023.01)
  *G01J 3/28* (2006.01)
  *G06T 7/174* (2017.01)
(52) U.S. Cl.
  CPC .............. *G06N 3/08* (2013.01); *G01J 3/2803* (2013.01); *G01J 3/2823* (2013.01); *G06T 7/174* (2017.01);
(Continued)

(58) Field of Classification Search
  CPC . G06N 3/08; G06T 7/174; G06T 2207/10144; G06T 2207/20081;
(Continued)

(56) References Cited

U.S. PATENT DOCUMENTS 10,838,192 B2   11/2020  Ozcan
2002/0018203 A1*  2/2002  Battle .................. G01J 3/0218
                                                        356/319
(Continued)

FOREIGN PATENT DOCUMENTS

CA          3102297 A1    12/2019
EP          3867637 A1     8/2021
(Continued)

OTHER PUBLICATIONS

Zachary Ballard, Computational Sesing Using Low-Cost and Mobile Plasmonic Readers Designed by Machine Learning, ACS Nano 2017, 11, 2266-2274 (Year: 2017).*
(Continued)

*Primary Examiner* — Lisa M Caputo
*Assistant Examiner* — Sharah Zaab
(74) *Attorney, Agent, or Firm* — VISTA IP LAW GROUP LLP

(57) ABSTRACT

A deep learning-based spectral analysis device and method are disclosed that employs a spectral encoder chip containing a plurality of nanohole array tiles, each with a unique geometry and, thus, a unique optical transmission spectrum. Illumination impinges upon the encoder chip and a CMOS image sensor captures the transmitted light, without any lenses, gratings, or other optical components. A spectral reconstruction neural network uses the transmitted intensities from the image to faithfully reconstruct the input spectrum. In one embodiment that used a spectral encoder chip with 252 nanohole array tiles, the network was trained
(Continued)

on 50,352 spectra randomly generated by a supercontinuum laser and blindly tested on 14,648 unseen spectra. The system identified 96.86% of spectral peaks, with a peak localization error of 0.19 nm, peak height error of 7.60%, and peak bandwidth error of 0.18 nm.

20 Claims, 40 Drawing Sheets

(52) U.S. Cl.
CPC .............. *G06T 2207/10144* (2013.01); *G06T 2207/20081* (2013.01); *G06T 2207/20084* (2013.01); *G06T 2207/20208* (2013.01)

(58) Field of Classification Search
CPC ... G06T 2207/20084; G06T 2207/2028; G01J 3/2803; G01J 3/2823
See application file for complete search history.

(56) References Cited

U.S. PATENT DOCUMENTS

| | | | |
|---|---|---|---|
| 2012/0105681 A1* | 5/2012 | Morales | G06T 5/90 382/167 |
| 2013/0193544 A1* | 8/2013 | Ozcan | H01L 27/14625 257/432 |
| 2016/0138975 A1* | 5/2016 | Ando | G01J 3/28 356/416 |
| 2017/0003168 A1* | 1/2017 | Fujii | G01J 3/2803 |
| 2018/0178571 A1* | 6/2018 | Zhu | B41M 7/0081 |
| 2019/0130279 A1* | 5/2019 | Beggel | G06V 10/82 |
| 2019/0294108 A1 | 9/2019 | Ozcan | |
| 2019/0333199 A1 | 10/2019 | Ozcan et al. | |
| 2020/0340901 A1 | 10/2020 | Ozcan et al. | |
| 2021/0142170 A1 | 5/2021 | Ozcan et al. | |
| 2021/0264214 A1 | 8/2021 | Ozcan | |

FOREIGN PATENT DOCUMENTS

| | | |
|---|---|---|
| WO | WO 2019103909 A1 | 5/2019 |
| WO | WO 2020018154 A1 | 1/2020 |
| WO | WO 2020/082030 A1 | 4/2020 |
| WO | WO 2020082029 A1 | 4/2020 |
| WO | WO 2020102546 A1 | 5/2020 |
| WO | WO 2020139835 A1 | 7/2020 |
| WO | WO 2020219468 A1 | 10/2020 |
| WO | WO 2020242993 A1 | 12/2020 |
| WO | WO 2021003369 A1 | 1/2021 |
| WO | WO 2021133847 A1 | 7/2021 |
| WO | WO 2021154876 A1 | 8/2021 |

OTHER PUBLICATIONS

Zachary S. Ballard et al., Computational Sensing Using Low-Cost and Mobile Plasmonic Readers Designed by Machine Learning, ACS Nano (2017), 11, 2266-2274.
Kevin Degraux et al., Multispectral Compressive Imaging Strategies using Fabry-Perot Filtered Sensors, IEEE Transactions on Computation Imaging, 4; 661-673 (2018), arXiv:1802.02040v1 [cs.CV] Feb. 6, 2018.
G. E. Hinton et al., Improving neural networks by preventing co-adaptation of feature detectors, arXiv:1207.0580v1 [cs.NE] Jul. 3, 2012.
Woo-Yong Jang et al., Experimental Demonstration of Adaptive Infrared Multispectral Imaging using Plasmonic Filter Array, Scientific Reports, 6:34876, (2016), DOI: 10.1038/srep34876.
Asifullah Khan et al., A Survey of the Recent Architectures of Deep Convolutional Neural Networks, Published in Artificial Intelligence Review, (2020), DOI: https://doi.org/10.1007/s10462-020-09825-6.
Diederik P. Kingma et al., Adam: A Method for Stochastic Optimization, arXiv:1412.6980v9 [cs.LG] Jan. 30, 2017.
Alex Krizhevsky et al., ImageNet Classification with Deep Convolutional, Neural Networks in Advance in Neural Information Processing Systems 25 (eds. Pereira, F., Burges, C.J.C., Bottou, L. & Weinberger, K.Q.), 1097-1105 (Curran Associates, Inc., 2012, (9 pages).
Brandon Redding et al., Compact spectrometer based on a disordered photonic chip, Nature Photonics, vol. 7, Sep. 2013, 746-751, www.nature.com/naturephotonics.
Karen Simonyan et al., Very Deep Convolutional Networks for Large-Scale Image Recognition, arXiv:1409.1556v6 [cs.CV] Apr. 10, 2015.
Hongya Song et al., Review of compact computational spectral information acquisition systems, Front Inform Technol Electron Eng (2020), 21(8):1119-1133.
Zhu Wang et al., Spectral analysis based on compressive sensing in nanophotonic structures, Oct. 20, 2014, vol. 22, No. 21, DOI:10. 1364/OE.22.025608, Optics Express, 25608-25614.
Zhu Wang et al., Single-shot on-chip spectral sensors based on photonic crystal slabs, Nature Communications, (2019), 10:1020, https://doi.org/10.1038/s41467-019-08994-5, www.nature.com/naturecommunications.
Lipeng Xia et al., Deep Learning Assisted On-chip Fourier Transform Spectrometer, Proc. SPIE 11283, Integrated Optics: Devices, Materials, and Technologies XXIV, 1128305 (Feb. 25, 2020); doi:10. 1117/12.2546429.
Jie Bao et al., A colloidal quantum dot spectrometer, Nature, Jul. 2, 2015, vol. 523, 67-70.
Uttam Paudel, Ultra-high resolution and broadband chip-scale speckle enhanced Fourier-transform spectrometer, Advanced Photonics Congress (IPR, Networks, NOMA, PVLED( (2019), paper IW2A.4 IW2A.4 (Optical Society of America, 2019).

* cited by examiner

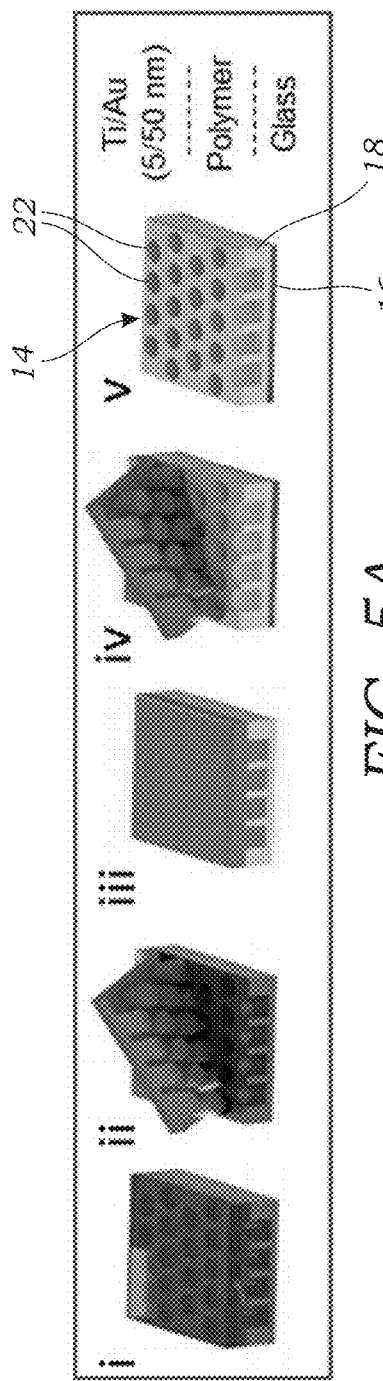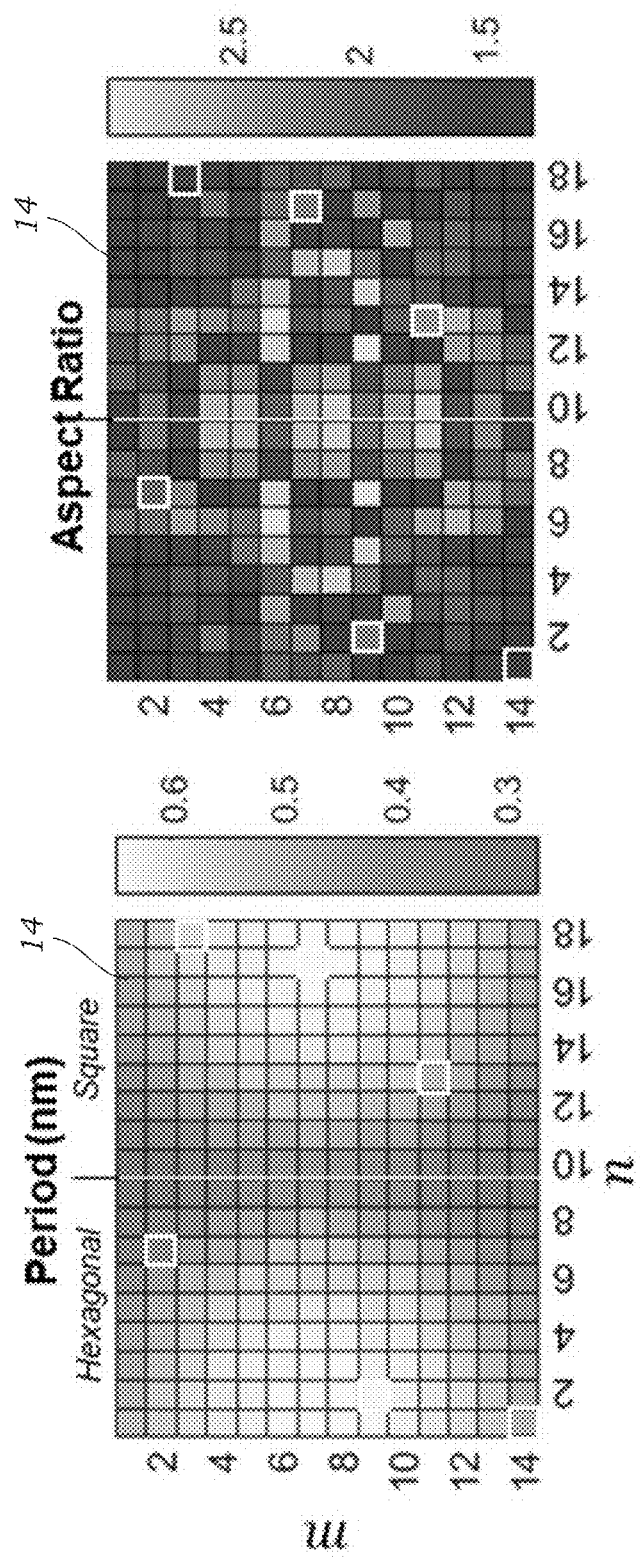
FIG. 5A
FIG. 5B
FIG. 5C

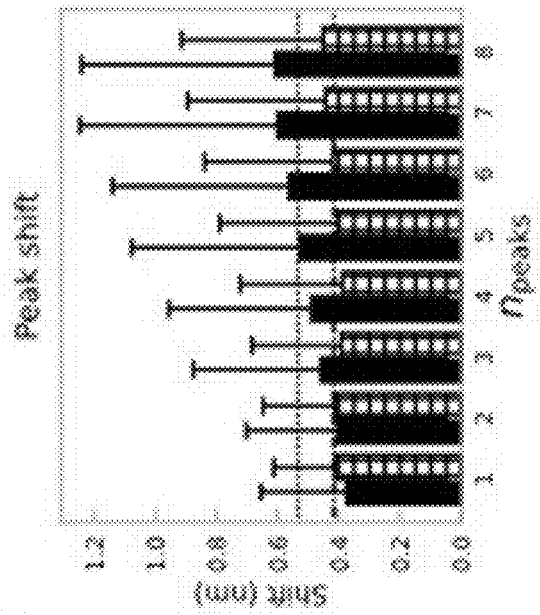
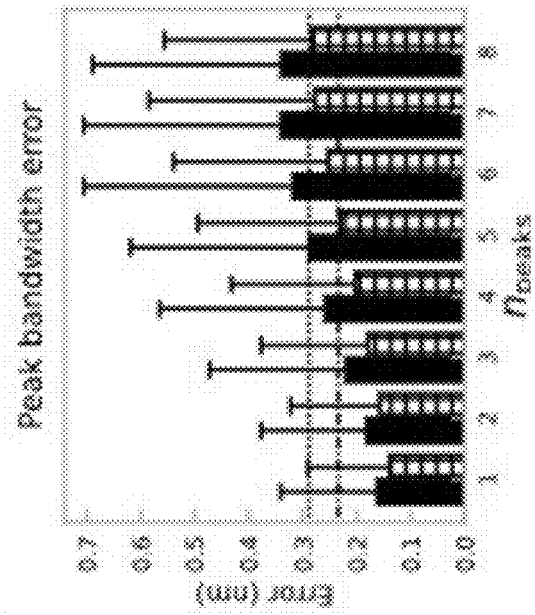
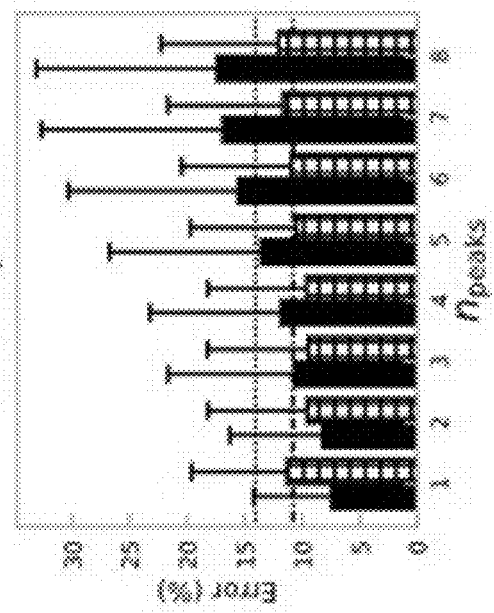
FIG. 8A
FIG. 8B
FIG. 8C
FIG. 8D

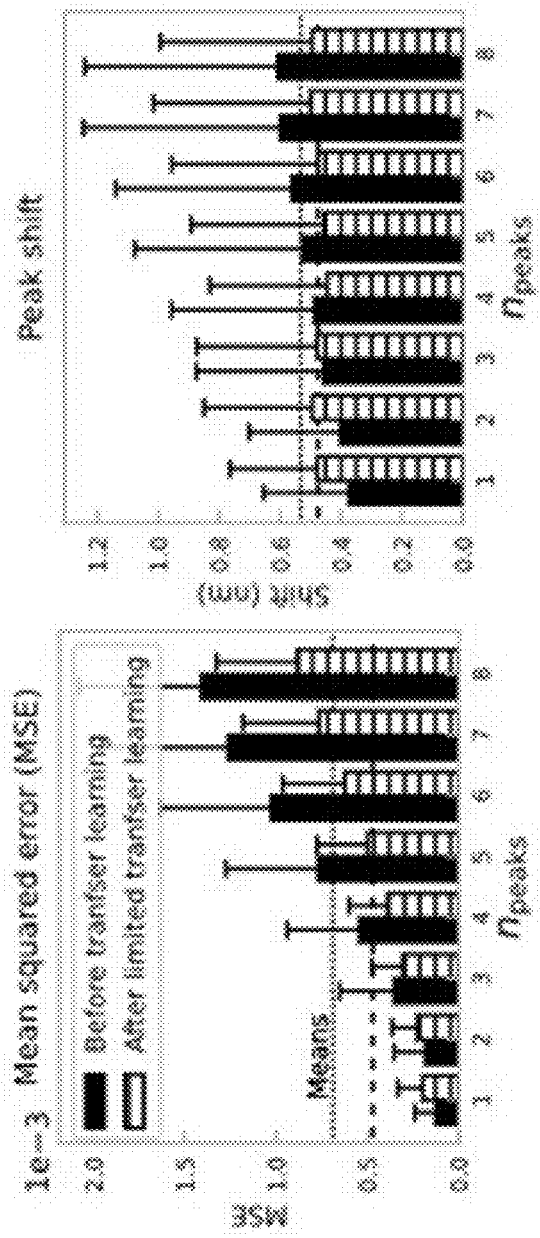
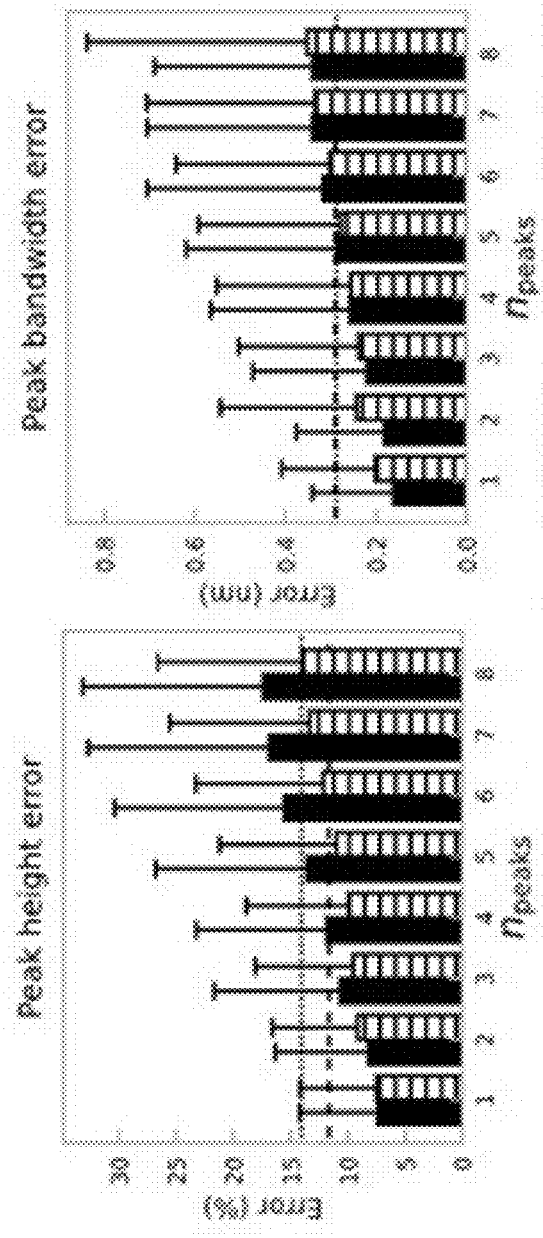
FIG. 19A  FIG. 19B  FIG. 19C  FIG. 19D

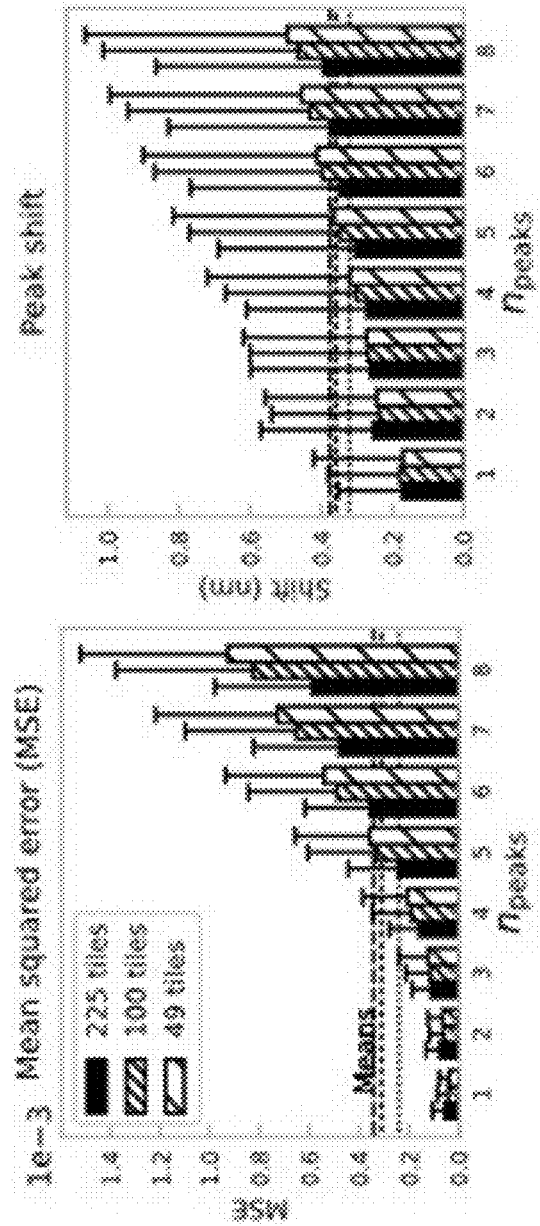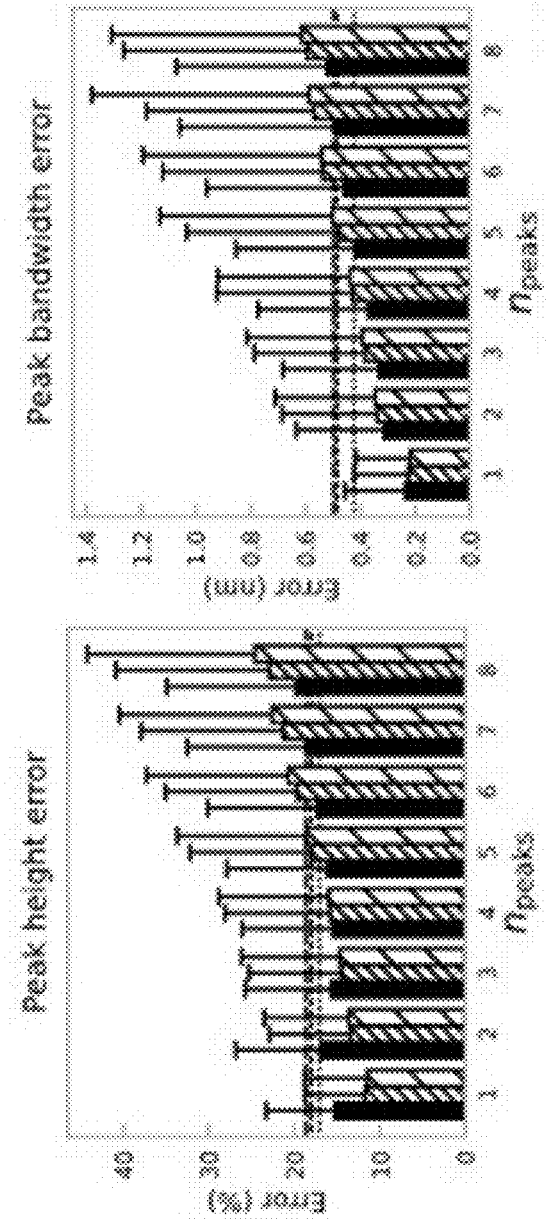
FIG. 20A  FIG. 20B  FIG. 20C  FIG. 20D

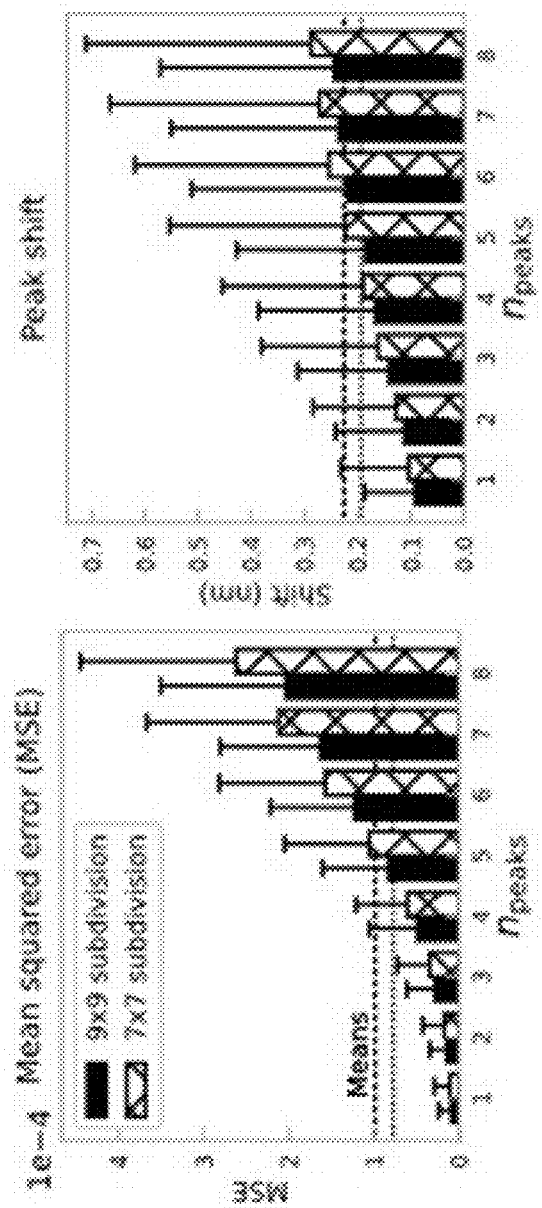
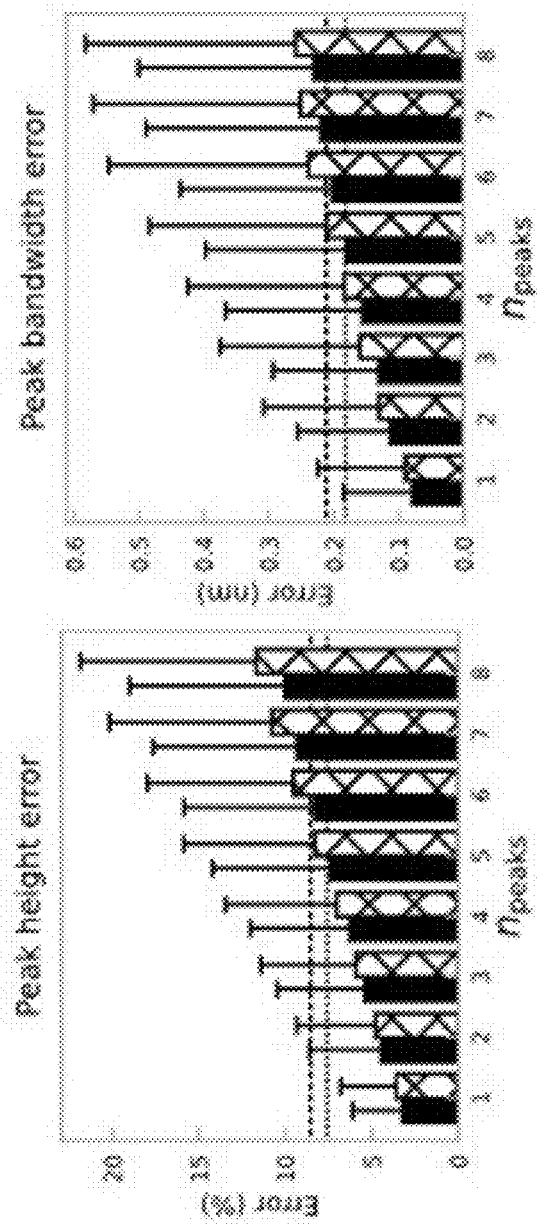
FIG. 21A  FIG. 21B  FIG. 21C  FIG. 21D

DEVICE AND METHOD FOR NEURAL-NETWORK BASED ON-CHIP SPECTROSCOPY USING A PLASMONIC ENCODER

RELATED APPLICATION

This Application claims priority to U.S. Provisional Patent Application No. 63/094,257 filed on Oct. 20, 2020, which is hereby incorporated by reference. Priority is claimed pursuant to 35 U.S.C. § 119 and any other applicable statute.

TECHNICAL FIELD

The technical field relates to a spectral construction device and method that uses an image sensor and plasmonic encoder chip that is located in an optical path with the image sensor. The plasmonic encoder chip contains an array of plasmonic feature-containing tiles having unique geometries and thus unique optical transmission spectra. A trained neural network that is executed in a computing device uses the transmitted intensities captured by the image sensor to faithfully reconstruct the input spectrum which can be used to create a spectrometer.

BACKGROUND

Spectral analysis is used in a wide array of applications in the fields of chemistry, physics, and biomedical sensing, among others. Optical spectra are conventionally recorded with spectrometers that separate light into its spectral components via a diffraction grating. The intensity of each component is recorded by a photodetector array, e.g., a complementary metal-oxide-semiconductor (CMOS) imager, to translate these intensities into the optical spectrum of the illumination beam (covering e.g., 400-750 nm). The Czerny-Turner configuration, for example, is one of the most commonly used methods for optical spectroscopy, employing two collimating mirrors to fold the optical path while partially compensating for optical aberrations. Though elegant and robust, grating-based designs present two key performance trade-offs. Firstly, increasing the spectral resolution generally comes at the cost of decreasing the signal-to-noise ratio (SNR). For example, narrowing the entrance slit width, decreasing the period of the grating, or decreasing the pixel size of the sensor all improve spectral resolution at the expense of signal strength. These methods also necessitate more expensive components and more precise instrument alignment. Such trade-offs can be prohibitive for low-light, low-cost, or field-based applications that still demand high spectral resolution. Secondly, increasing the spectral resolution may require a longer optical path between the grating and the photosensor array. This is typically achieved with physically larger instruments (benchtop-sized), which are less suitable for mobile spectroscopy applications. In addition, a longer path length can degrade performance due to even minor ambient temperature fluctuations. Therefore, traditional spectrometer designs present a compromise among resolution, cost, size and SNR.

Computational sensing schemes have been proposed as a promising alternative to conventional grating-based spectrometers, presenting a variety of hardware and software solutions. Instead of relying on diffraction gratings, some of these earlier systems work by encoding the incident spectra over a set of diverse filter functions. The encoded information is then interpreted by a spectral reconstruction algorithm that employs precise a priori knowledge of the filter functions or leverages some calibration data to map the encoding operation to the target spectral measurement. Benefiting from the computational sensing paradigm, these emerging designs do not share the same size, throughput, and resolution trade-offs inherent to grating-based spectrometers. The quality of the spectral reconstruction is not explicitly linked to the optical path length or the spectral resolution of the detection scheme since the encoding operation does not divide the incident light into its narrowband spectral components, instead samples the input spectra with filters that can exhibit broadband transmission. Performance of these computational schemes for spectroscopy therefore depends on the robustness and spectral diversity of the encoding operation as well as on the accuracy and speed of the employed algorithm to solve the underdetermined reconstruction problem.

A number of different hardware approaches have been proposed for the spectral encoding operation including variable filters in the form of liquid crystals and Fabry-Perot cavities as well as fixed filter configurations like ring resonators, Mach-Zehnder Interferometers (MZIs), photonic crystals and plasmonic filters. Each encoding element, which may range from a narrowband spectral filter to a broadband filter function with multiple local extrema, samples the input spectrum $I(\lambda)$ using the filter functions of the spectral encoder. Reconstruction algorithms are therefore tasked to recover the incident spectrum from the raw data sampled by each encoder. The most common approach to algorithmic reconstruction is to use a priori information of the encoding operation and spectral sensitivity of the photodetectors to define a transformation, $T_i(\lambda)$, between the target spectrum, $I(\lambda)$, and raw measurements, $S_i$, i.e., $S_i = T_i(\lambda)I(\lambda)$ for each $i^{th}$ encoding operation. By expressing this transformation operation over all the encoding elements, a least-squares problem can be defined, and a solution for $I(\lambda)$ can be obtained by minimizing e.g., $\|S - TI\|_2^2$. Regularization terms based on the L1 norm (least absolute shrinkage operator, LASSO) and the L2 norm (Tikhonov regularization), among others, are also commonly used to solve this minimization problem, necessitating iterative reconstruction algorithms that overcome the limitations of the standard least-square solution to this underdetermined problem. However, given this body of work, a data-driven non-iterative spectral reconstruction approach, without the need for a priori knowledge of the specific filter functions, has yet to be demonstrated.

SUMMARY

In one embodiment, a deep learning-based on-chip spectrometer is disclosed that utilizes a flat spectral encoding chip (fabricated through a scalable and low-cost imprint lithography process) to filter the incident radiation/light using an array of 252 nanostructured plasmonic tiles, where each tile has a specific transmission spectrum. The transmitted light through all these tiles is acquired in parallel using a conventional CMOS image sensor that is axially positioned at ~3 mm away from the plasmonic encoder, recording the free-space diffraction patterns of the plasmonic encoder without any lenses or optical components, using a compact and field-portable design. A trained neural network is used to reconstruct the unknown input spectra from the lensfree diffraction images in a feed-forward (i.e., non-iterative) manner without the need for a priori information on the encoding operation or the input illumination. By leveraging batch computation, the trained neural network generates spectral reconstructions in ~28 µs per spectrum, which is orders-of-magnitude faster than other computational spectroscopy methods. When blindly tested on 14,648 unseen/new input spectra of varying complexity captured after the training phase, the deep learning-based on-chip spectrometer correctly identified 96.86% of the spectral peaks with a peak localization error of 0.19 nm, a peak height error of 7.60%, and a peak bandwidth error of 0.18 nm. These performance metrics demonstrate significant improvements compared to earlier generations of computational spectrometers and were achieved despite visible fabrication defects in the plasmonic encoder chip, illustrating the robustness of the neural network-based spectral reconstruction method. Taken together, the on-chip plasmonic spectroscopy design is highly cost-effective, compact, field-portable and requires no mechanical scanning components. The methods and the device design that are at the heart of this computational on-chip spectrometer can find applications in various fields that demand compact and sensitive high-resolution spectroscopy tools.

In one embodiment, a spectral analysis device for reconstructing the spectrum of incident radiation using a trained neural network includes: an image sensor; an encoder chip disposed in an optical path with the image sensor and interposed in a path of the incident radiation, the encoder chip having a plurality of tiles formed thereon from a plasmonic material, the plurality of tiles each having a plurality of plasmonic features formed therein in differing geometries among different tiles; and a computing device operatively connected to the image sensor and configured to receive image(s) of incident radiation transmitted through or reflected from the plurality of tiles, wherein the computing device executes a trained neural network to output a reconstructed spectrum of the incident radiation based on light intensities captured in one or more images obtained by the image sensor from the plurality of tiles.

In another embodiment, a method of reconstructing the spectrum of incident radiation using a trained neural network includes: providing an image sensor and an encoder chip disposed in an optical path with the image sensor and interposed in a path of the incident radiation, the encoder chip having a plurality of tiles formed thereon from a plasmonic material, the plurality of tiles each having a plurality of plasmonic features formed therein in differing geometries among different tiles; capturing one or more images of radiation transmitted through or reflected from the plurality of tiles; segmenting the one or more images with image processing software into sub-arrays for the plurality of tiles; inputting light intensity values of the sub-arrays or pixels of the plurality of tiles to a trained neural network executed by at least one computing device that output(s) a reconstructed spectrum of the incident radiation.

In some embodiments, the computing device may also or alternatively output detection results. This may include a signal or output that reflects or identifies the presence of one or more detected chemical species or substances in a sample that interacted with the incident radiation.

BRIEF DESCRIPTION OF THE DRAWINGS

FIG. 1A also illustrates an optional sample being used as part of a spectrometer. This embodiment illustrates transmission mode.

FIG. 5A illustrates a soft lithography process for molding low-cost replica of plasmonic features (e.g., nano structures) from a silicon master. Steps i-ii show the initial molding process with the silicon master and the initial UV curable polymer. Steps iii-iv show the secondary molding process followed by the metal deposition in v.

FIG. 5B illustrates a heatmap of the period of the nanohole array for each tile in the encoder.

FIG. 5C illustrates heatmap of the aspect ratio of the nanohole array for each tile in the encoder.

FIG. 6A: Average MSE; FIG. 6B: peak shift/localization error; FIG. 6C: peak height error; and FIG. 6D: peak bandwidth error for spectra containing 1-8 peaks. Average over all spectra shown as horizontal line in each plot. Reconstructions for low complexity (1 peak) spectra in the FIG. 6E $10^{th}$, FIG. 6F $50^{th}$, and FIG. 6G $90^{th}$ percentile of MSE. Reconstructions for high complexity (4-8 peaks) spectra in the $10^{th}$ (FIG. 6H), $50^{th}$ (FIG. 6I), and $90^{th}$ (FIG. 6J) percentile of MSE. $10^{th}$, $50^{th}$, and $90^{th}$ percentiles correspond to best 10%, median, and worst 10% fits, respectively. Error is shown above each plot on the same y-scale.

FIG. 7A: average MSE; FIG. 7B: peak shift/localization error; FIG. 7C: peak height error; and FIG. 7D: peak bandwidth error for spectra over the course of blind testing data capture. 14,648 blind testing spectra are represented in the plots, capture over ~15 h.

FIGS. 8A-8H: Performance on blind testing spectra captured 5.8 days after training. FIG. 8A: average MSE; FIG. 8B: peak shift/localization error; FIG. 8C: peak height error; and FIG. 8D: peak bandwidth error for spectra containing 1-8 peaks. Average over all spectra shown as horizontal line in each plot. Transfer learning improves all metrics, but shows most improvement for highest number of peaks, and least improvement (or slight degradation) for lowest number of peaks. Reconstruction for low complexity (1 peak) spectrum in the $50^{th}$ (FIG. 8E) percentile of MSE. Reconstructions for high complexity (4-8 peaks) spectra in the $10^{th}$ (FIG. 8F), $50^{th}$ (FIG. 8G), and $90^{th}$ (FIG. 8H) percentile of MSE. Error is shown above each plot on the same y-scale.

FIGS. 18A-18D Reconstructions of four (4) different broadband spectra. Broadband spectra were generated by aligning eight (8) channels of supercontinuum laser to adjacent wavelengths.

FIGS. 19A-19H: Performance on blind testing spectra captured 5.8 days after training with limited transfer learning. FIG. 19A: average MSE; FIG. 19B: peak shift/localization error; FIG. 19C: peak height error; and FIG. 19D: peak bandwidth error for spectra containing 1-8 peaks. Transfer learning on just 100 spectra (~0.2% of initial training spectra, requiring just ~6 min to capture) improves MSE, peak localization error, and peak height error, and suppresses noise/spurious peaks. Reconstruction for low complexity (1 peak) spectrum in the $50^{th}$ percentile of MSE (FIG. 19E). Reconstructions for high complexity (4-8 peaks) spectra in the $10^{th}$ (FIG. 19F), $50^{th}$ (FIG. 19G), and $90^{th}$ (FIG. 19H) percentile of MSE. Error is shown above each plot on the same y-scale.

FIGS. 20A-20H: Comparison between models using different numbers of plasmonic tiles. FIG. 20A: average MSE; FIG. 20B: peak shift/localization error; FIG. 20C: peak height error; and FIG. 20D: peak bandwidth error for spectra containing 1-8 peaks. Average over all spectra shown as horizontal line in each plot. Using more tiles improves performance, but even using a fraction of the tiles allows reconstruction of most peaks. It must be noted that the networks shown here were of simplified architecture to speed training of many models. Reconstruction for low complexity (1 peak) spectrum in the $50^{th}$ percentile of MSE (FIG. 20E). Reconstructions for high complexity (4-8 peaks) spectra in the $10^{th}$ (FIG. 20F); $50^{th}$ (FIG. 20G), and $90^{th}$ (FIG. 20H) percentile of MSE. Error is shown above each plot on the same y-scale.

FIGS. 21A-21H: Comparison of 9×9 and 7×7 tile subdivisions. FIG. 21A: average MSE; FIG. 21B: peak shift/localization error; FIG. 21C: peak height error; and FIG. 21D: peak bandwidth error for spectra containing 1-8 peaks. Average over all spectra shown as horizontal line in each plot. The 9×9 tile subdivision improves over the 7×7 for all metrics. Reconstruction for low complexity (1 peak) spectrum in the $50^{th}$ (FIG. 21E) percentile of MSE. Reconstructions for high complexity (4-8 peaks) spectra in the $10^{th}$ (FIG. 21F), $50^{th}$ (FIG. 21G), and $90^{th}$ (FIG. 21H) percentile of MSE. Error is shown above each plot on the same y-scale.

DETAILED DESCRIPTION OF ILLUSTRATED EMBODIMENTS

Figure 1A:
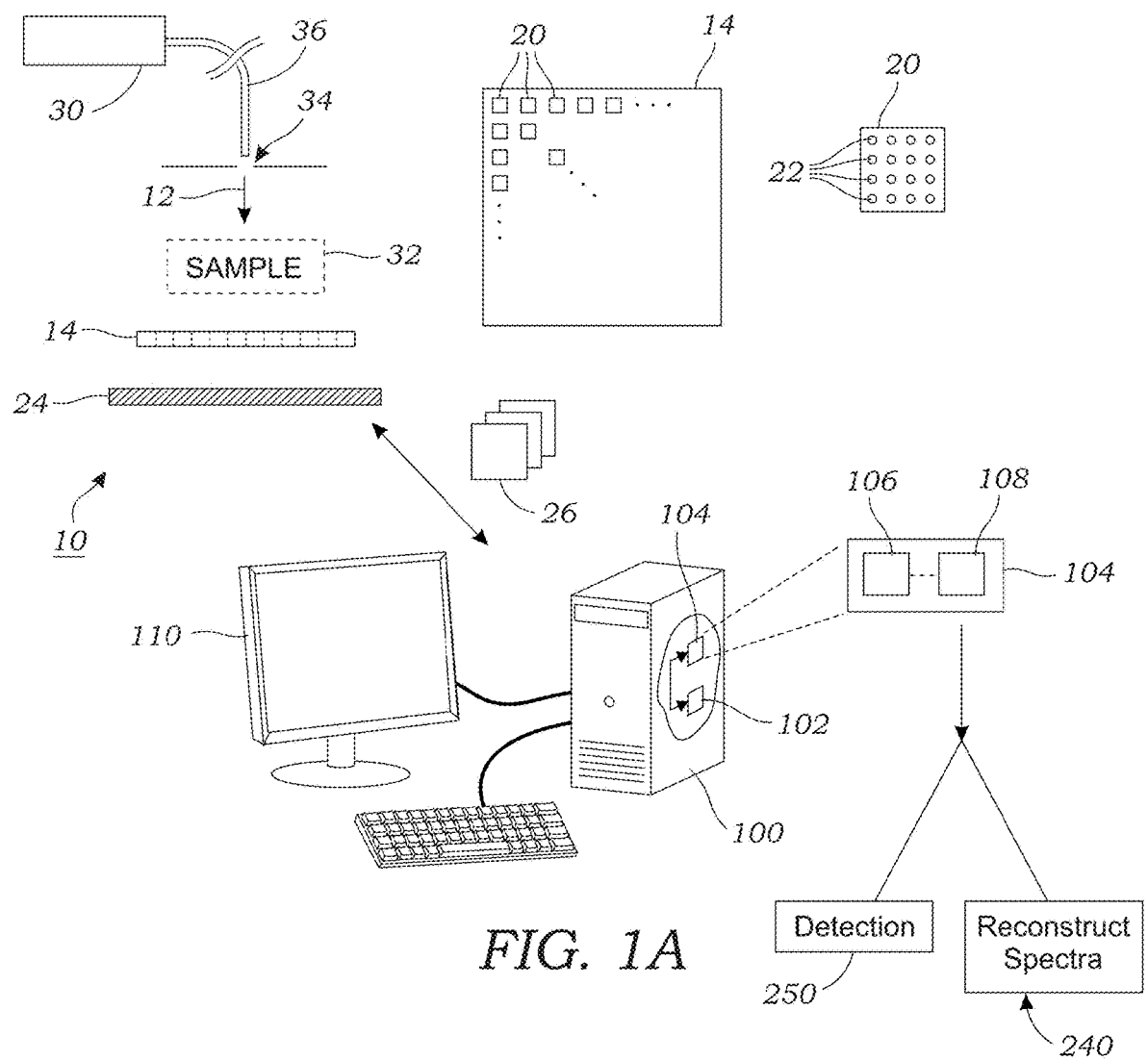
FIG. 1A illustrates a schematic illustrate of the spectral analysis device for reconstructing the spectrum of incident radiation using a trained neural network.
Figure 1B:
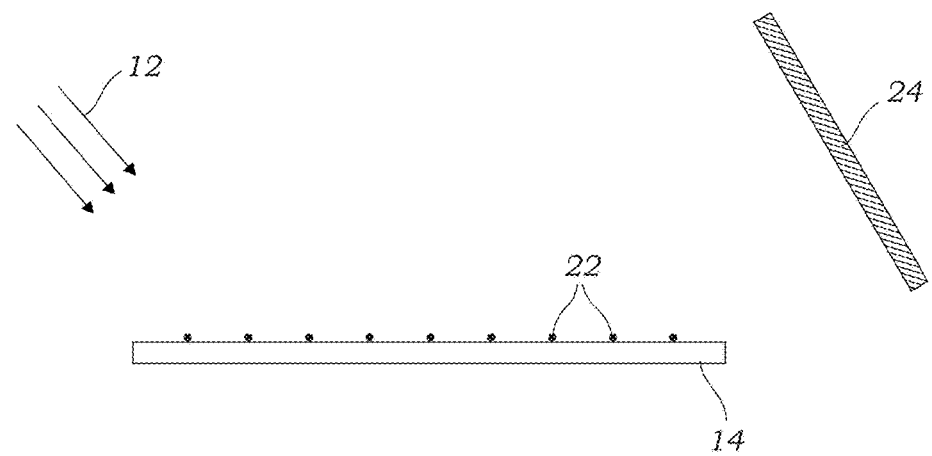
FIG. 1B illustrates a schematic illustrate of the spectral analysis device for reconstructing the spectrum of incident radiation using a trained neural network. This embodiment illustrates reflection mode.
Figure 5D:
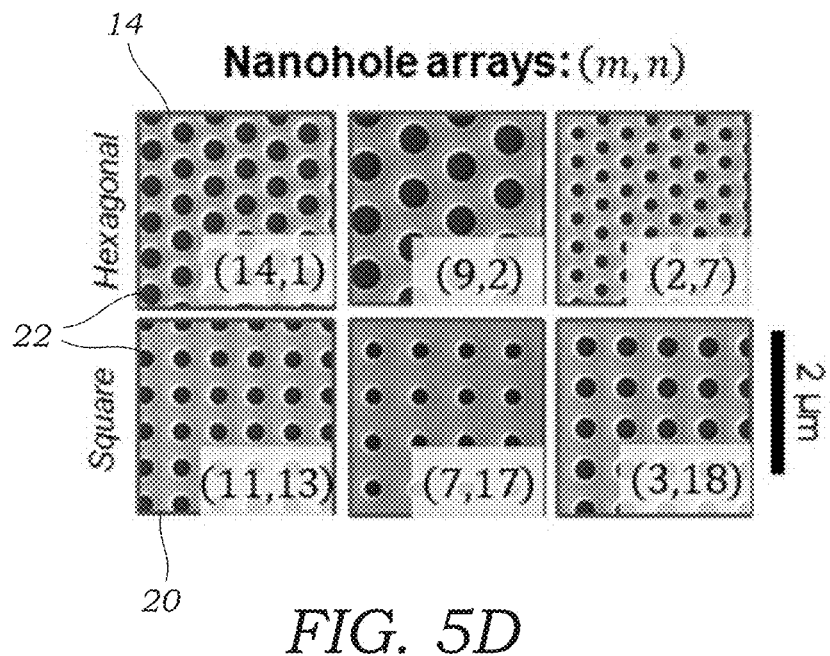
FIG. 5D illustrates SEM images of example plasmonic nanohole arrays, corresponding to the outlined white boxes in FIGS. 5B and 5C.
Figure 22:
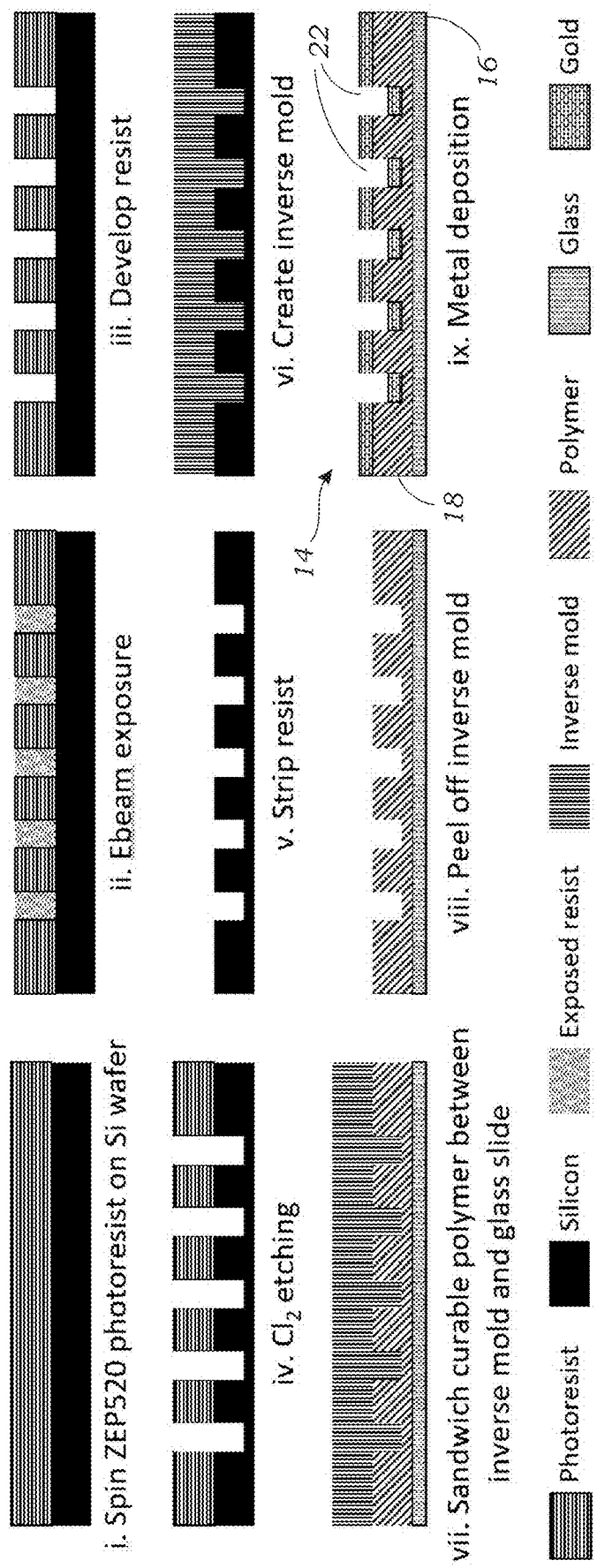
FIG. 22 illustrates the spectral encoder fabrication procedure. The order of operations or steps is shown (i-ix).

FIGS. 1A and 1B schematically illustrate of the spectral analysis device 10 for reconstructing the spectrum of incident radiation 12 (e.g., light) using a trained neural network 108. FIG. 1A illustrates the spectral analysis device 10 used in transmission mode. FIG. 1B illustrates the spectral analysis device 10 used in reflection mode. The incident radiation 12 is illustrated by the arrows and may include visible light or non-visible light. The incident radiation 12 travels along an optical path (which may be folded in some instances) and onto an encoder chip 14. The encoder chip 14 is a multilayer structure in one embodiment. However, the encoder chip 14 may also be formed in a substrate as monolithic structure. As described herein, the encoder chip 14 has a glass backing layer 16 and polymer intermediate layer 18 on which the plasmonic material is deposited (e.g., gold, silver, other metals or alloys of the same) (e.g., 50 nm) (FIGS. 5A and 22). A seed or adhesion layer of titanium (e.g., 5 nm) may be needed to deposit the gold, as described herein. The encoder chip 14 is populated by a plurality of tiles 20 over the surface thereof. Each tile 20 is a separate region located on the encoder chip 14 that contains an array of plasmonic features 22 therein or thereon (FIGS. 1A, 5D). The plasmonic features 22 may include holes, apertures, or wells (e.g., nanoholes), rods, pyramids, lines, particles, or any other known plasmonic structure.

A single tile 20 thus contains a plurality of plasmonic features 22 in a particular layout or array (FIG. 1A). For example, in the case of the plasmonic features 22 being nanoholes, the periodicity and/or diameter (or number of nanoholes) of the nanohole plasmonic feature 22 in different tiles 20 is different making each tile 20 unique. The plasmonic features 22 of different tiles 20 may have different dimensions and/or geometries at either the nano- or microscale. Within a single tile 20, the plasmonic features 22 are the same in one embodiment (e.g., same periodicity and/or diameter). Of course, it is also possible to have a plurality of identical tiles 20 in a single encoder chip 14. The total number of tiles 20 in the encoder chip 14 may vary. For example, depending on the use and resolution desired, there may be tens of such tiles 20 or hundreds of such tiles 20. In the illustrated embodiment described herein there were 252 tiles 20 that contained nanoholes as the plasmonic features 22.

Illustrative arrays of nanohole plasmonic feature 22 are illustrated in FIG. 5D. The spectral analysis device 10 also includes an image sensor 24 that is used to acquire images 26 of radiation/light that passes through the nanohole plasmonic features 22 of the tiles 20. The image sensor 24 may include a CCD or CMOS image sensor. It should be appreciated that the image sensor 24 may acquire radiation that is transmitted through the encoder chip 14 when the encoder chip 14 operates in transmission mode (FIG. 1A) or reflected from the encoder chip 14 when the encoder chip 14 operations in reflection mode (FIG. 1B).

Still referring to FIG. 1A, the spectral analysis device 10 includes a computing device 100. The computing device 100 has one or more processors 102 and software 104 that is executed by the one or more processors 102. The computing device 100 may include a laptop, PC, tablet PC, mobile phone, microcontroller(s), or one or more ASICs. The computing device 100 may exist locally with or as part of the spectral analysis device 10 or it may be remote from the spectral analysis device 10 (e.g., a remote server that is accessed over a wide area network such as the Internet). The computing device 100 may include a display 110 that is used to display, for example, reconstructed spectra, and when implemented as a spectrometer, detected species contained in the sample 32. The software 104, in one embodiment, includes image processing software 106 and a trained neural network 108. These may be separate modules or program that work together or they may be integrated into a single module or program. The trained neural network 108, as explained herein, images 26 obtained with the image sensor 24 are subject to image processing to extract average, mean pixel, or binned intensity values for each tile 20 and/or sub-arrays 21 within tiles 20 which are input to the trained neural network 108. A sub-array 21 (FIGS. 2 and 4D) is an array of pixels from single tile 20. The trained neural network 108 then outputs a reconstructed spectrum of the incident radiation 12 based on light intensities captured in one or more images 26 obtained by the image sensor 24 from the plurality of tiles 20.

Figure 2:
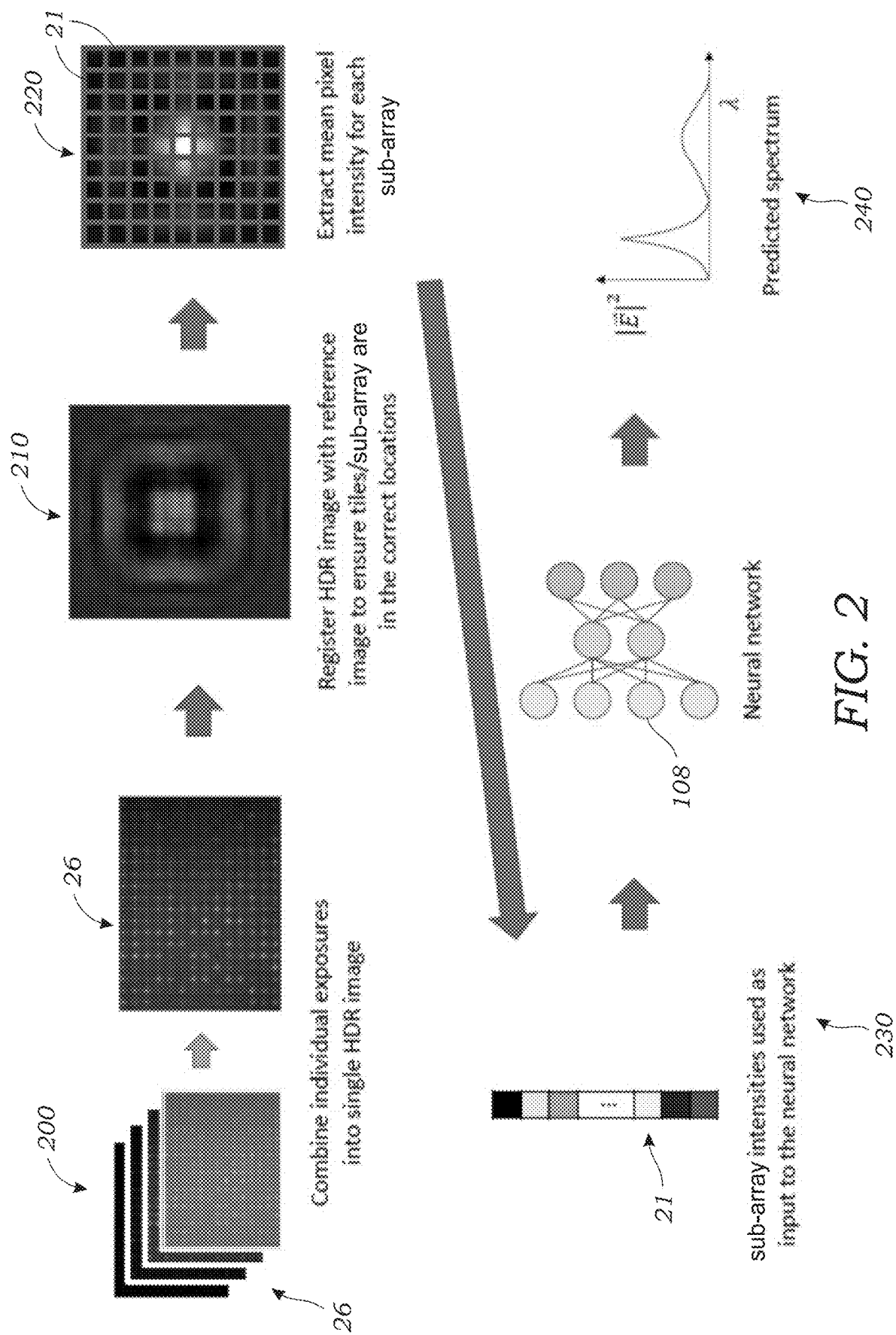
FIG. 2 illustrates an illustration of the operations performed by the spectral analysis device for reconstructing the spectrum of incident radiation according to one embodiment.
Figure 4C:
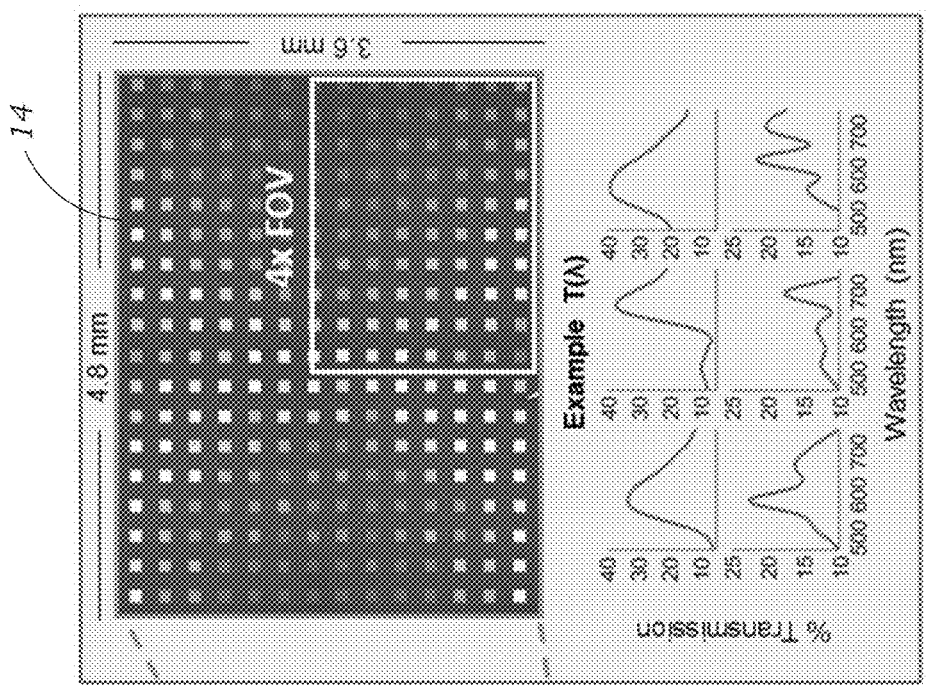
FIG. 4C illustrates a brightfield microscope image of the plasmonic encoder chip showing example transmission spectra $T(\lambda)$ below. The box represents the field of view (FOV) of a 4× microscope objective for comparison.
Figure 4B:
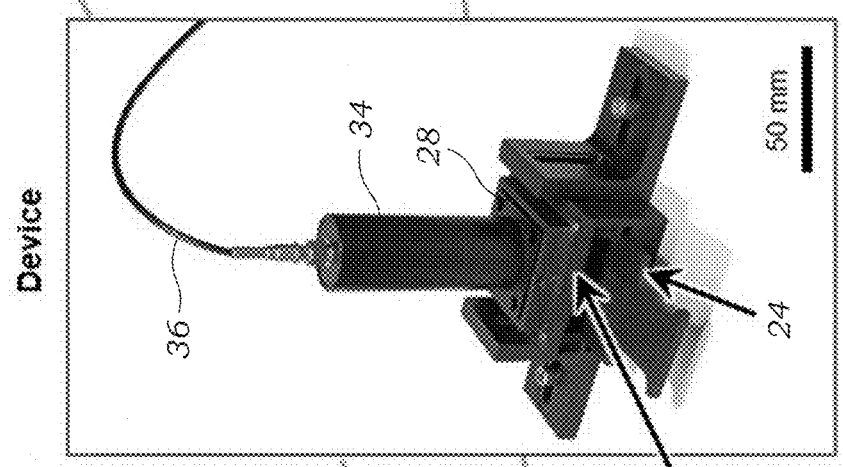
FIG. 4B illustrates a photographic image of the experimental optical setup used. Illustrated is the single mode fiber coupled to a housing that contains the encoder chip and image sensor.
Figure 4A:
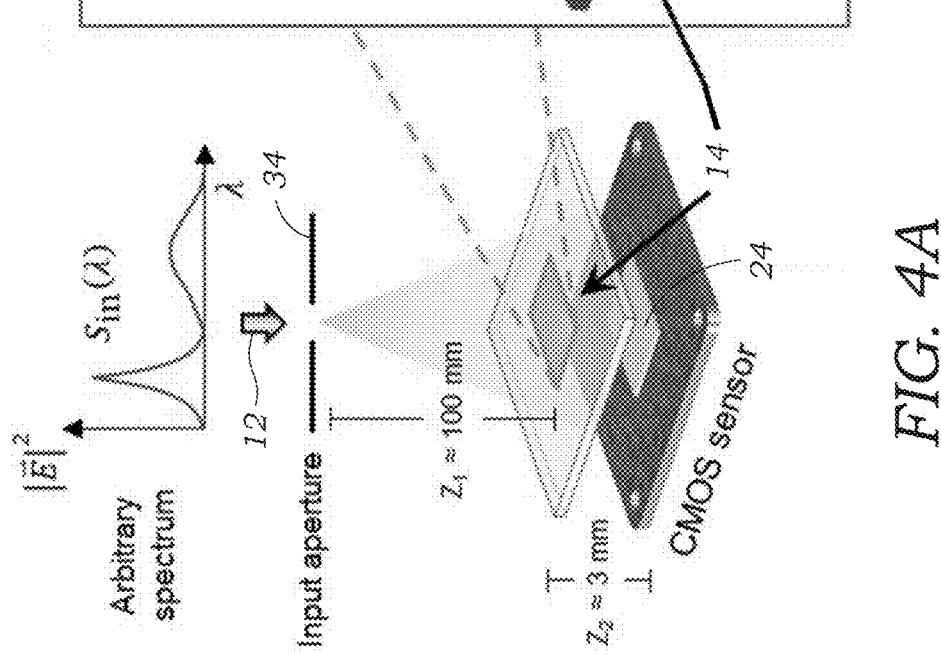
FIG. 4A illustrates a schematic of the optical setup used for the spectral analysis device. The plasmonic encoder is located between a CMOS image sensor and the input aperture. Distances illustrated in FIG. 4A are illustrative.
Figures 4D, 4E:
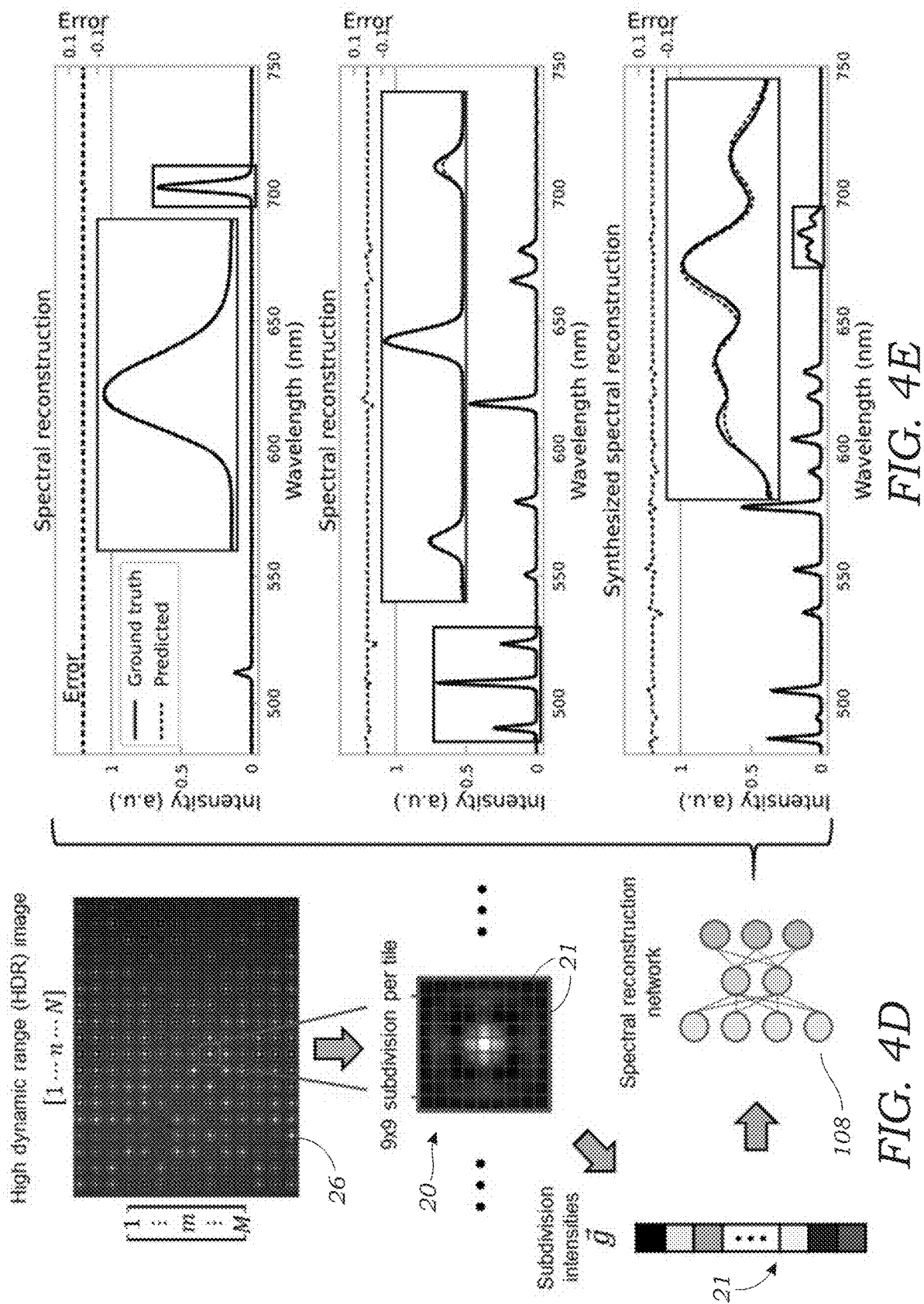
FIG. 4D illustrates the workflow of spectral reconstructions. Regions of the HDR image corresponding to each tile are used as inputs to the spectral reconstruction neural network.
FIG. 4E illustrates examples of spectra reconstructed during blind testing. Error is shown above each plot on the same y-scale. The network was trained only on spectra with up to 8 peaks, yet it successfully reconstructs a spectrum with fourteen (14) peaks.

FIGS. 2 and 4D illustrates an illustration of the operations performed by the spectral analysis device 10 for reconstructing the spectrum of incident radiation 12 according to one embodiment. First, as seen in operation 200, multiple images 26 with the encoder chip 14 are captured at ten (10) different exposures and are combined into a single high dynamic range (HDR) image 26 to ensure there are no over- or under-saturated pixels. This may be performed using the image processing software 106. The HDR image 26 is then registered to a reference image as seen in operation 210 to account for any slight drift or misalignment that may occur over time due to outside factors such as structural vibrations or other movement. After image registration, the intensities of each sub-array within each tile 20 (the image of each tile 20 is segmented and divided up into smaller regions or a sub-arrays 21) are extracted in operation 220 using the known geometry of the encoder chip 14. These sub-array intensities are used as the input to the trained spectral reconstruction neural network 108 as seen in operation 230. The trained neural network 108 outputs the predicted spectrum as seen in operation 240. Note, however, that in other embodiments, the predicted or reconstructed spectrum may be used to detect the presence of one or more species in a sample 32 (e.g., FIG. 1A). In this detector mode, illustrated as operation 250 in FIG. 1A, for example, the spectral analysis device 10 functions as a spectrometer by identifying or detecting the presence of one or more chemical species based on the reconstructed spectra.

Figure 3:
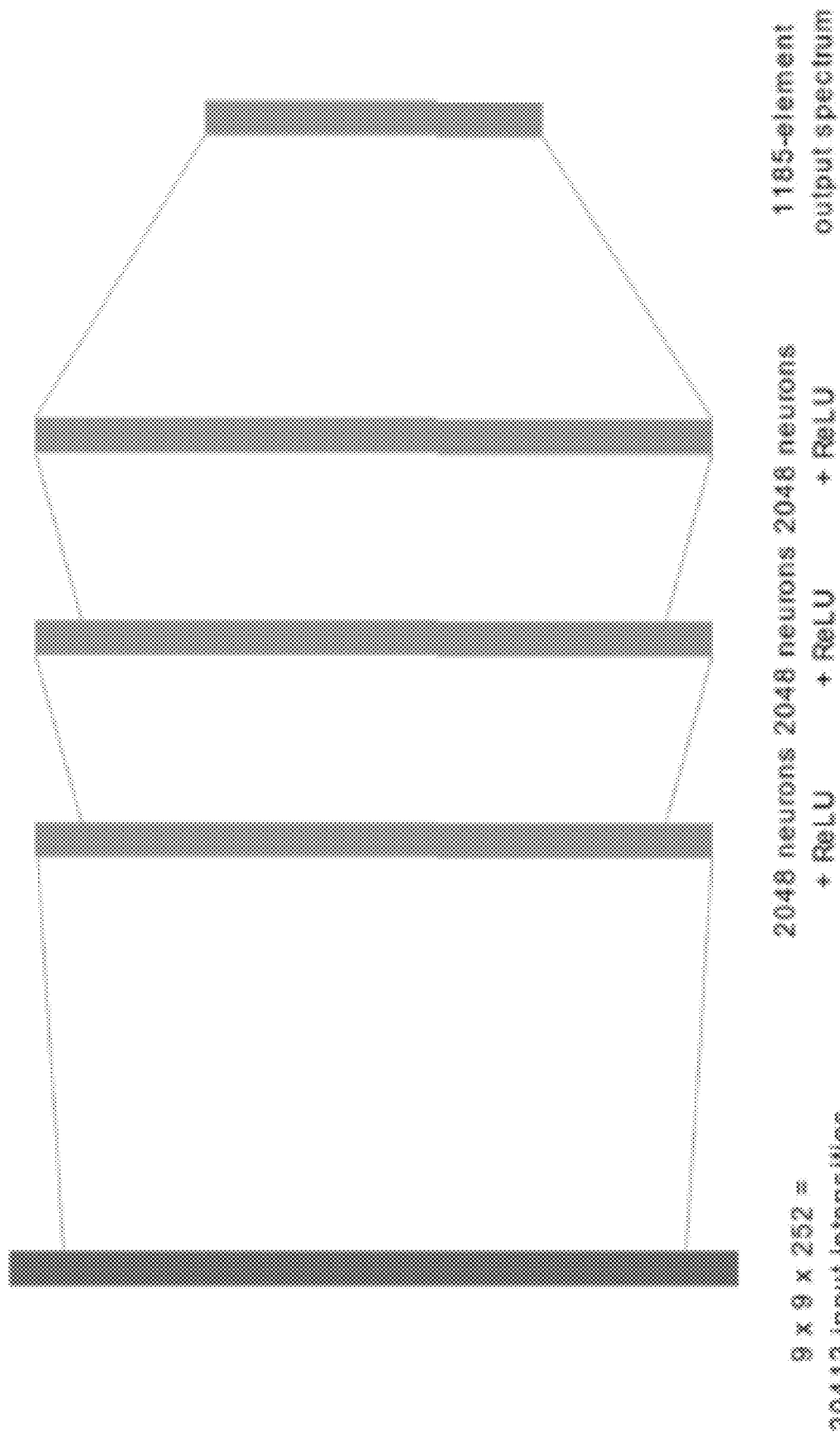
FIG. 3 illustrates an example of the trained neural network architecture that is used as part of the spectral analysis device.

FIG. 3 illustrates an example of the trained neural network 108 architecture that is used as part of the spectral analysis device 10. In this embodiment, the 20412 sub-array intensities are used as inputs to the trained neural network 108 (14×18=252 tiles with 9×9=81 sub-array intensity values each). The trained neural network 108 includes three (3) fully connected layers (aka dense layers) of 2048 neurons each with ReLU activation function, followed by an output layer with 1185 neurons (corresponding to the number of elements in the ground truth spectra).

In one embodiment, the spectral analysis device 10 need not necessarily reconstruct the spectrum of the incident radiation 12. For example, the spectral analysis device 10 may operate in a "detector" mode where the trained neural network 108 or software 104 that works along with the trained neural network 108 flags when particular wavelengths or combination of wavelengths (or bands) are detected which may indicate the presence of a particular chemical compound or species. For example, the spectral analysis device 10 may look for particular peak wavelength(s) that act as a "fingerprint" of sorts to identify a particular chemical compound or species. The spectral analysis device 10 may even look at intensity ratios among multiple different wavelength peaks or bands. The spectral analysis device 10 including the encoder chip 14 and image sensor 24 may be contained in a housing 28 as seen in FIG. 4B. The spectral analysis device 10 may be coupled to or configured to receive incident radiation 12 from a light source 30. The light source 30 may contain an unknown spectrum that needs to be reconstructed. Alternatively, the light source 30 may pass through a sample 32 (e.g., a liquid sample, a gas sample, a solid sample) which then passes through the encoder chip 14 with images 26 captured/obtained by the image sensor 24.

The computing device 100, in some embodiments, may also be integrated into the housing 28 or body of the spectral analysis device 10, making the spectral analysis device 10 small and portable. A light source 30 may also be integrated into the housing 28 (e.g., light-emitting diodes, laser diodes, lamp, and the like). In some embodiments, a sample 32 (gas, fluid, or solid) is located in the optical path so that transmitted or reflected incident radiation 12 that passes through or reflected of the sample 32 is directed onto the encoder chip 14. In this mode, the spectral analysis device 10 may be used as a detector to detect the presence of one or more chemical species or constituents.

Experimental

On-Chip Spectroscopy Framework and Experimental Setup

Figure 5E:
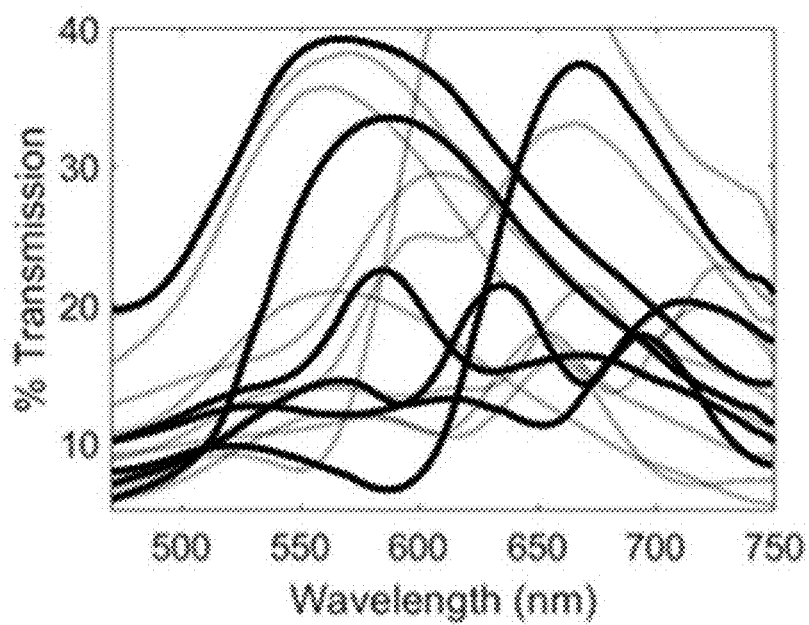
FIG. 5E illustrates example transmission spectra, where the darker lines correspond to the plasmonic tiles shown in the SEM images (FIG. 5D). Other example transmission spectra are shown as lighter lines.
Figure 6B:
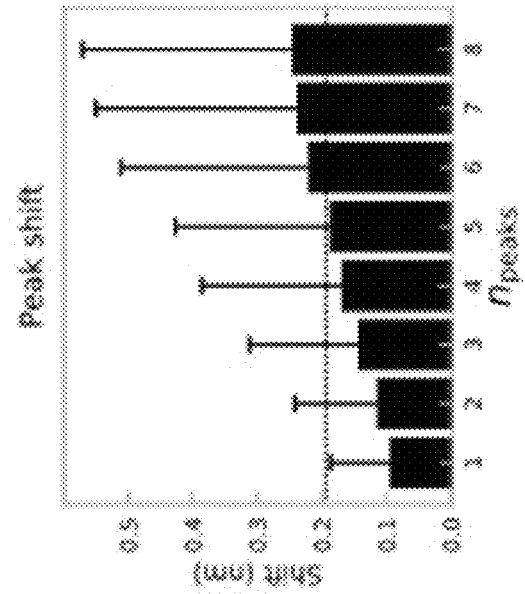
FIGS. 6A-6J illustrate the performance of the spectral analysis device on blind testing spectra.
Figure 6D:
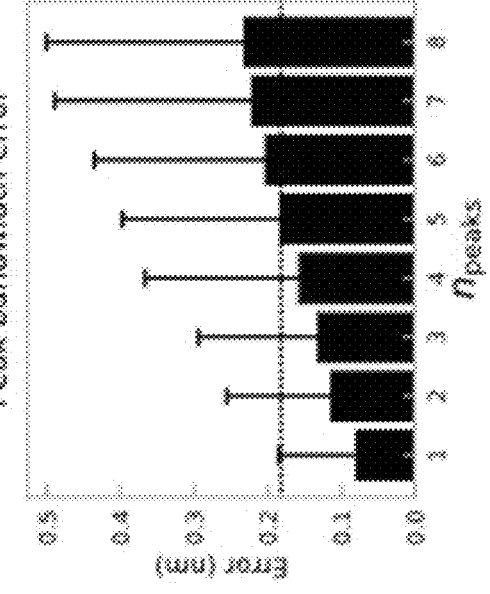
Figure 6A:
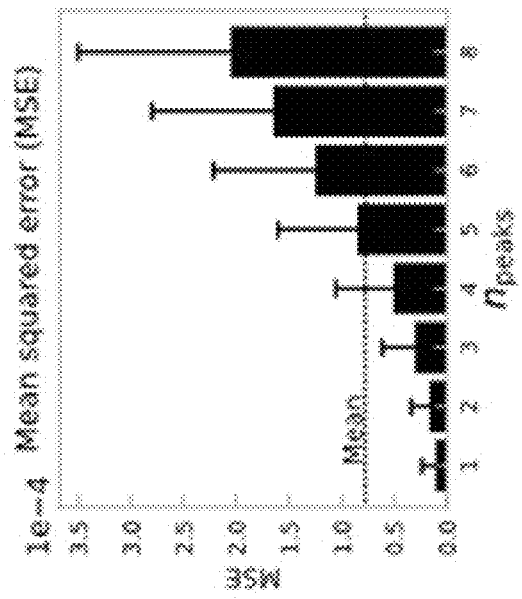
Figure 6C:
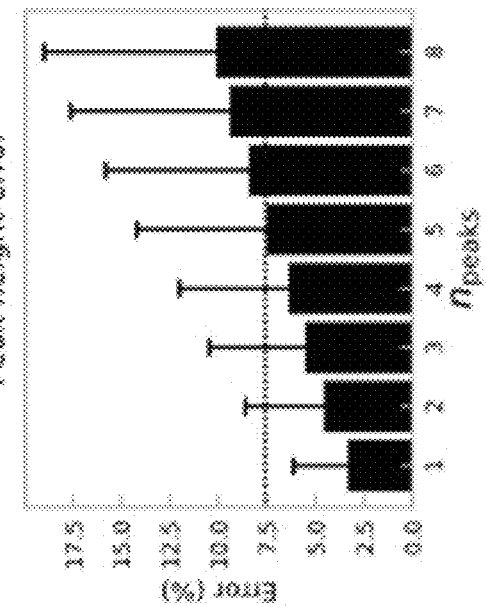
Figure 6E:
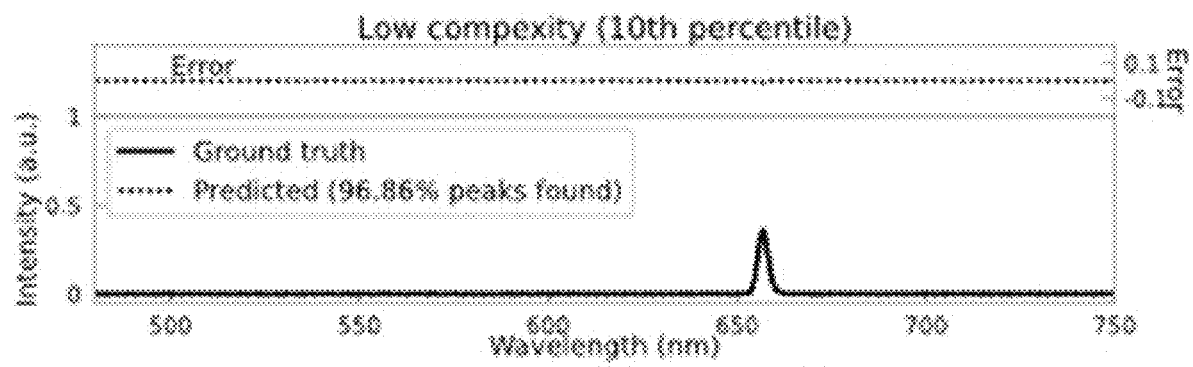
Figure 6F:
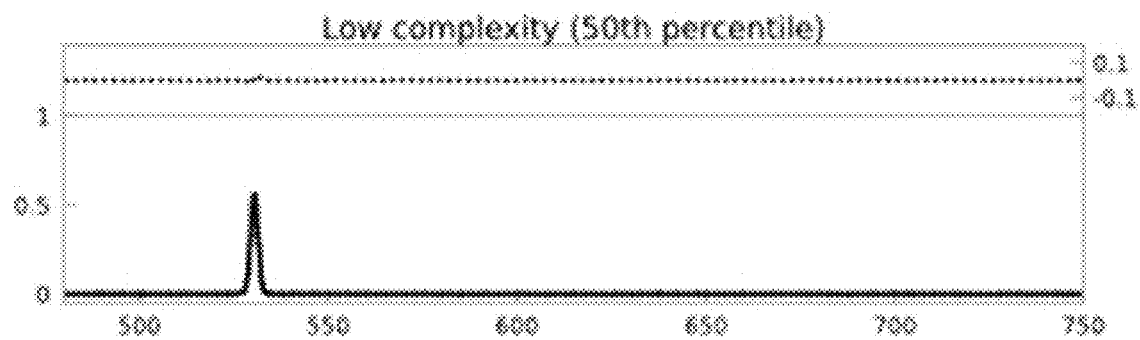
Figure 6G:
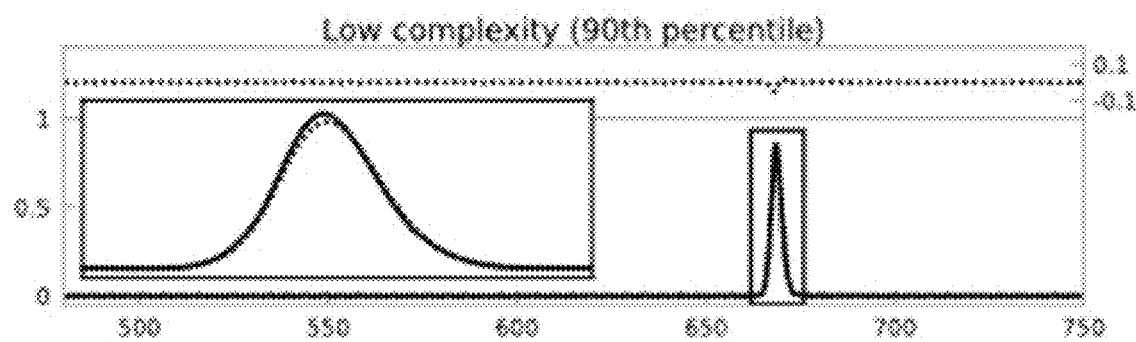
Figure 6H:
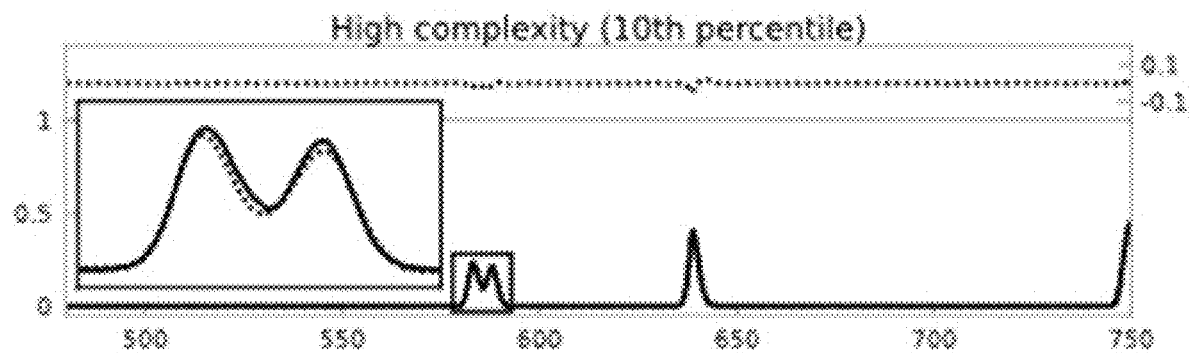
Figure 6I:
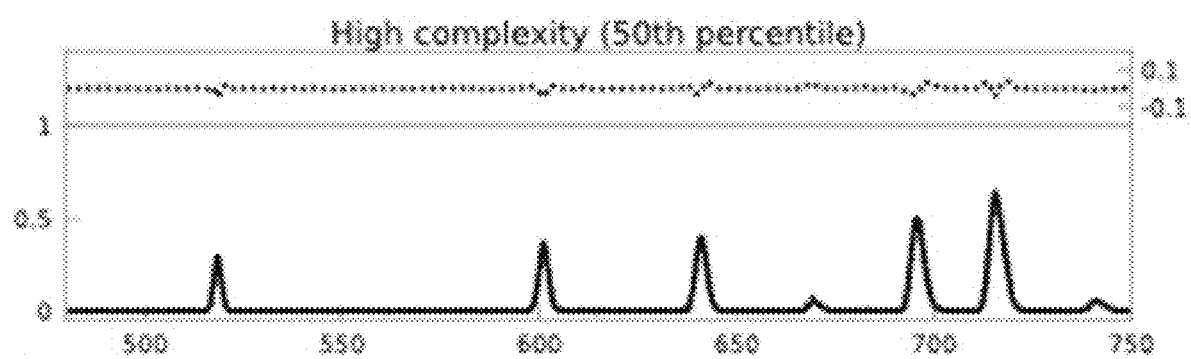
Figure 6J:
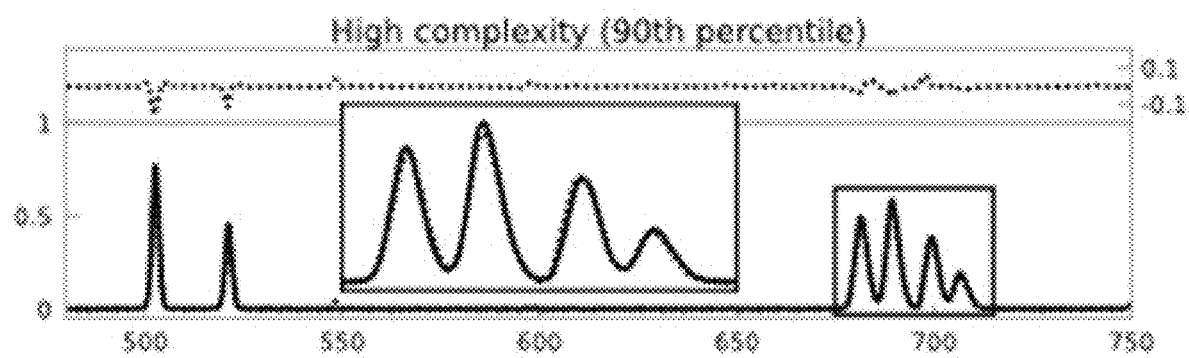
Figure 7A:
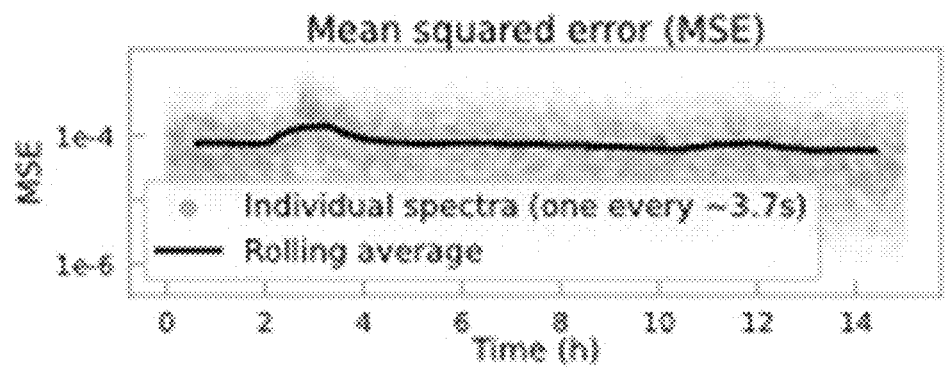
FIGS. 7A-7D: Stability of performance metrics over time.
Figure 7B:
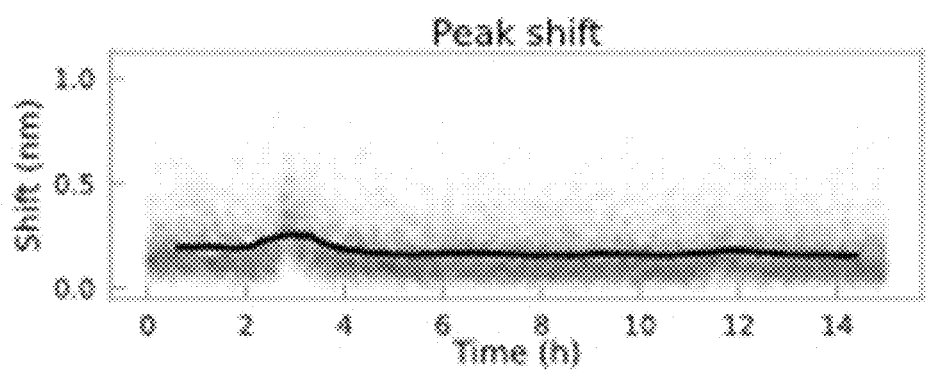
Figure 7C:
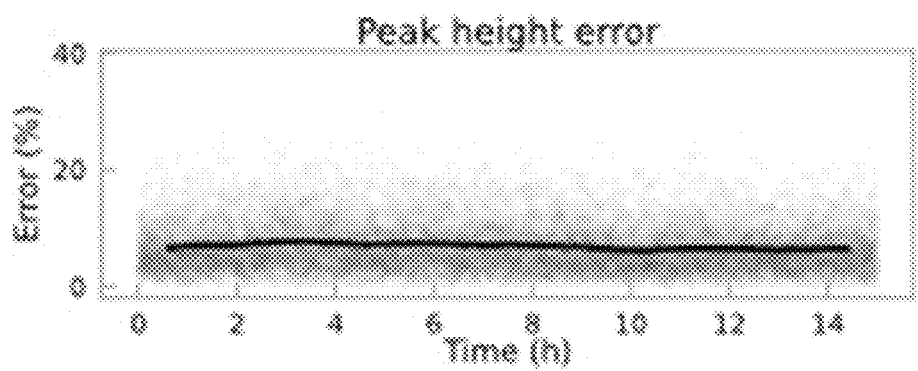
Figure 7D:
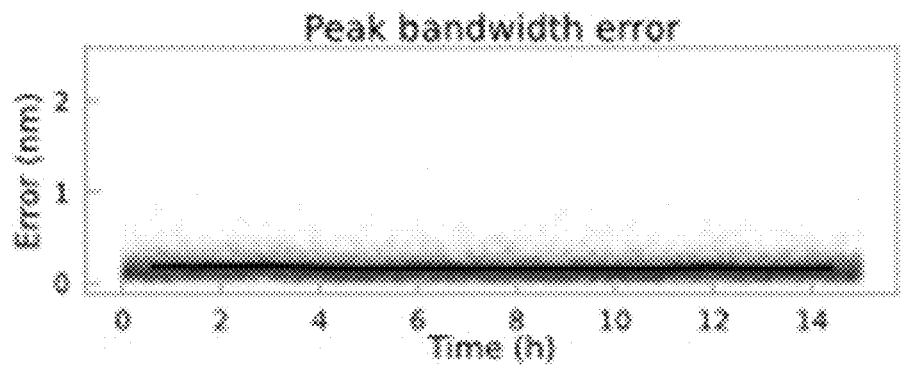
Figure 8E:
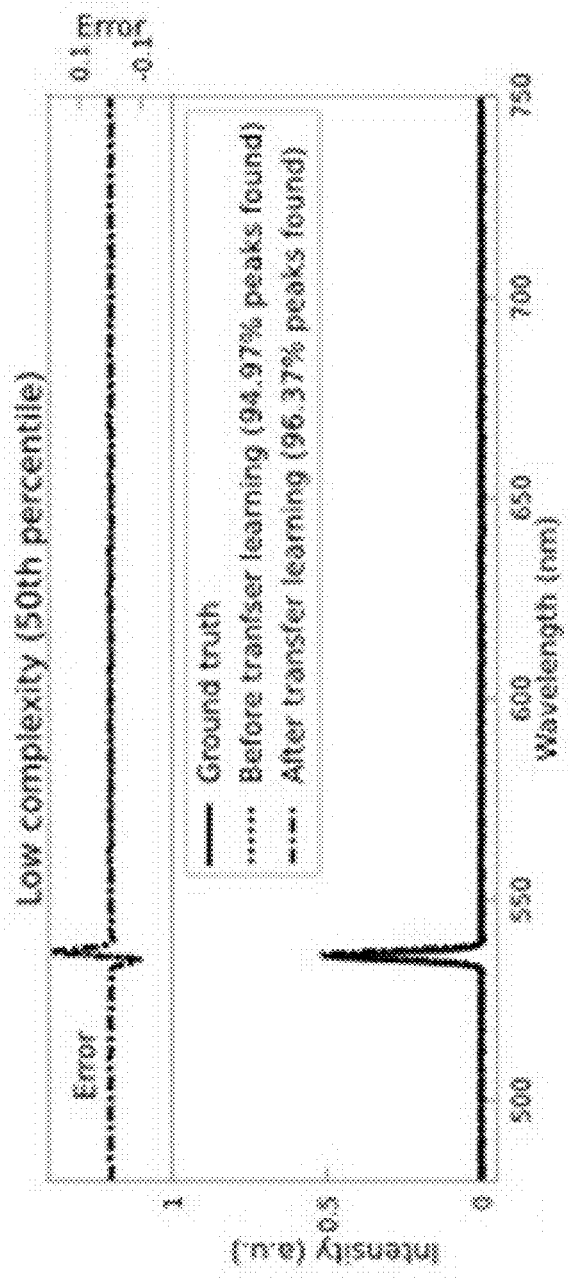
Figure 8F:
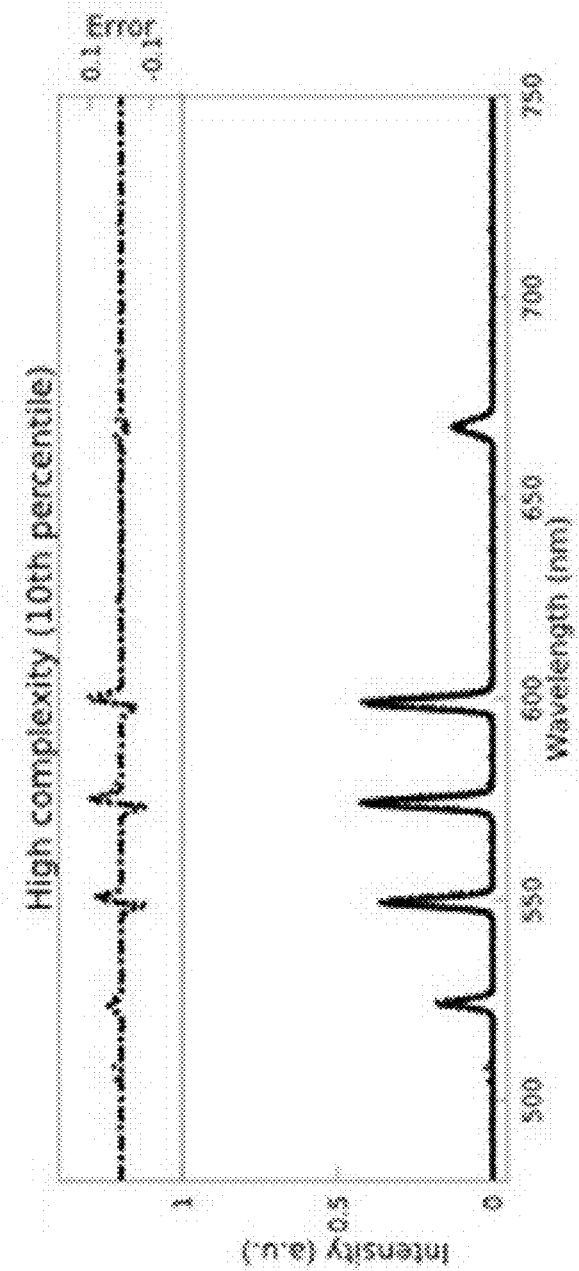
Figure 8G:
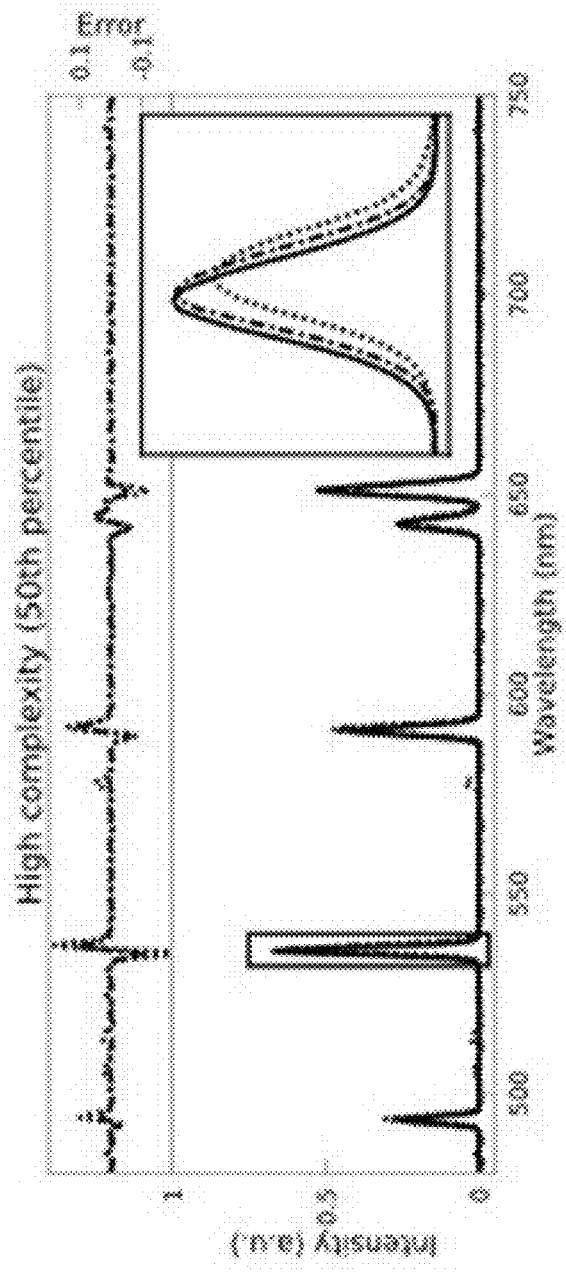
Figure 8H:
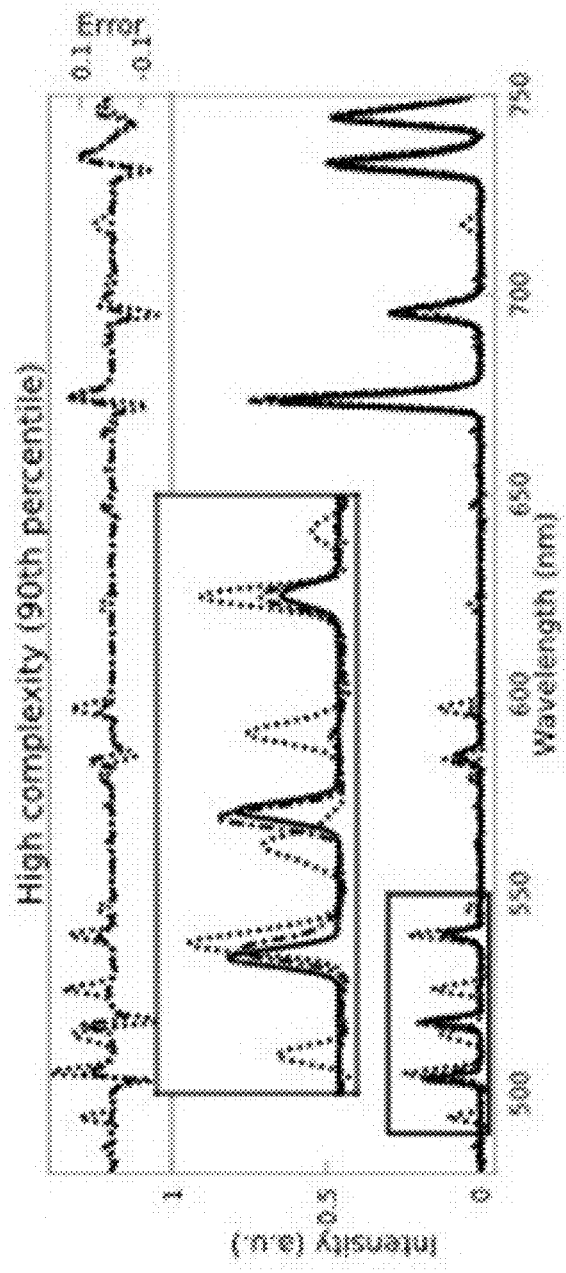
Figure 9A:
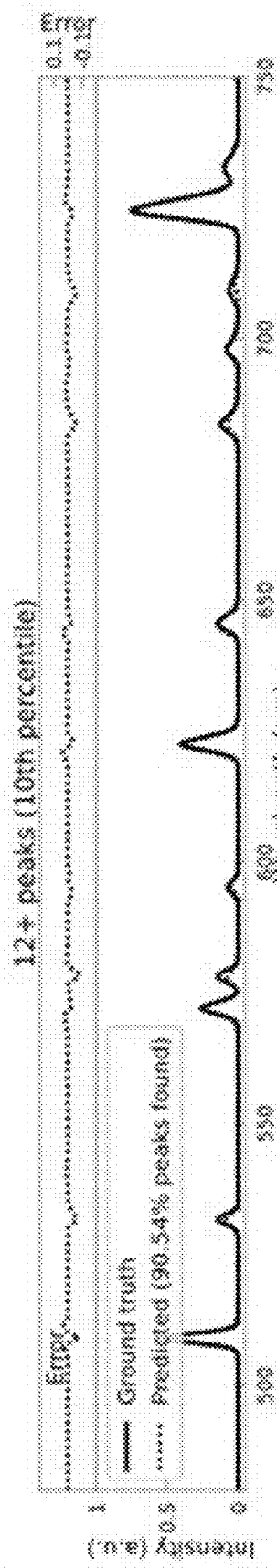
FIGS. 9A-9C: Performance on synthesized spectra. Reconstructions for synthesized spectra with twelve (12) or more peaks in the $10^{th}$ percentile (FIG. 9A), $50^{th}$ (FIG. 9B) and $90^{th}$ (FIG. 9C) percentile of MSE. While the network was only trained on spectra with up to 8 peaks, it faithfully reconstructs spectra with more peaks. Error is shown above each plot on the same y-scale.
Figure 9B:
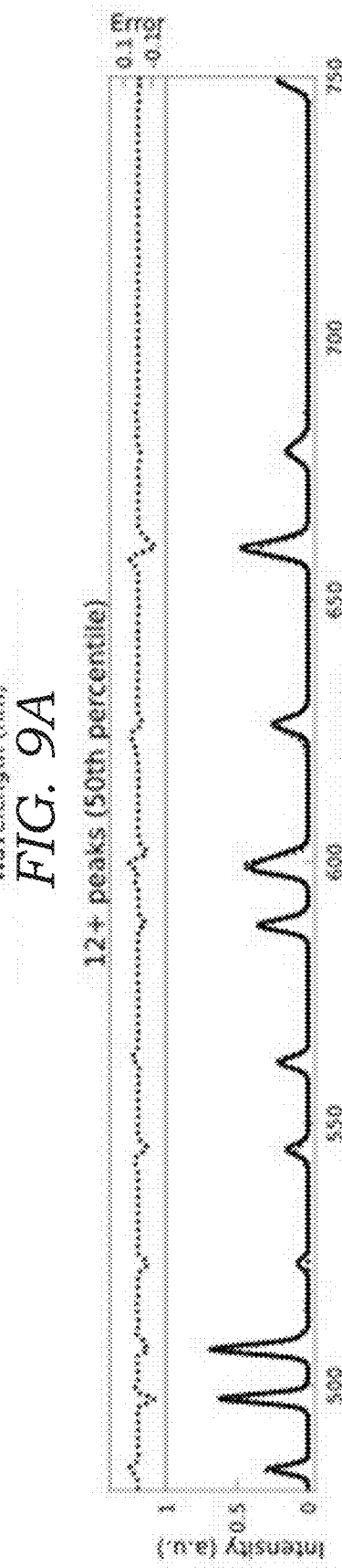
Figure 9C:
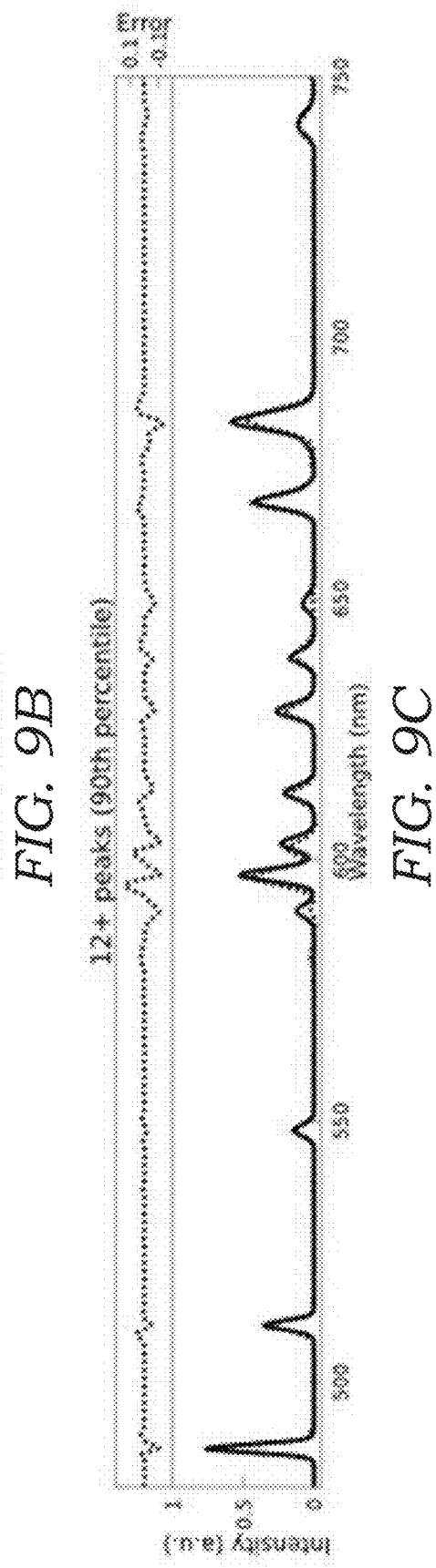
Figure 10A:
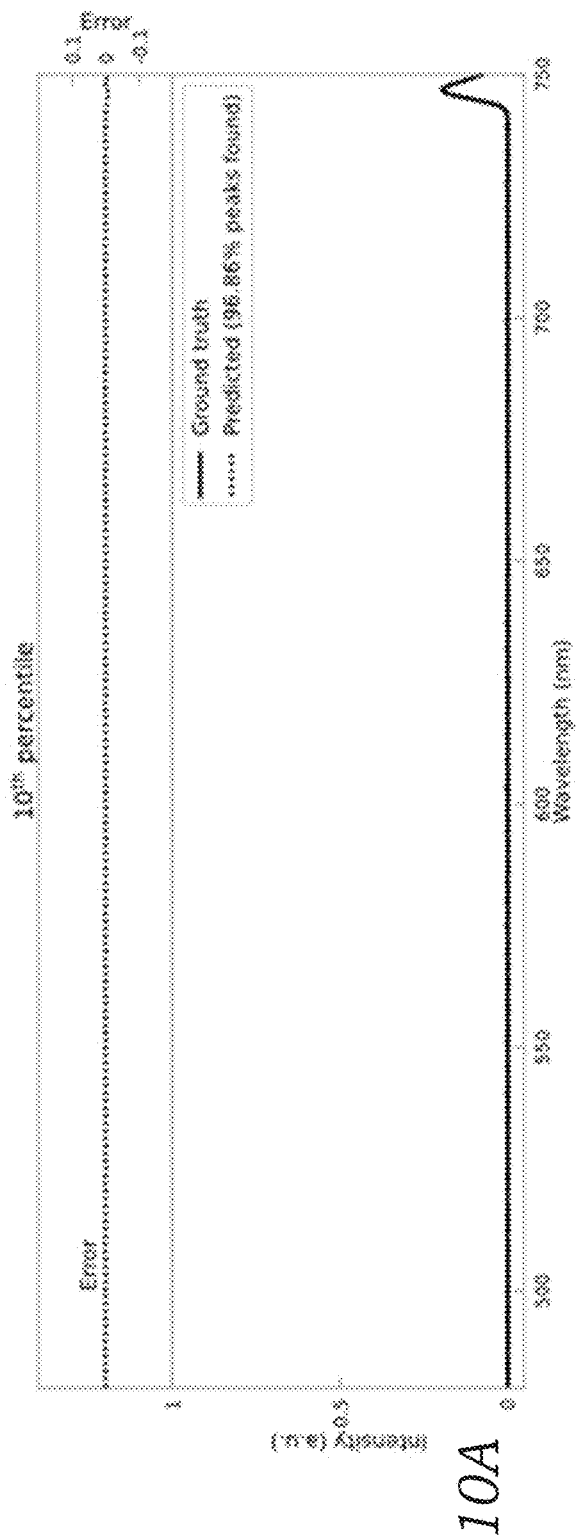
FIGS. 10A-10C: Blind reconstructions for spectra with one peak. Spectral reconstructions for $10^{th}$ (FIG. 10A), $50^{th}$ (FIG. 10B), and $90^{th}$ (FIG. 10c) percentile of MSE. $10^{th}$, $50^{th}$, and $90^{th}$ percentiles correspond to best 10%, median, and worst 10% fits, respectively. Error is shown above each plot on the same y-scale.
Figure 10B:
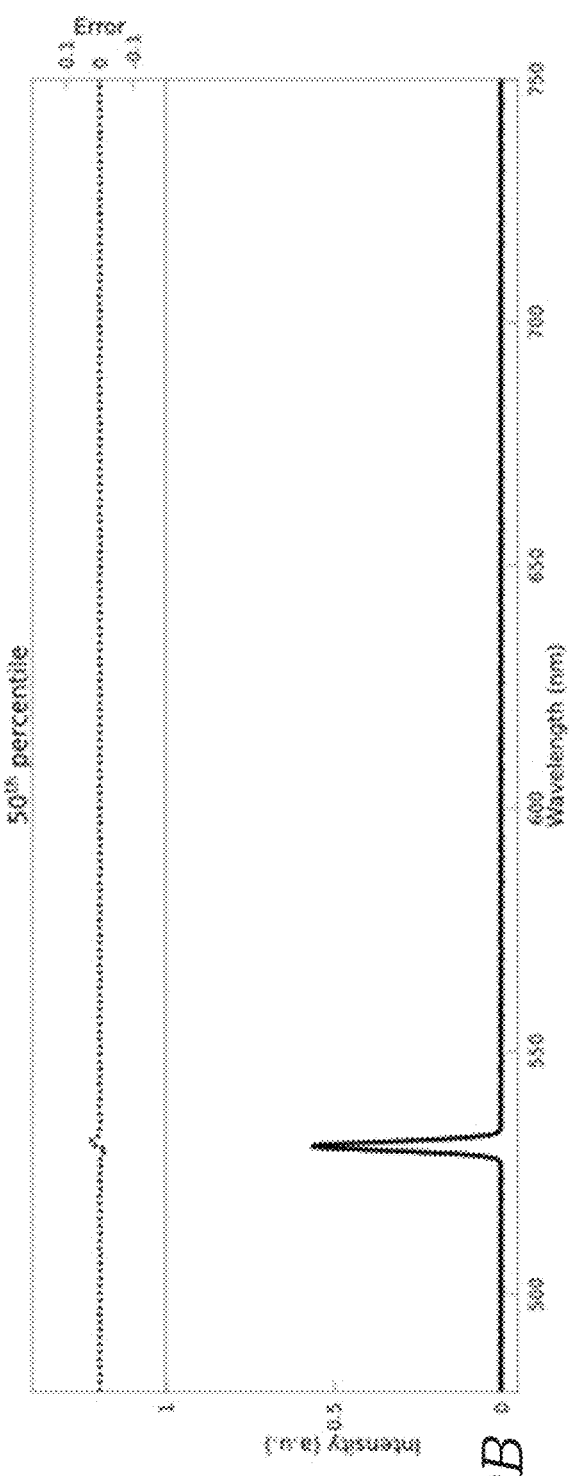
Figures 10C, 11A:
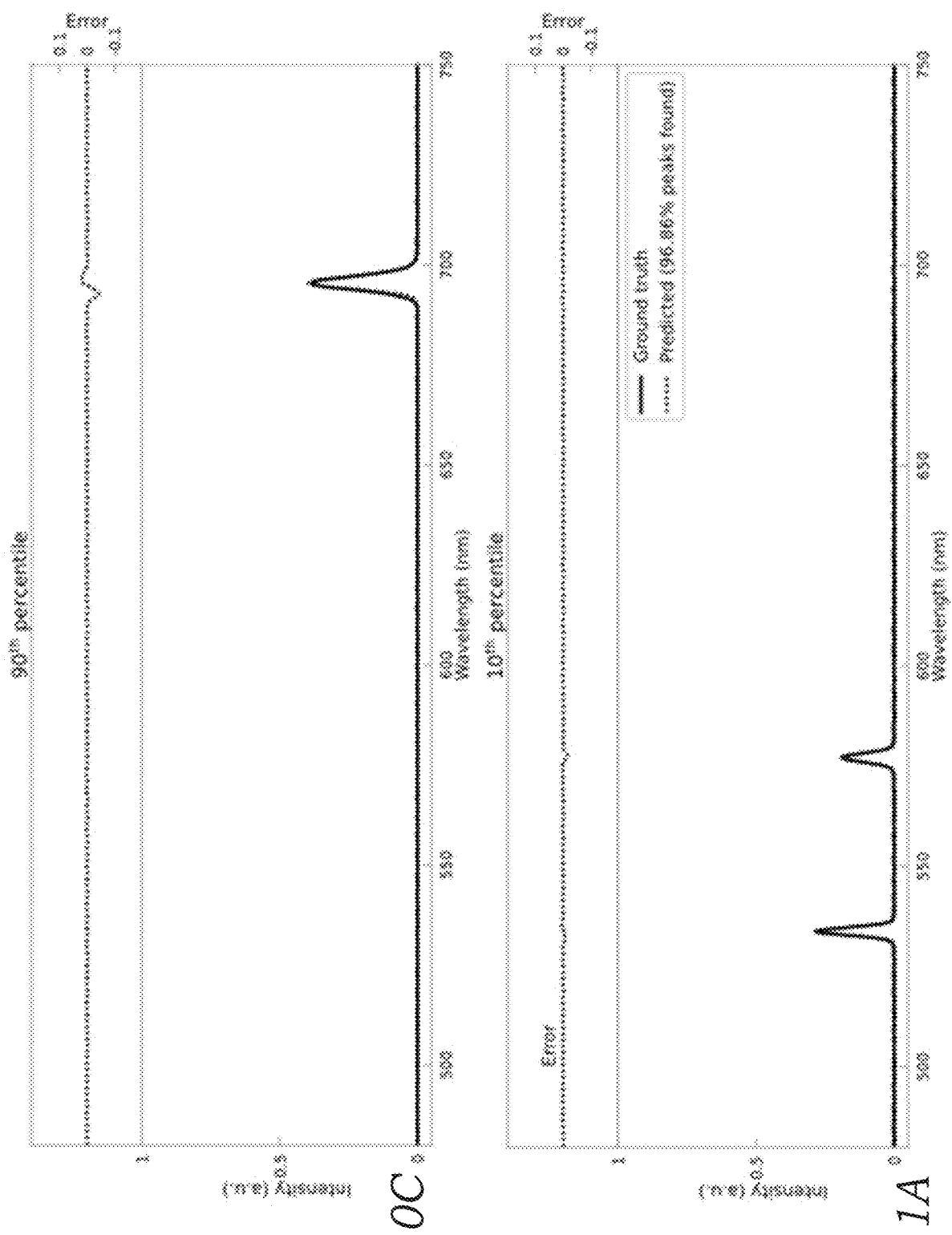
FIG. 11A-11C: Blind reconstructions for spectra with two peaks. Spectral reconstructions for $10^{th}$ (FIG. 11A), $50^{th}$ (FIG. 11B), and $90^{th}$ (FIG. 11C) percentile of MSE. $10^{th}$, $50^{th}$, and $90^{th}$ percentiles correspond to best 10%, median, and worst 10% fits, respectively. Error is shown above each plot on the same y-scale.
Figure 11B:
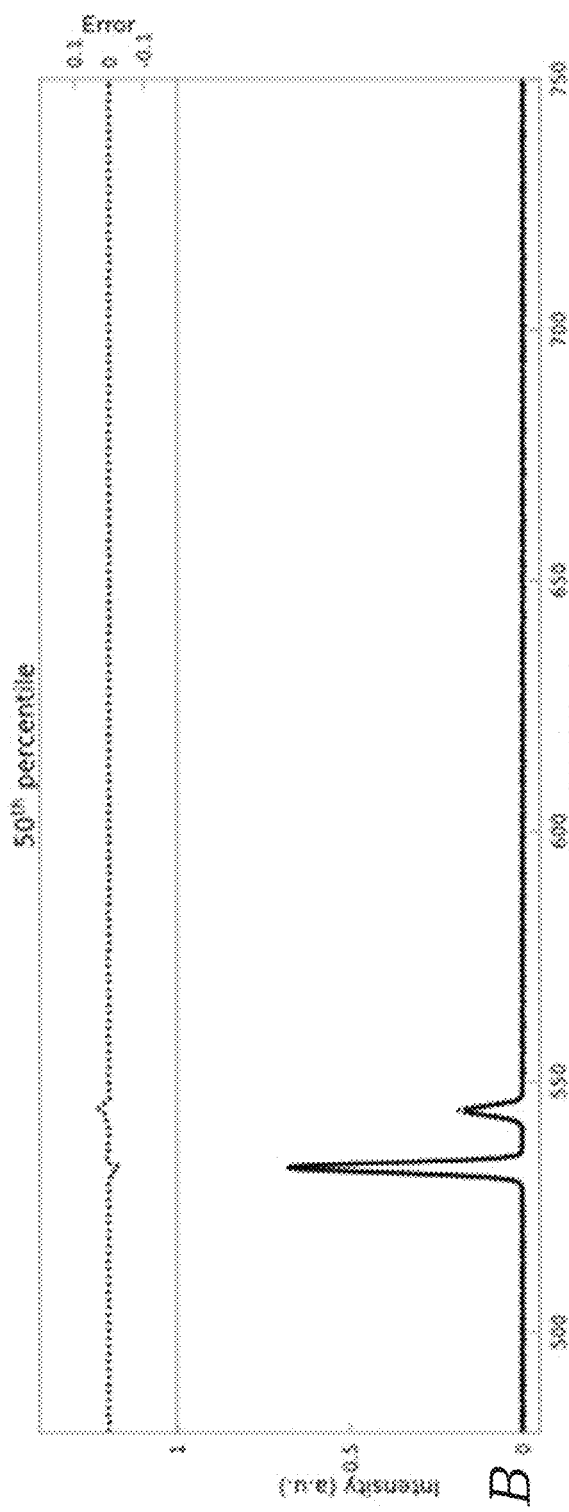
Figure 11C:
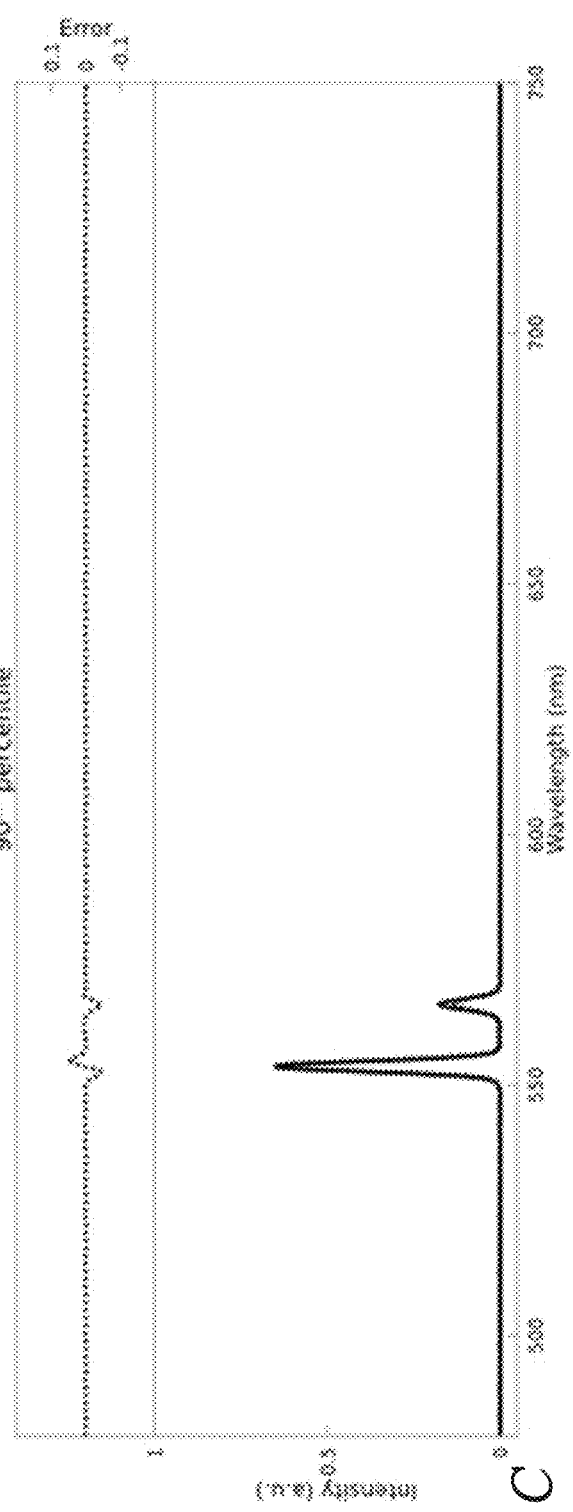
Figure 12A:
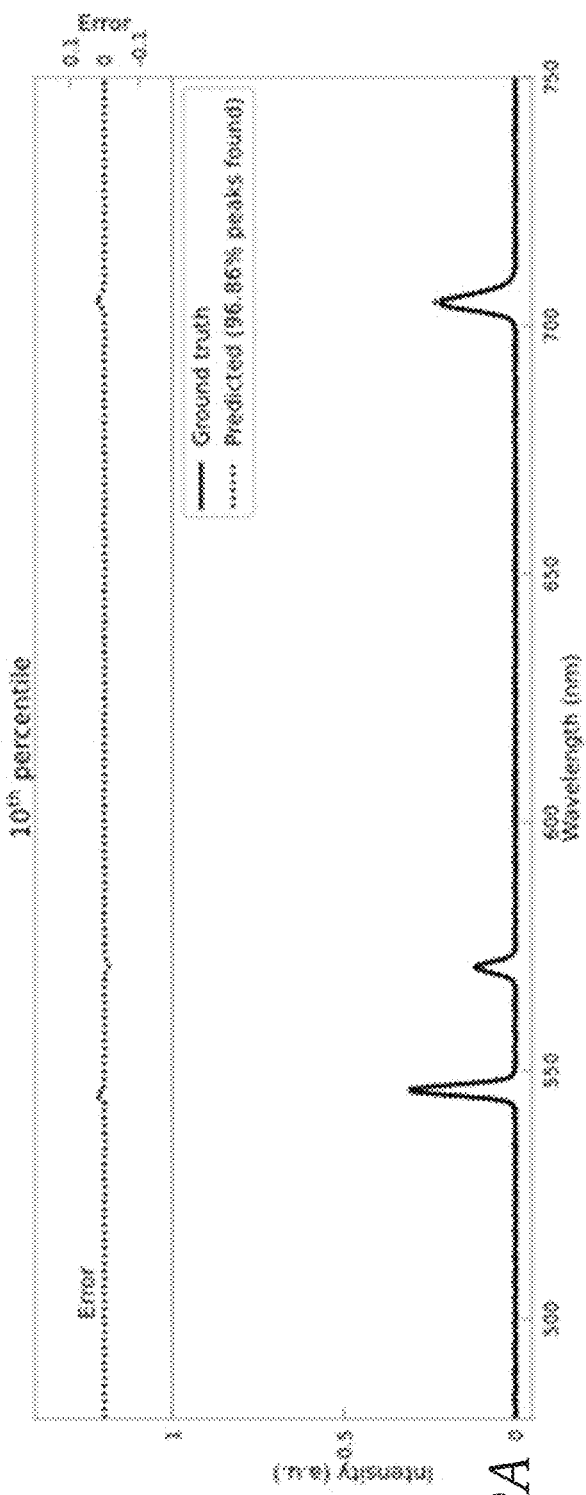
FIGS. 12A-12C: Blind reconstructions for spectra with three peaks. Spectral reconstructions for $10^{th}$ (FIG. 12A), $50^{th}$ (FIG. 12B), and $90^{th}$ (FIG. 12C) percentile of MSE. $10^{th}$, $50^{th}$, and $90^{th}$ percentiles correspond to best 10%, median, and worst 10% fits, respectively. Error is shown above each plot on the same y-scale.
Figure 12B:
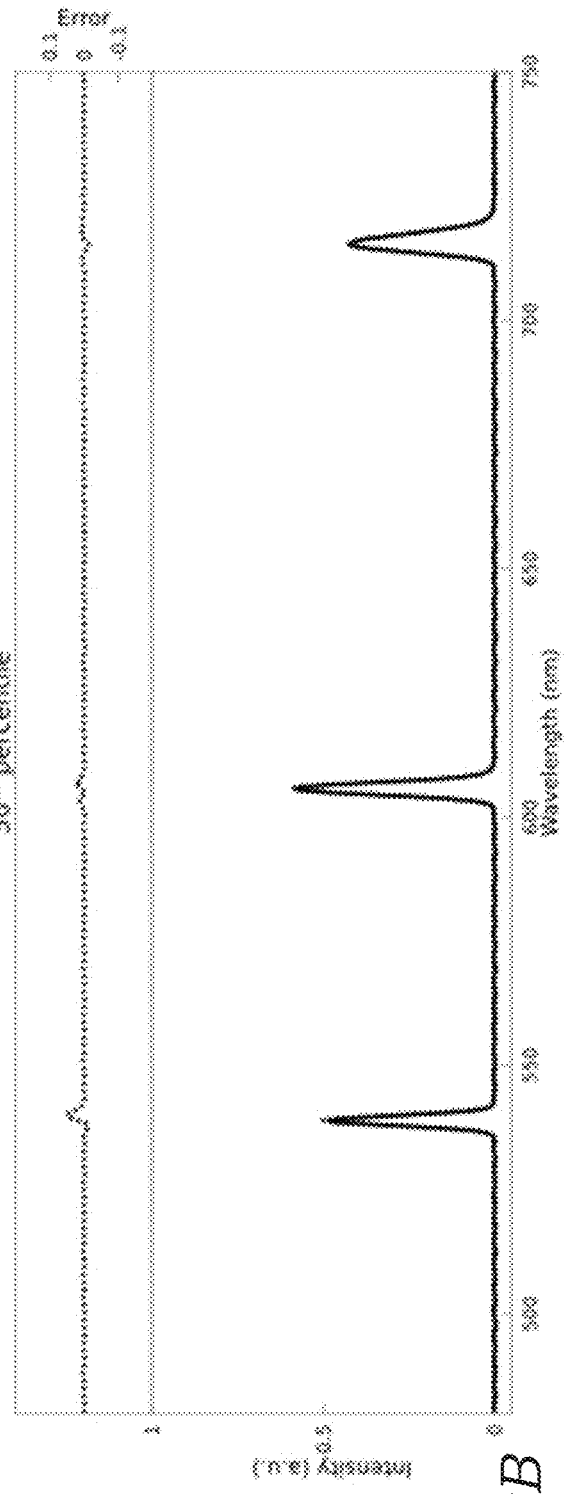
Figure 12C:
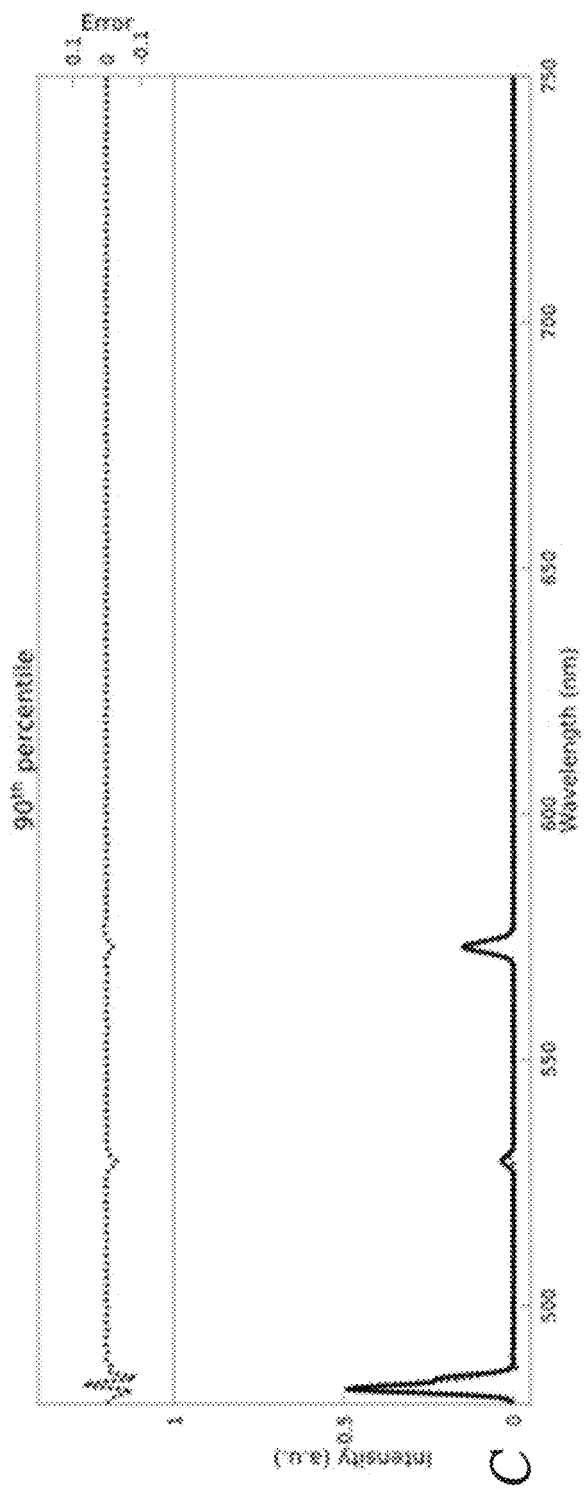
Figure 13A:
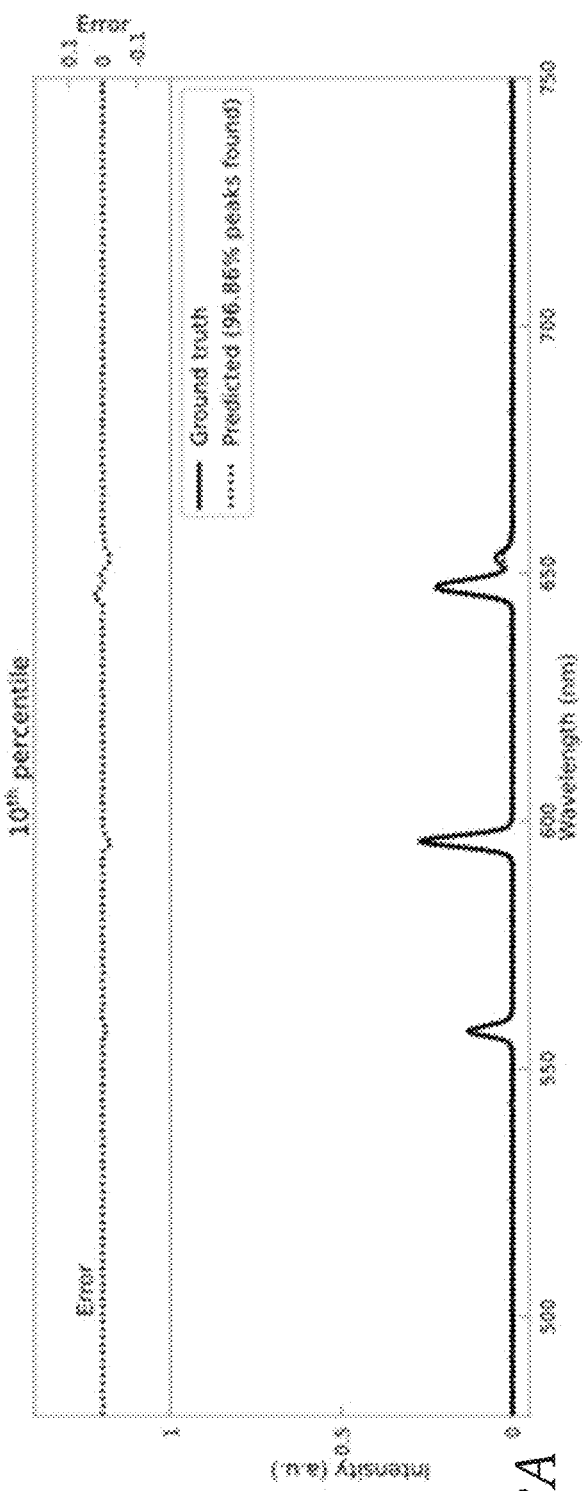
FIGS. 13A-13C: Blind reconstructions for spectra with four peaks. Spectral reconstructions for $10^{th}$ (FIG. 13A); $50^{th}$ (FIG. 13B), and $90^{th}$ (FIG. 13C) percentile of MSE. $10^{th}$, $50^{th}$, and $90^{th}$ percentiles correspond to best 10%, median, and worst 10% fits, respectively. Error is shown above each plot on the same y-scale.
Figures 13B, 13C:
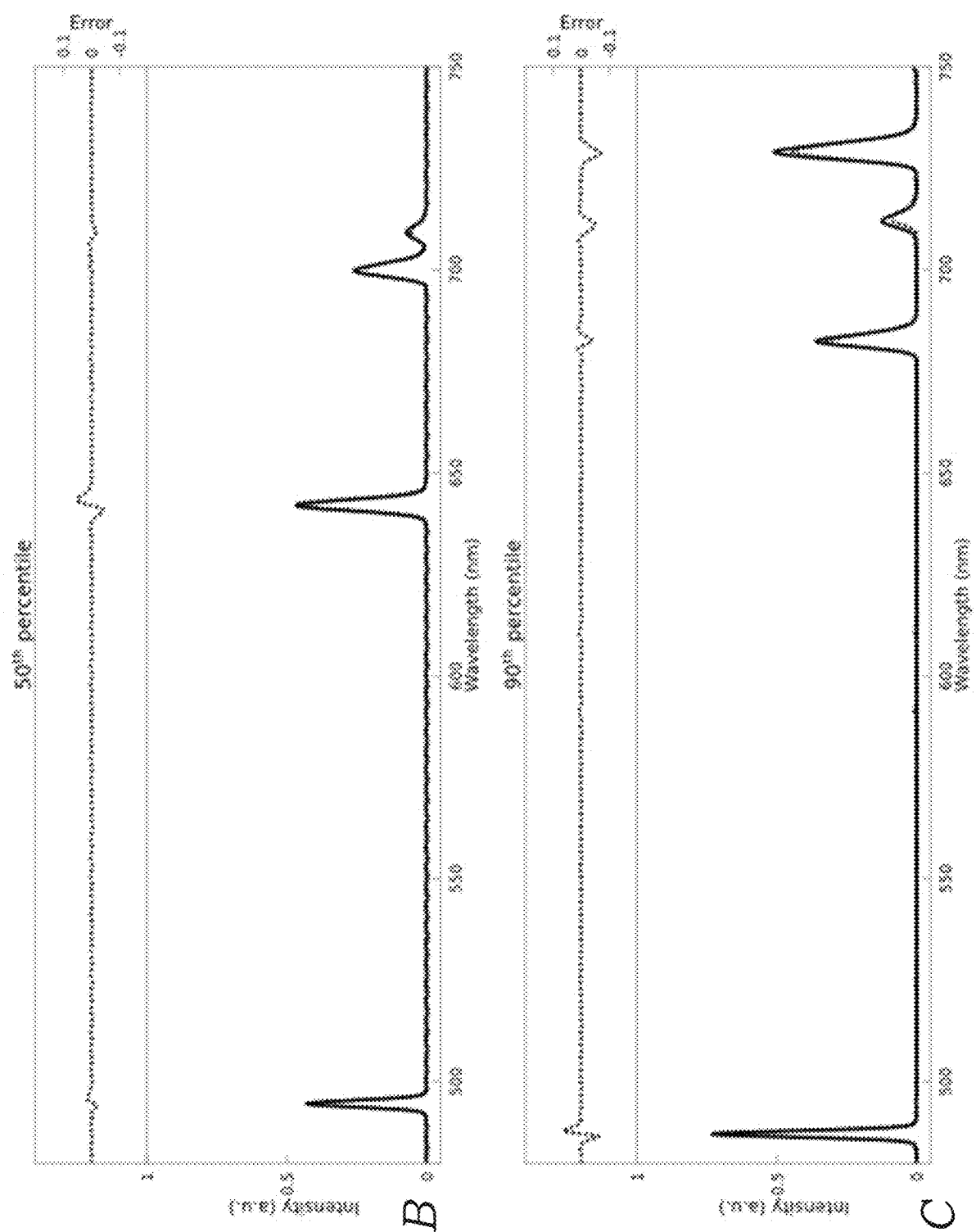
Figures 14A, 14B:
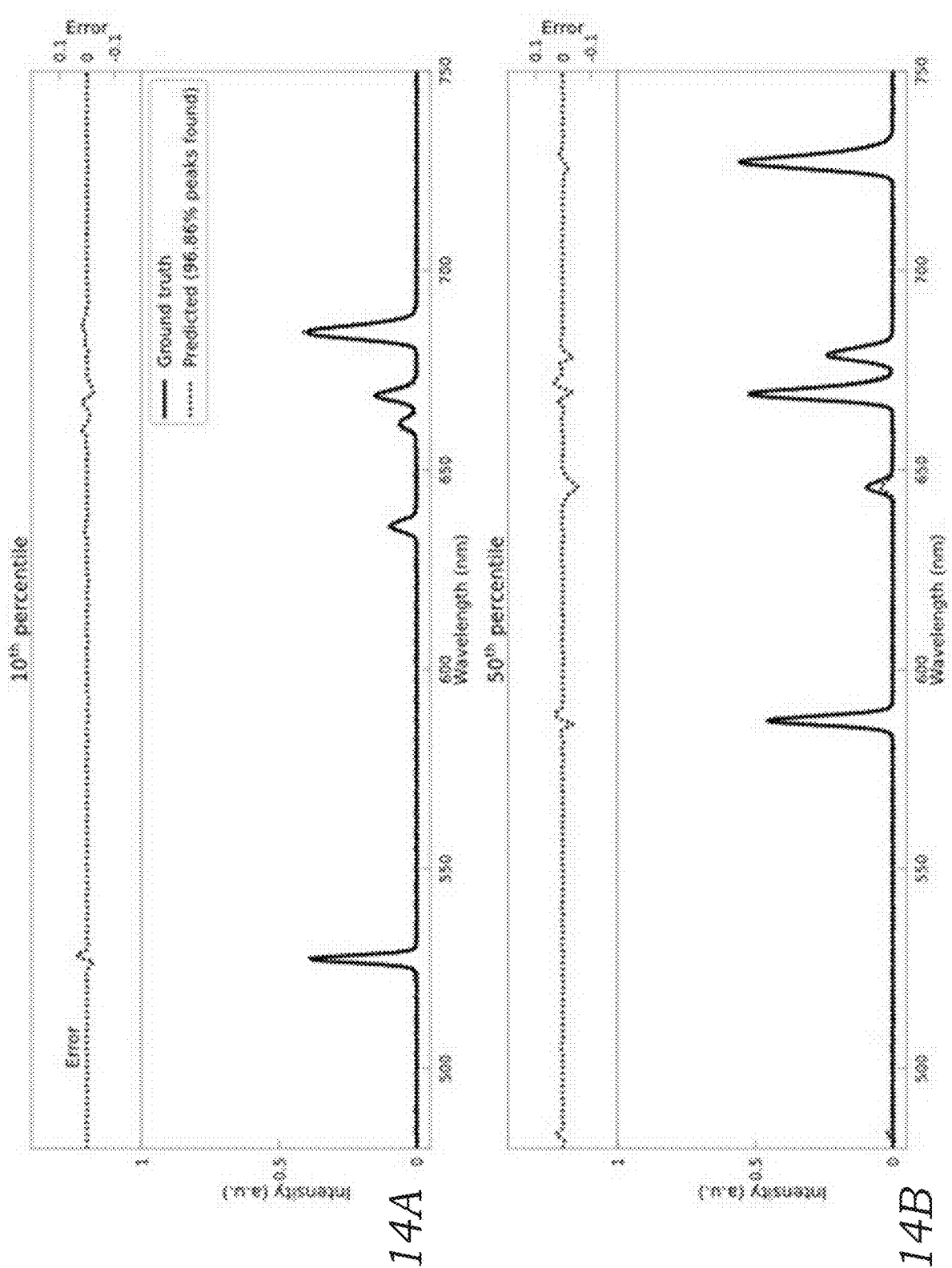
FIGS. 14A-14C: Blind reconstructions for spectra with five peaks. Spectral reconstructions for $10^{th}$ (FIG. 14A), $50^{th}$ (FIG. 14B), and $90^{th}$ (FIG. 14C) percentile of MSE. $10^{th}$, $50^{th}$, and $90^{th}$ percentiles correspond to best 10%, median, and worst 10% fits, respectively. Error is shown above each plot on the same y-scale.
Figures 14C, 15A:
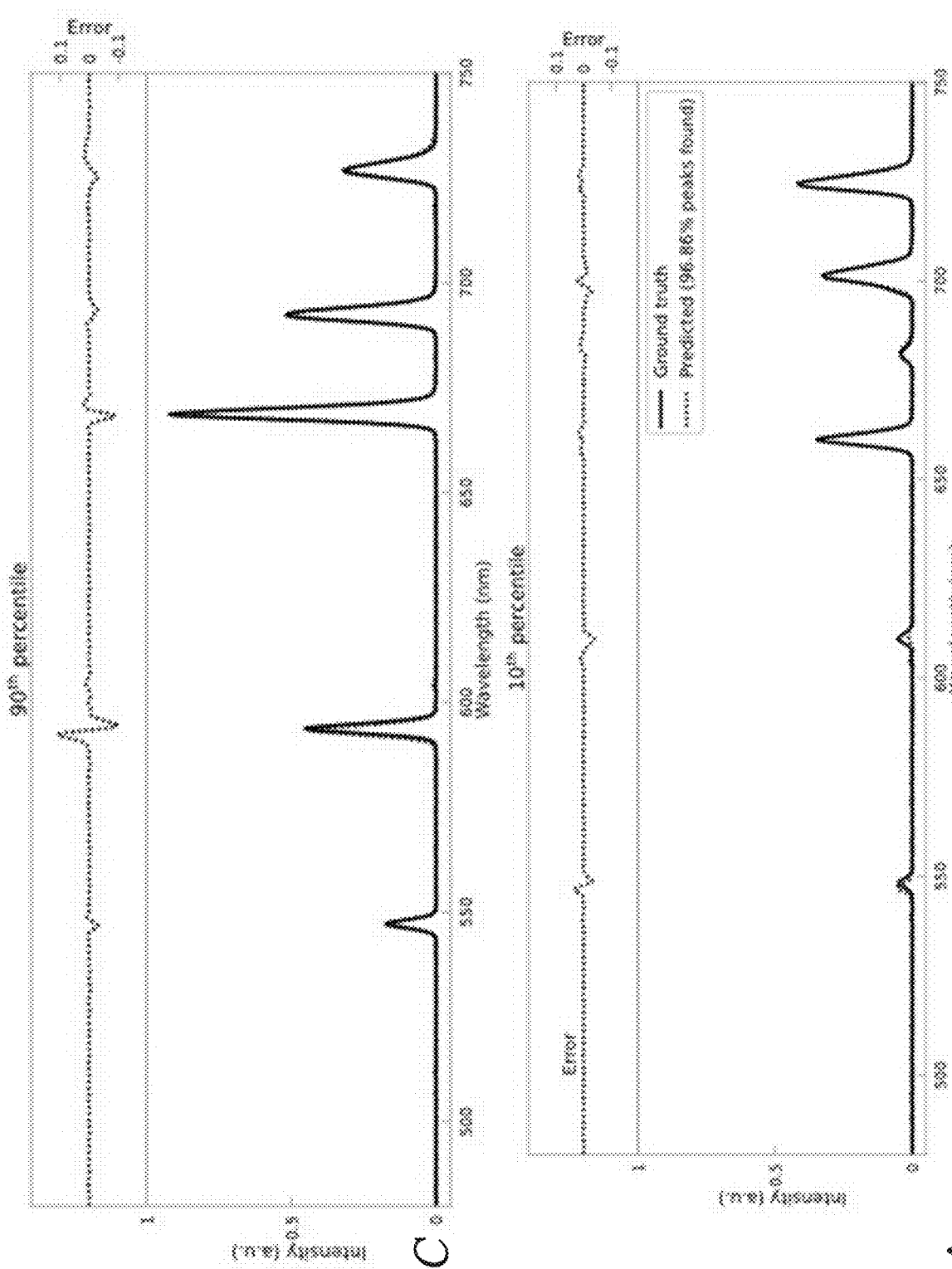
FIGS. 15A-15C: Blind reconstructions for spectra with six peaks. Spectral reconstructions for $10^{th}$ (FIG. 15A), $50^{th}$ (FIG. 15B) and $90^{th}$ (FIG. 15C) percentile of MSE. $10^{th}$, $50^{th}$, and $90^{th}$ percentiles correspond to best 10%, median, and worst 10% fits, respectively. Error is shown above each plot on the same y-scale.
Figure 15B:
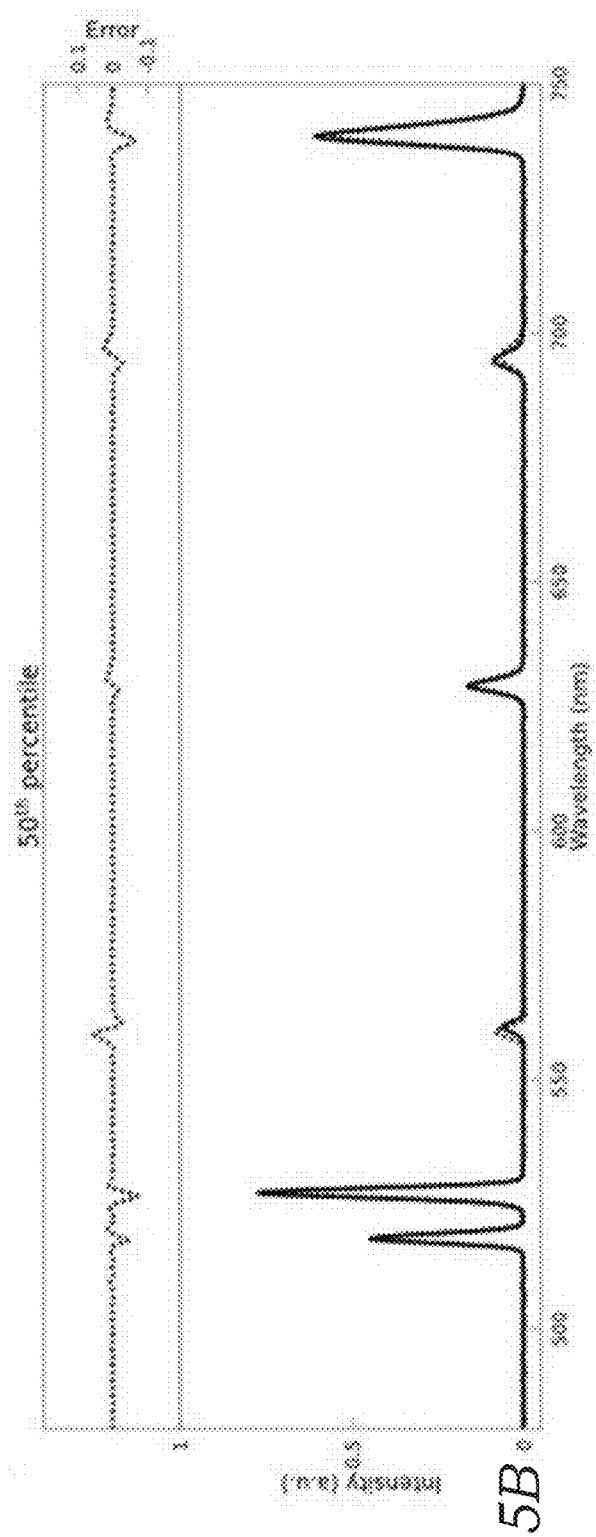
Figure 15C:
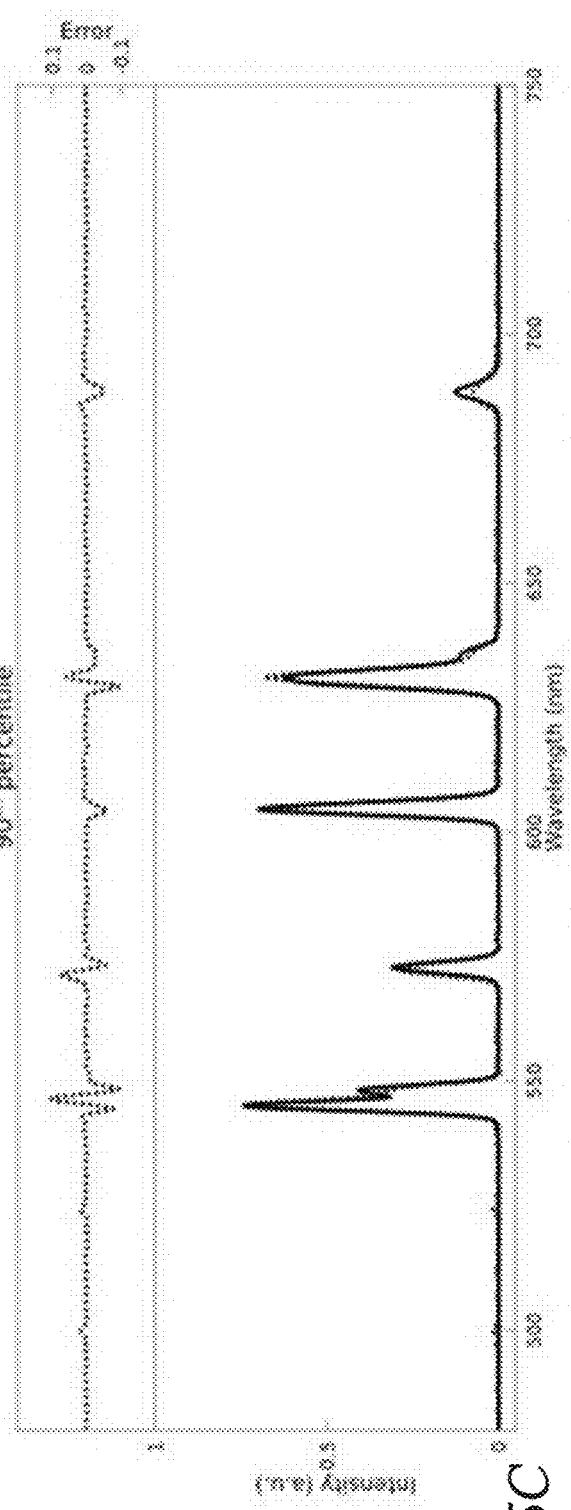
Figures 16A, 16B:
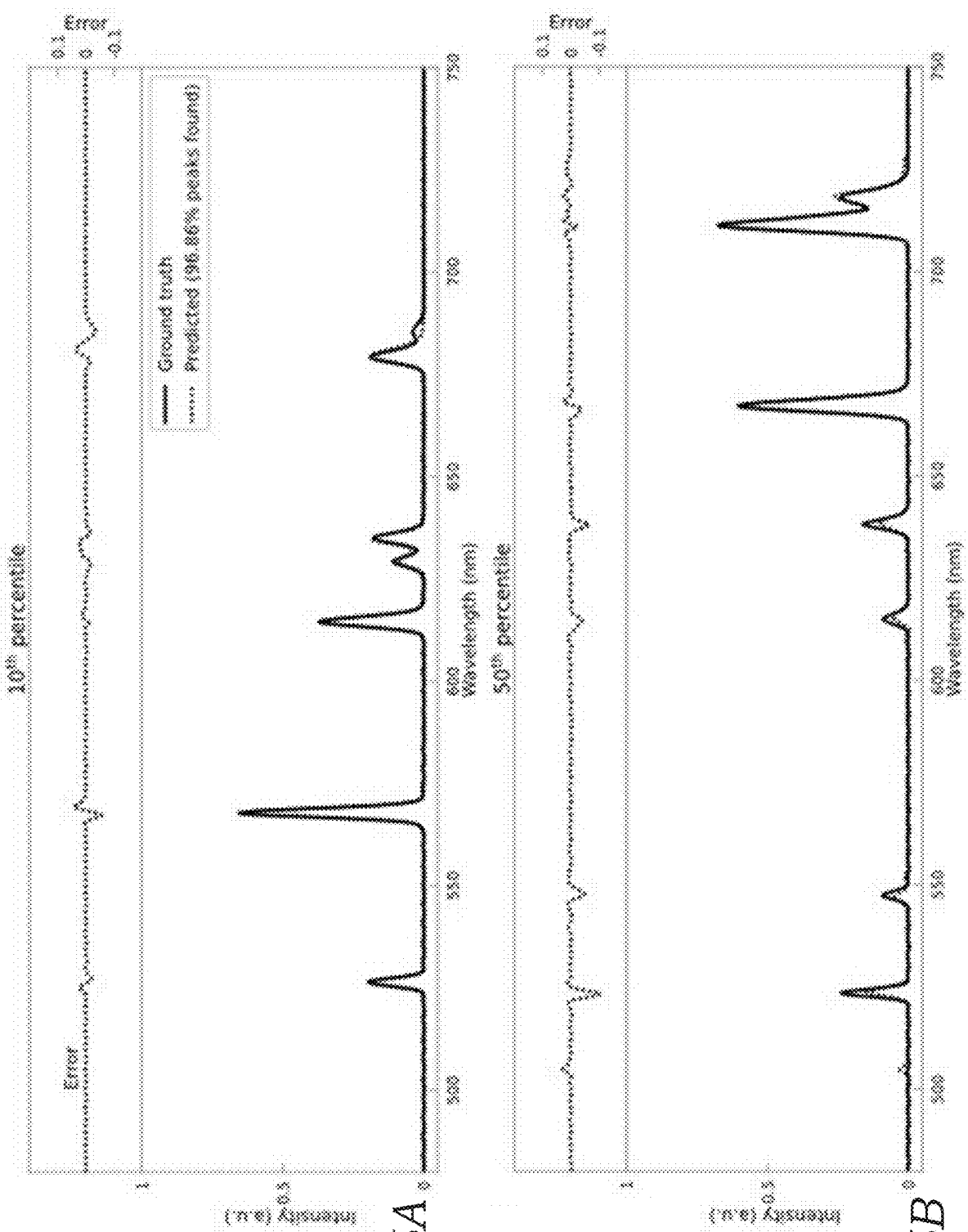
FIGS. 16A-16C: Blind reconstructions for spectra with seven peaks. Spectral reconstructions for $10^{th}$ (FIG. 16A), $50^{th}$ (FIG. 16B), and $90^{th}$ (FIG. 16C) percentile of MSE. $10^{th}$, $50^{th}$, and $90^{th}$ percentiles correspond to best 10%, median, and worst 10% fits, respectively. Error is shown above each plot on the same y-scale.
Figures 16C, 17A:
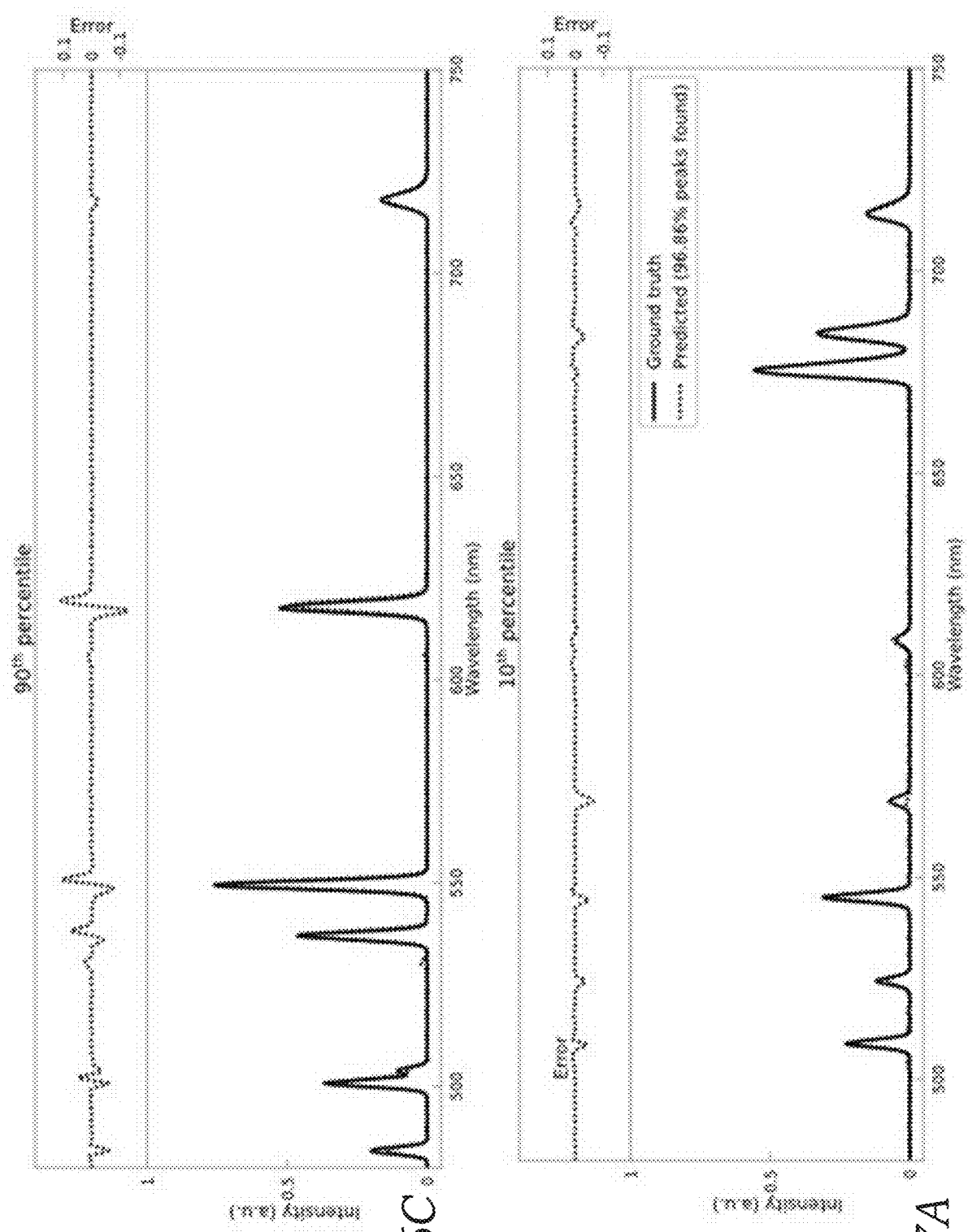
FIGS. 17A-17C: Blind reconstructions for spectra with eight peaks. Spectral reconstructions for $10^{th}$ (FIG. 17A), $50^{th}$ (FIG. 17B), and $90^{th}$ (FIG. 17C) percentile of MSE. $10^{th}$, $50^{th}$, and $90^{th}$ percentiles correspond to best 10%, median, and worst 10% fits, respectively. Error is shown above each plot on the same y-scale.
Figures 17B, 17C:
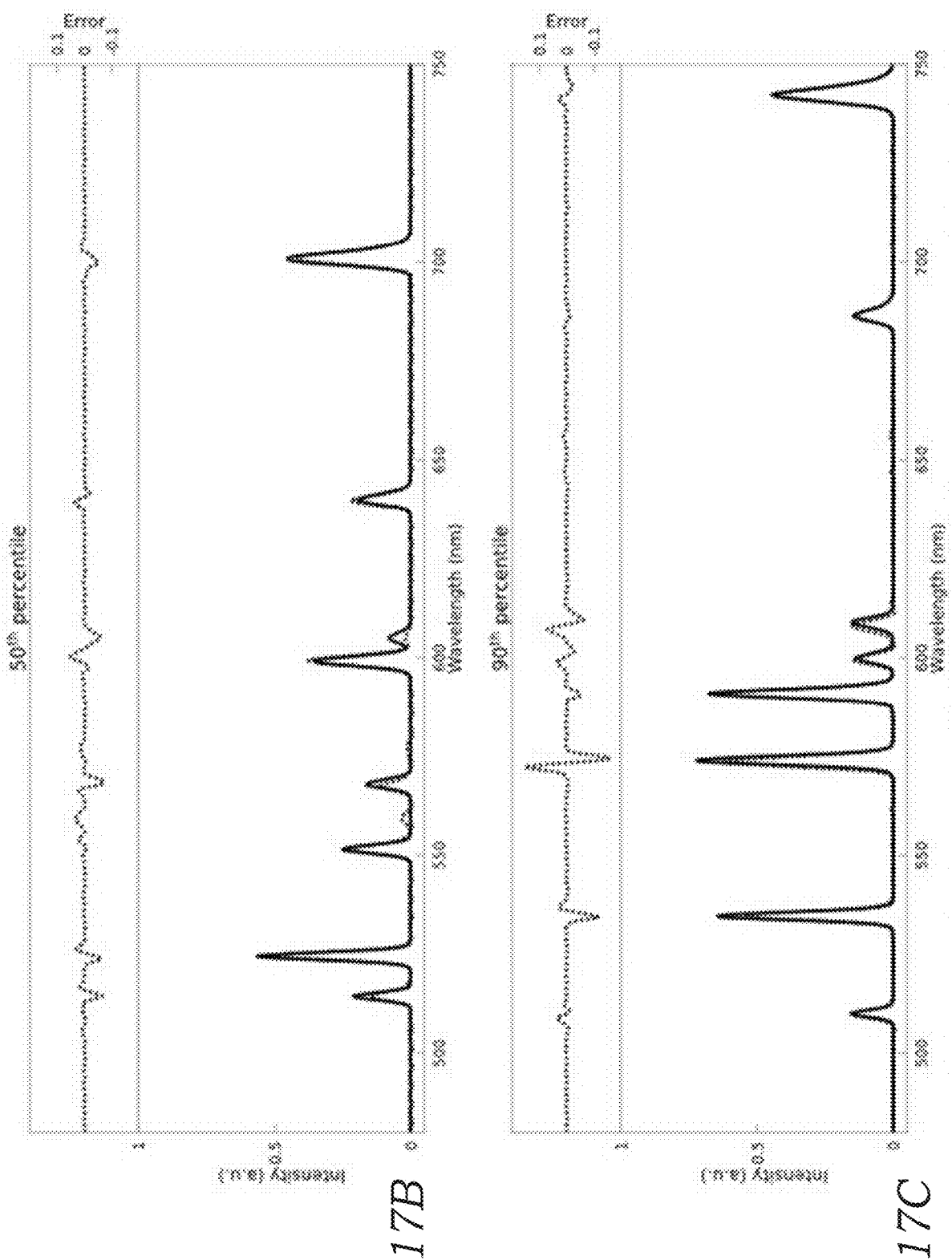
Figure 18A:
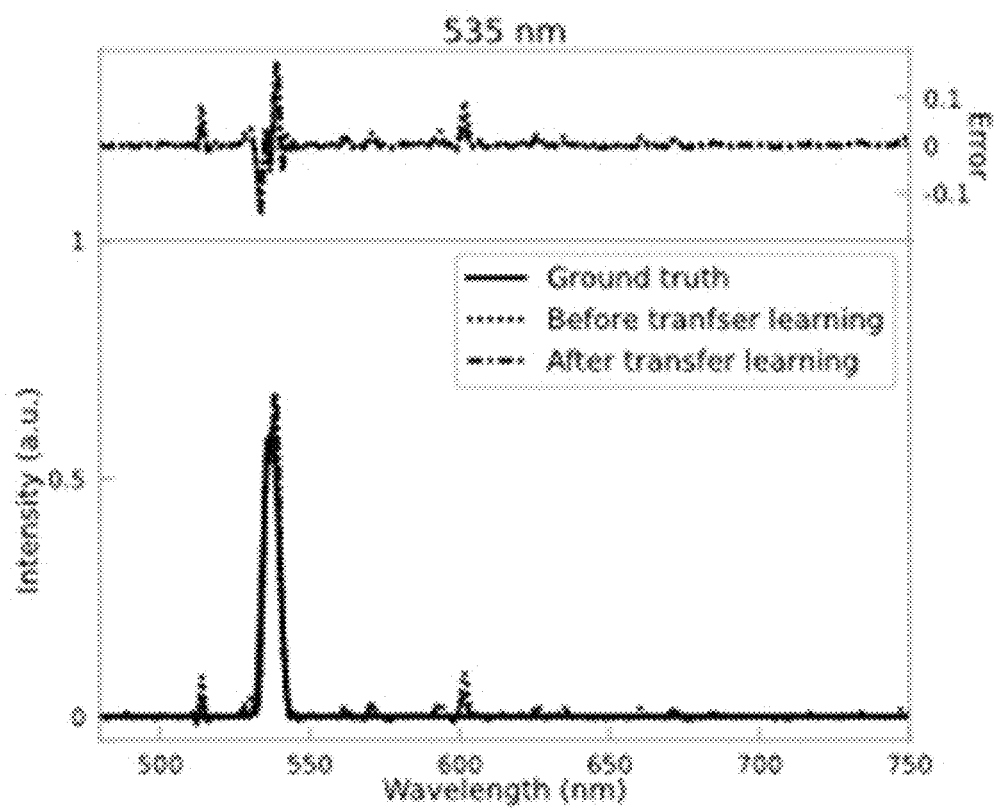
FIGS. 18A-18D: Blind reconstruction of broadband spectra.
Figure 18B:
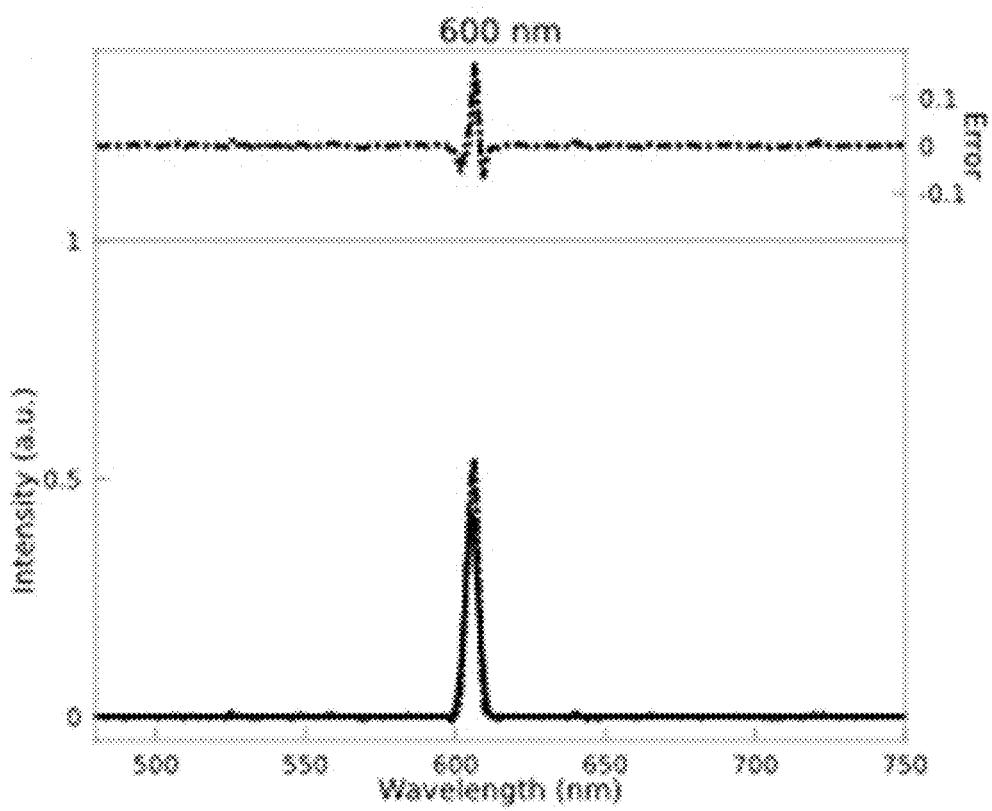
Figure 18C:
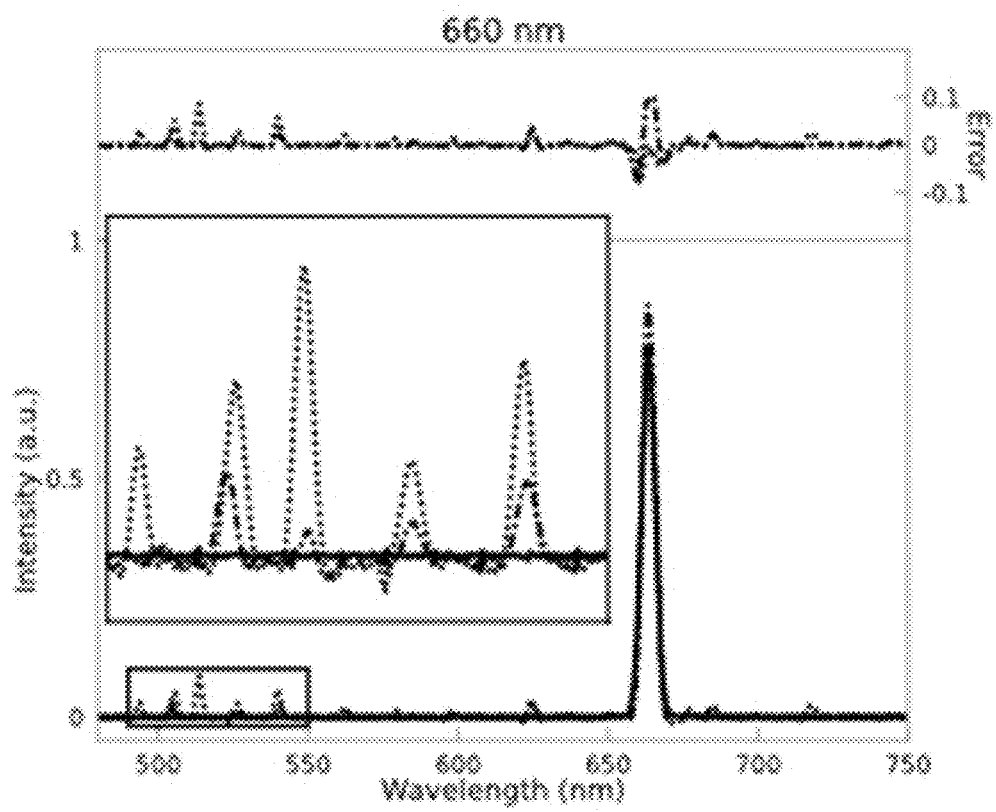
Figure 18D:
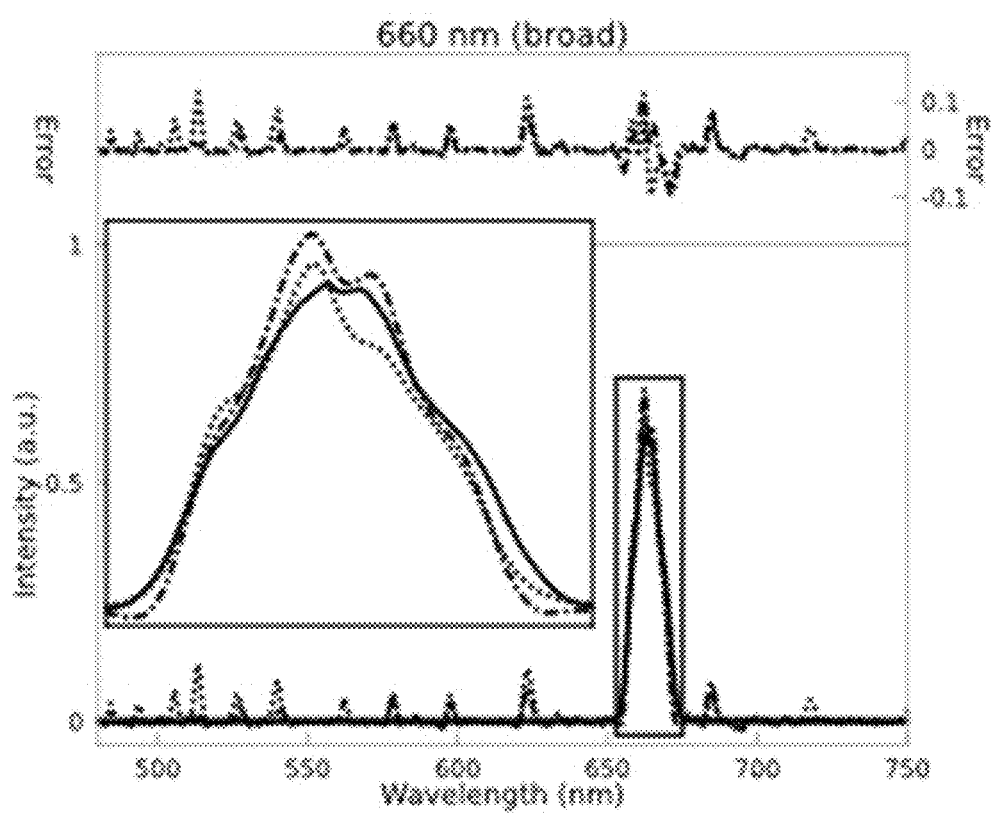
Figure 19E:
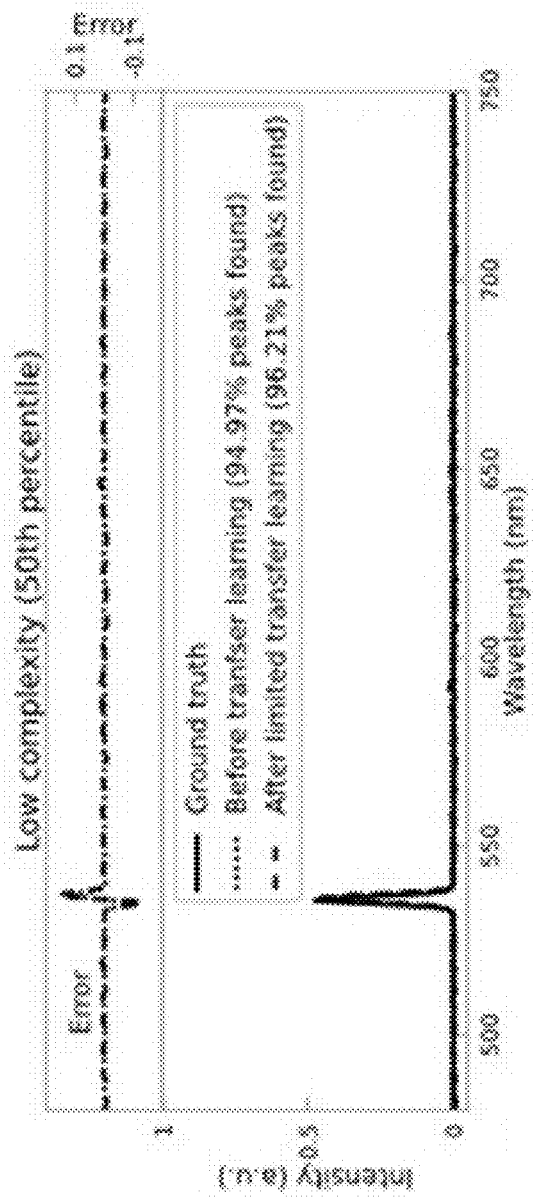
Figure 19F:
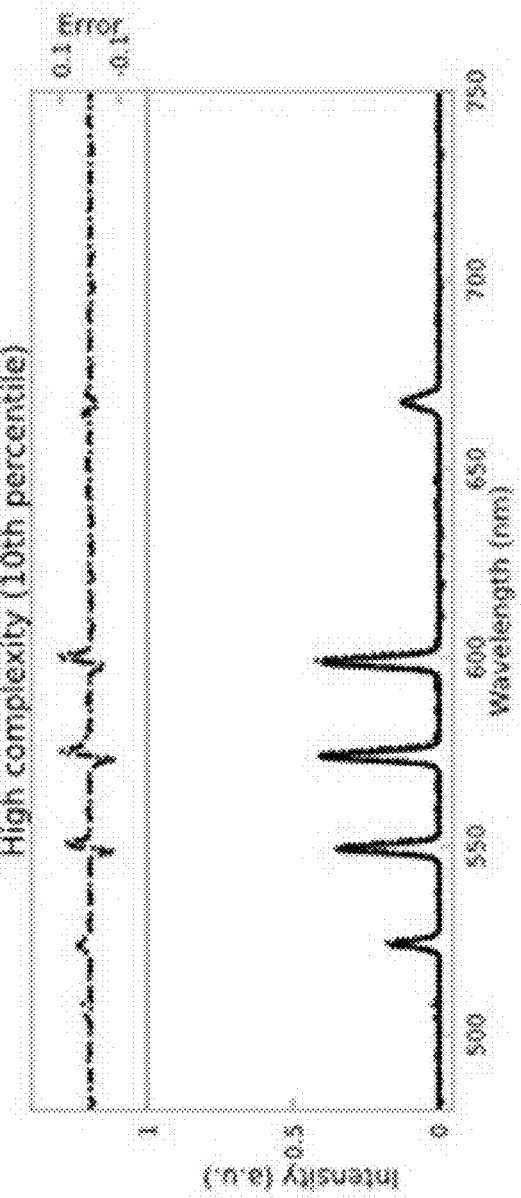
Figure 19G:
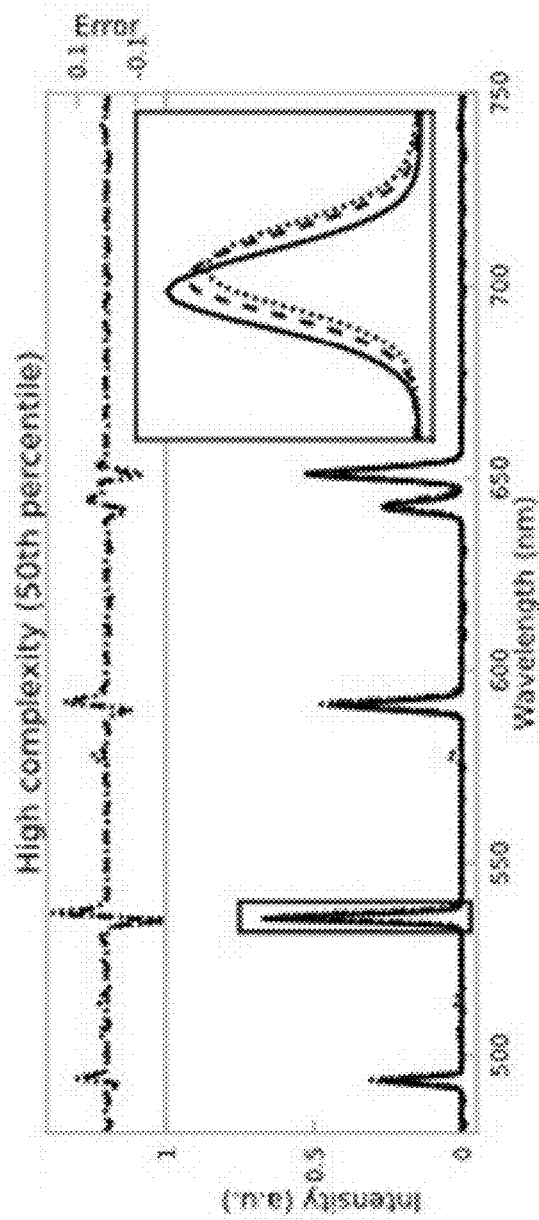
Figure 19H:
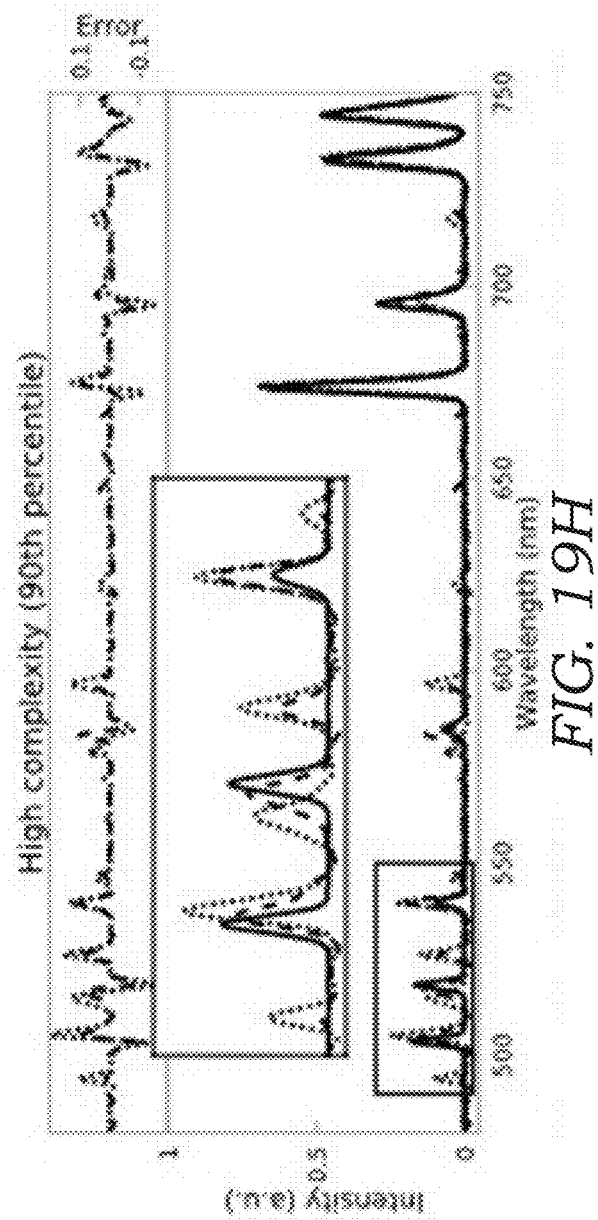
Figure 20E:
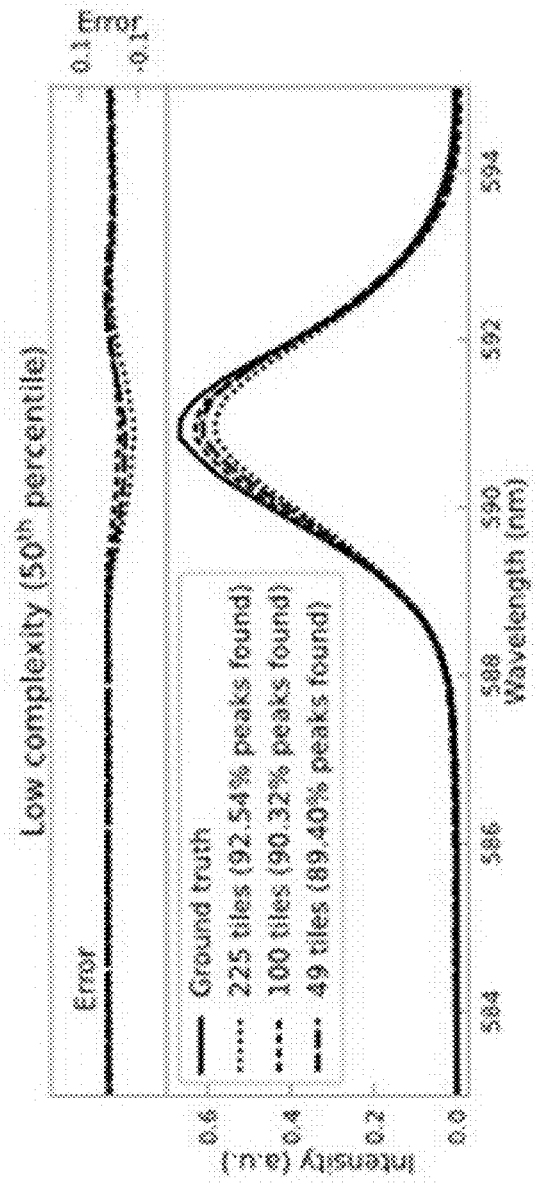
Figure 20F:
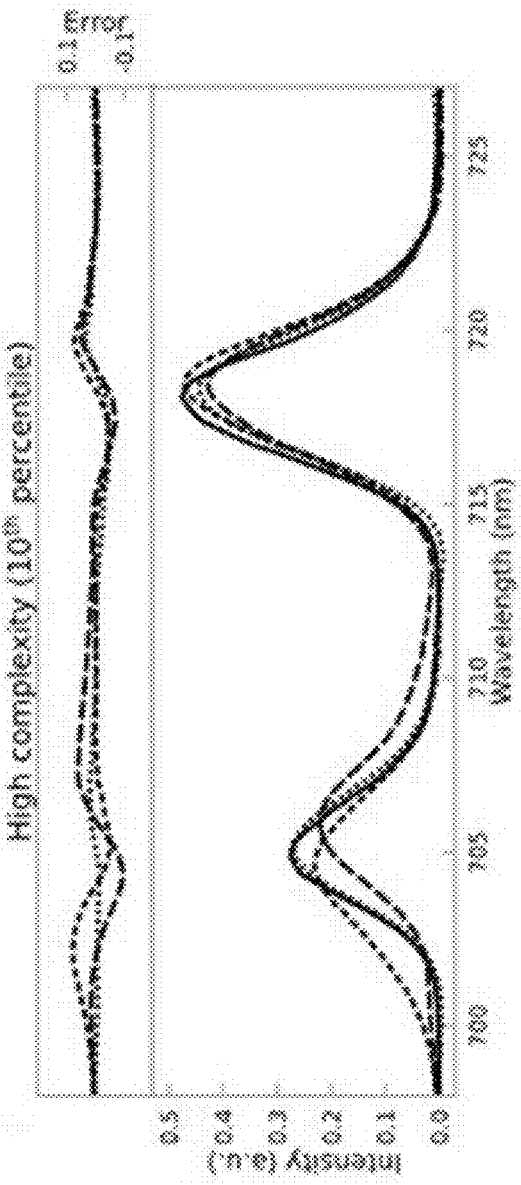
Figure 20G:
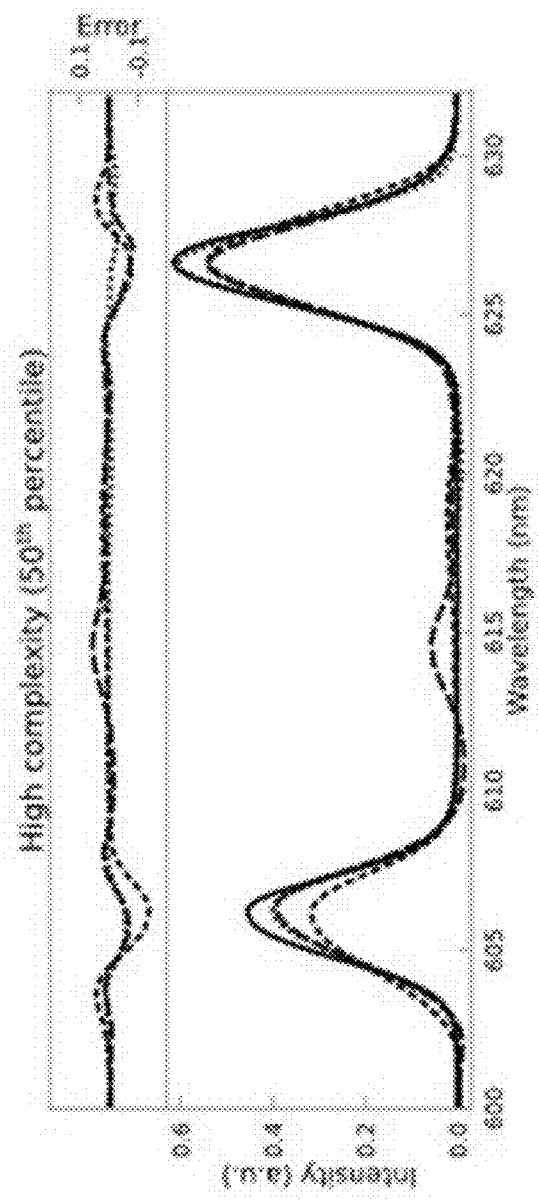
Figure 20H:
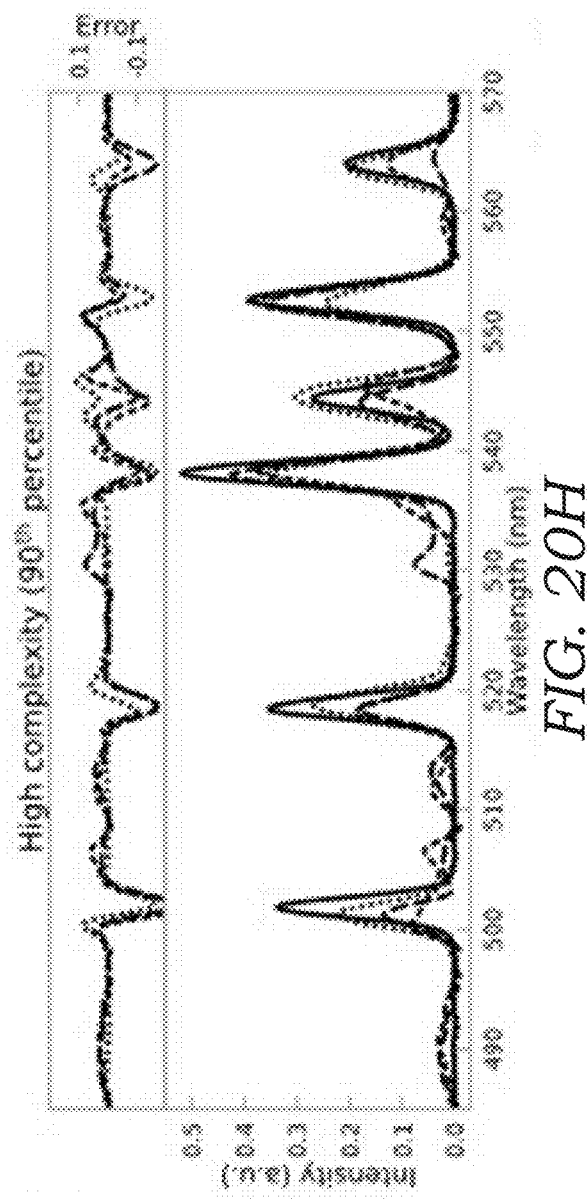
Figure 21E:
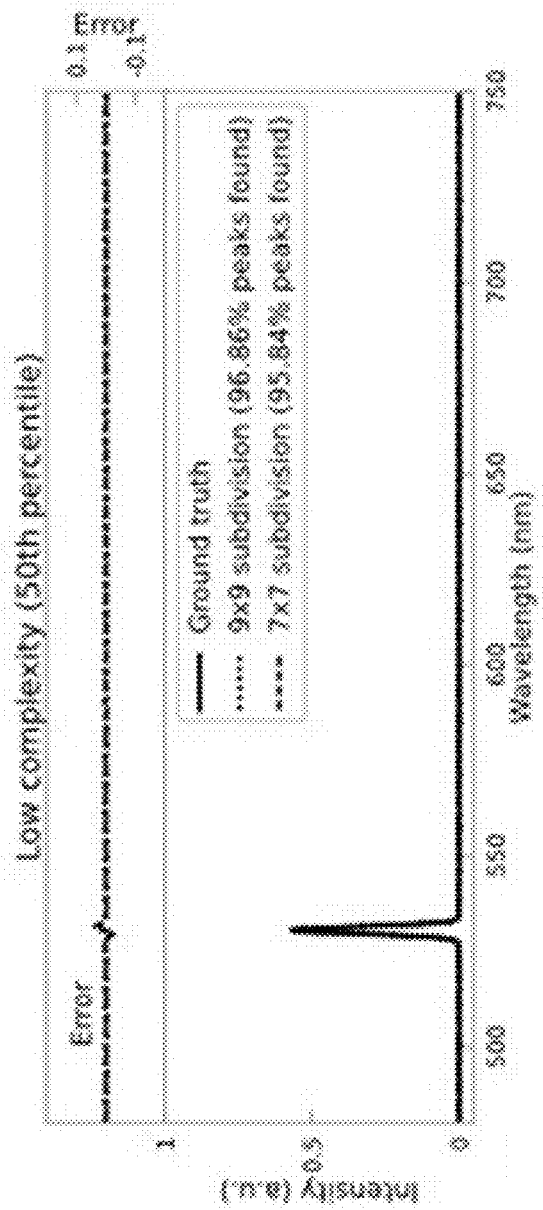
Figure 21F:
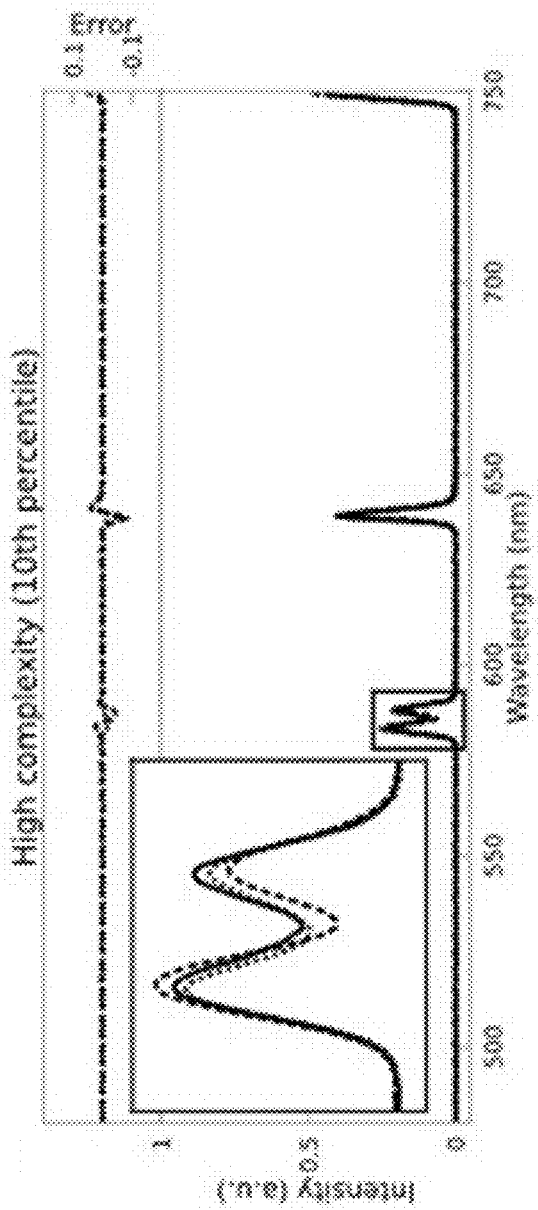
Figure 21G:
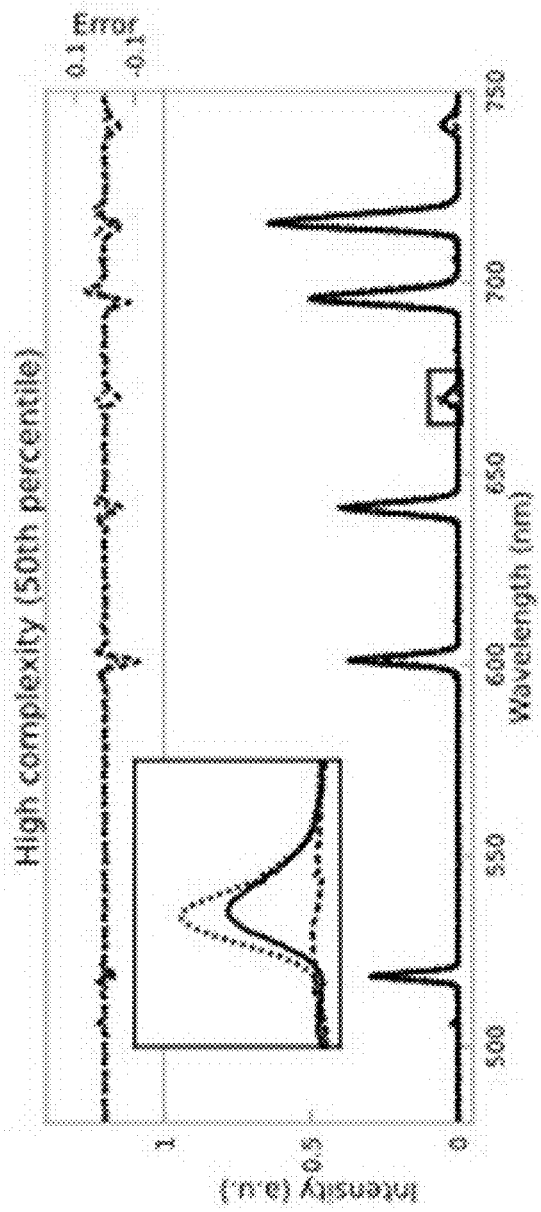
Figure 21H:
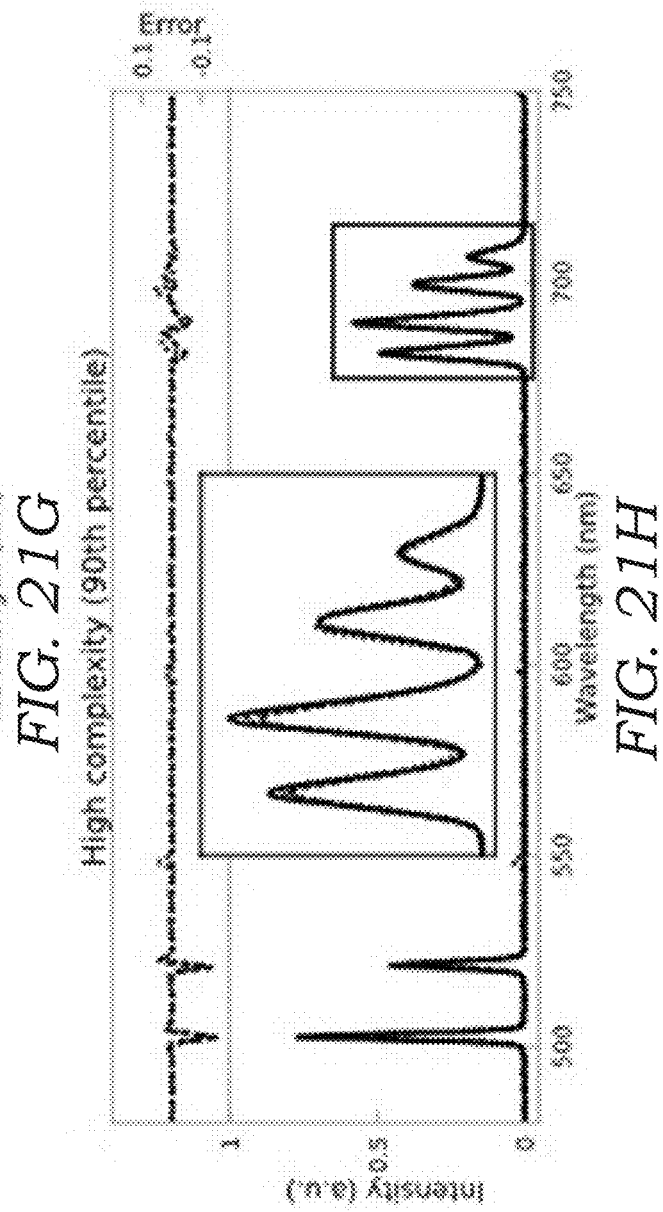

The deep learning-based spectral analysis device 10 (FIGS. 1A, 4A, 4B) uses a spectral encoder chip 14 that includes a 14×18 (252 total) distinct plasmonic tiles 20 (where each tile 20 covers a region of 100×100 µm), defined by a specific array of plasmonic features 22 (i.e., a nanohole array structure) (FIG. 5D). Importantly, the encoder chip 14 is fabricated through a scalable imprint lithography process that can replicate plasmonic features 22 (e.g., nanostructures) indefinitely from a silicon 'master' chip. As a result, the encoding chip 14 is low-cost and with the exception of a metal deposition step, can be fabricated without the need for clean room instrumentation or processes. Each plasmonic tile 20 (i) serves as a spectral broadband filter described by a transmission function, $T_i(\lambda)$, where the local maxima and their corresponding bandwidths result from the plasmonic modes supported by the dielectric and metal plasmonic features 22 (see FIGS. 4C and 5E).

Illumination spectra are introduced to the spectral analysis device 10 through the output aperture 34 of a single mode fiber 36 located ~10 cm above the spectral encoder chip 14. The output aperture 34 is used to control the amount of coherence/spatial coherence. A smaller diameter for the output aperture 34 increases the spatial coherence but may reduce signal captured by the image sensor 24. In some embodiments, the output aperture 34 may be omitted or incorporated into the end of the fiber 36. A bare CMOS image sensor 24 is positioned ~3 mm below the encoder chip 14 to capture images of the light transmitted through the plasmonic tiles 20. Other distances ($z_2$) between the image sensor 24 and encoder chip 14 may also be used. Generally, the distance $z_2$ is <<than the distance between the input aperture 34 and the encoder chip 14 ($z_1$), which in FIG. 4A is 100 mm. For each illumination spectrum under test, the lensfree diffraction images of the input radiation were captured at multiple exposures to create a high dynamic range (HDR) image 26 to limit pixel saturation effects. Each of the 252 tiles 20 is automatically segmented in the HDR image 26 and further subdivided into a 9×9 grid (81 in total) of sub-arrays 21. The number of tiles 20 (252 in total) and their arrangement were selected to cover much of the active area of the CMOS image sensor 24 used for image capture. The average pixel intensities of all 252×9×9=20,412, sub-arrays 21 serve as the input to the trained neural network 108 (also referred to as the spectral reconstruction network), which rapidly reconstructs the unknown illumination spectrum of the incident radiation 12 (FIG. 4E). The spectral reconstruction network 108 comprises three fully-connected layers of 2,048 neurons each, and an output layer with 1,185 nodes, representing the spectral intensity over an operational range of 480-750 nm and matching the resolution of the commercial spectrometer used to obtain ground truth data. The network 108 was trained using a mean squared error (MSE) loss function between the reconstructed spectra and ground truth spectra. To train the network 108, 50,352 random spectra were generated by the laser, with an additional 8,824 spectra used for validation data (captured over ~3.75 days) (see Materials and Methods). During training, the trained neural network parameters are updated and learned in a calibration or training process based on deep learning using a plurality of training spectra that are known and/or measured using another spectrum analyzer method that constitutes the ground truth for the calibration or training process.

Blindly Tested Spectral Reconstructions

For blind testing, another 14,648 newly generated spectra were captured after the training and validation spectra and evaluated by the spectral reconstruction network 108. FIGS. 6A-6J illustrates the success of the trained reconstruction network 108 to accurately recover unknown spectra using lensfree diffracted images 26 that are acquired by the spectral analysis device 10 (FIG. 1A). The average MSE, peak localization error, peak intensity error, and bandwidth estimation error on the blindly tested spectra were 7.77e-5, 0.19 nm, 7.60%, and 0.18 nm, respectively. Overall, the experimental results reveal that 96.86% of the peaks in the ground truth spectra were correctly reconstructed by the trained neural network 108. A peak was defined as "correctly reconstructed" if the reconstruction network 108 generated a peak within ±5 nm of a true peak. Setting a stricter threshold would result in improved peak localization and bandwidth estimation at the expense of a lower percentage of peaks correctly identified. FIGS. 6E-6J further show reconstructed spectra and ground truth spectra for both lower complexity (one peak) and higher complexity (4-8 peaks) spectra for various performance percentiles. These percentiles refer to the MSE loss of the network output reconstruction, where $10^{th}$ percentile implies a relatively good fit (best 10% loss), $50^{th}$ percentile implies the median fit, and $90^{th}$ percentile implies a poor fit (worst 10%). Even for higher complexity spectra, the $90^{th}$ percentile network output results are rather accurate, closely matching the ground truth spectra acquired with a benchtop spectrometer. Additional examples of blind spectral reconstructions obtained at the network output are shown in FIGS. 10A-10C, 11A-11C, 12A-12C, 13A-13C, 14A-14C, 15A-15C, 16A-16C, 17A-17C to demonstrate the repeatability and success of this blind spectral inference process. The peak localization and bandwidth estimation error were also evaluated on blindly tested unseen spectra, each with a 3 nm-bandwidth peak, ranging from 480-750 nm with a step size of 1 nm. For these 271 new spectra, all the peak localization errors were within ±0.32 nm, and all the bandwidth estimation errors were within ±0.178 nm, significantly surpassing the performance of earlier on-chip spectroscopy results.

Spectral Inference Stability as a Function of Time

Because the training spectra were captured before the blind testing, one would expect some level of performance degradation in spectral inference due to e.g., temperature fluctuations, illumination source stability/coupling changes, or mechanical vibrations, especially as the time period between the capture of the training and testing data increases. The performance stability of the inference of the trained network 108 over the course of the blind testing data capture (~15 h of continuous operation) is evaluated in FIGS. 7A-7D. All performance metrics remained fairly stable, with no significant difference between their values at the start and end of the 15 h. To further investigate the performance stability over time, an additional 21,296 unseen spectra were captured ~5.8 days after the last training/validation spectrum. Compared with the earlier blind inference results, the performance relatively degraded on these new spectra, as shown in FIGS. 8A-8H (dashed . . . . curves). The average MSE, peak localization error, peak intensity error, and bandwidth estimation error on these later-acquired, unknown spectra were 6.89e-4, 0.53 nm, 14.06%, and 0.29 nm, respectively, with 94.97% of spectral peaks correctly identified. As a means to re-calibrate the reconstruction network 108 and this relative performance degradation over time, a transfer learning approach was implemented, where the weights of the previously-trained neural network 108 were adjusted through further training on a small fraction of the spectra captured at the start of the new measurement period (i.e., ~5.8 days after the last training phase). The performance metrics and spectral reconstructions after this transfer learning step are shown alongside those of the original network in FIGS. 8A-8H. All performance metrics are significantly improved after the transfer learning step: average MSE, peak localization error, peak intensity error, and bandwidth estimation error improve to 3.68e-4, 0.42 nm, 10.83%, and 0.23 nm, respectively, with 96.37% of the peaks correctly identified. FIGS. 8A-8H further illustrates that, in addition to these considerable improvements in spectral inference metrics, background spectral noise and erroneous peaks are also suppressed well, after the transfer learning step. It is important to emphasize that the amount of data and the computation time required for this transfer learning step are rather small; even using just 100 new spectra (requiring ~6 min to capture) and training the existing neural network 108 for 100 epochs (requiring <1 min on a desktop computer) shows marked improvements in the blind spectral reconstructions after 5.8 days (FIGS. 19A-19H). Therefore, transfer learning can be an effective software-based calibration tool for the data-driven computational on-chip spectral analysis device 108, as demonstrated herein.

Speed of Spectral Reconstructions

Figure 23:
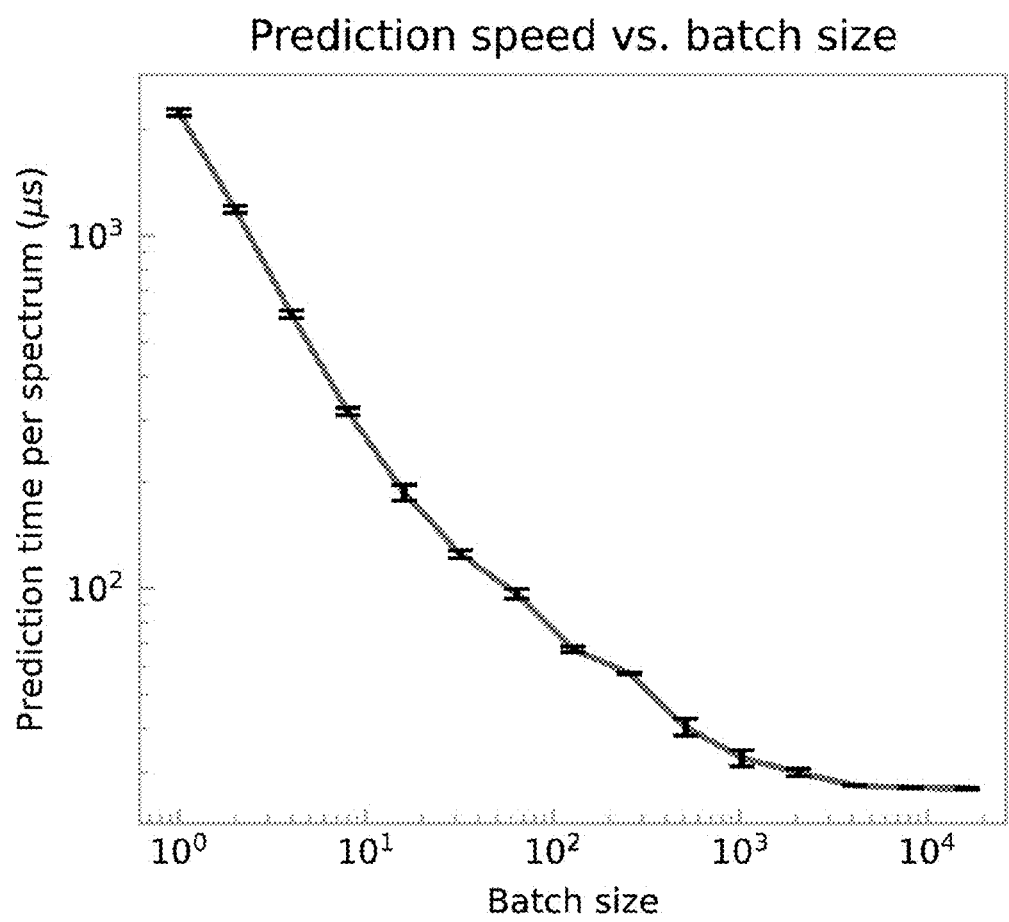
FIG. 23 illustrates a graph showing prediction speed vs. batch size for blind testing spectra. Inference time per spectrum considerably decreases with increasing batch size due to the highly parallelizable nature of the neural network computation. An average inference time of ~28 µs is obtained for a batch size of ≥4096. Error bars were generated from 7 repeated trials. All predictions were performed on a desktop computer.

Unlike optimization-based approaches to spectral reconstruction, the neural network-based inference does not require iterative computation to predict each unknown spectrum. Once the neural network 108 has been trained, it can perform reconstruction of unseen spectra rapidly and in parallel. The average prediction time per spectrum for different batch sizes are shown in FIG. 23. All calculations were performed on a desktop computer (see Methods). For a batch size of 4096 spectra, the trained neural network 108 is able to reconstruct an unknown spectrum in ~28 µs on average, providing orders of magnitude inference speed advantage compared to optimization-based iterative reconstruction methods. This parallel computation capability could be particularly beneficial for e.g., significantly increasing the speed of hyperspectral imaging systems, where a different spectrum needs to be reconstructed for each hyperspectral pixel.

Compared to other state of the art neural networks used for image processing and enhancement tasks, the spectral reconstruction network 108 employed herein is compact and shallow, comprising three hidden layers and no convolutional layers. This enabled rapid prediction on an unseen spectrum in ~43 µs, without requiring an iterative minimization in the blind inference phase. To further increase the speed of prediction, subsampling each tile into a 7×7 subgrid instead of 9×9 was evaluated (FIGS. 21A-21H). While the coarser subsampling (7×7) causes a modest degradation in prediction performance, the network inference time further decreased to ~18 µs per spectrum. It is also important to note that the spectral reconstruction network 108 yielded the best performance when trained with a dropout probability of 3%, much lower than the typical values (10-50%) used in many common neural networks employed in other applications. Because the neural network does not use convolutional layers and is relatively shallow and wide, even a small dropout probability gave us a strong regularization effect.

Network Generalization to Spectral Distributions not Included in Training

In addition to investigating the spectral reconstruction network's ability to generalize over time, the trained neural network 108 was tested for its ability to generalize to unseen spectral distributions that were not included in the training phase. While the network was trained on random spectral distributions containing 1-8 peaks, more complex spectra were synthesized that had a greater number of peaks (9+), not represented within the training phase. The trained neural network 108 was tested on these synthesized spectra without any retraining or transfer learning, and some examples of the synthesized spectra and the corresponding spectral reconstructions are shown in FIG. 4E and FIGS. 9A-9C. Despite using spectral distributions that were never represented during the training phase, the reconstructions still identify 90.54% of all peaks and do not suffer from any obvious artifacts or noise. These results demonstrate the spectral analysis device's ability to generalize to more complex spectral distributions that were not included in the training data. Furthermore, because the trained neural network 108 employs a data-driven approach, it could be tailored for other applications by altering the types of spectra used in the training dataset. The training process optimizes MSE between the predicted and the ground truth spectra, so the system should not show any preference between, e.g., superpositions of Gaussian peaks (as shown in this work) or broadband spectra with various absorption lines. Finally, the spectral analysis device 10 and trained neural network 108 can reconstruct new spectra that had larger bandwidths per peak compared to the training spectra as seen in FIGS. 18A-18D.

Benefits and Drawbacks of Using the Trained Neural Network

Another important aspect of the spectral analysis device 10 the use of a spectral encoder chip 14, fabricated through scalable imprint lithography. The fabrication of the encoding chip 14 does not require cleanroom-based lithography or other processes that require an advanced fabrication infrastructure, except the metal deposition step, which is relatively much simpler and cheaper. While this low-cost and rapid imprint lithography process can introduce point imperfections in the encoder chip 14, the data-driven spectral reconstruction network 108 demonstrates robustness to these defects. Due to the minimal cost and scalability of the imprint lithography, large area encoders for hyperspectral imaging could be fabricated, in which an ensemble of optimal filter functions could be grouped into a single hyperspectral pixel that is tiled across the encoder chip 14. Furthermore, the plasmonic coupling of each nanostructure encoder has angular dependencies, which manifest as angular dependent transmission functions. However, it is important to note that these angular dependencies are learned by the spectral reconstruction model during its training phase, and therefore do not result in any known performance drawbacks, unless the detection hardware is changed. As a result, the approach taken here does not necessitate collimation optics in the spectrometer design, while also being tolerant to fabrication defects.

While the presented encoder contains 252 spectrally overlapping broadband filters, further optimization in its design can be achieved: application-specific feature reduction approaches can be used to select, in a data-driven manner, a statistically optimal sub-set of tiles. In FIGS. 20A-20H, network performance is explored when using random subsets of the 252 tiles, demonstrating that blind spectral reconstructions using just 49 plasmonic tiles 20 are still quite competitive. This trade-off between reconstruction performance and the number of encoder elements would be critical for designing future computational spectrometers.

It is also important to note that, while some non-metallic nano-structures employed for computational spectroscopy can support higher light-throughput when compared to this spectral analysis device 10, they often involve more complicated fabrication methods in order to realize a diverse ensemble of encoding operations in the optical region. As discussed earlier, computational spectrometers have the potential to (at least partially) avoid some of the trade-offs between spectral resolution, cost, size, throughput, and SNR. Because the design of the spectral analysis device 10 does not divide the incident radiation 12 into its constituent frequencies (e.g., with a diffraction grating), there is not an explicit link between the spectral resolution and the signal strength. One could imagine repeating the same training process using the current device design, but with a higher-resolution spectral ground truth measurement. The current peak localization error of the system (0.19 nm) approximately matches the spectral resolution of the ground truth spectrometer (0.229 nm); it is conceivable that the retrained system against a higher-resolution spectral ground truth would show improved spectral resolution and peak localization error without sacrificing SNR. It is also worth noting that the current device 10 is already more compact than conventional spectrometer designs and uses very few optical components.

The on-chip spectral analysis device 10 demonstrated a dynamic range that closely matched the ground truth spectrometer at a fixed integration time. Although the lower-bound of the dynamic range is limited by the sensitivity of the opto-electronic sensor-array used in the computational spectrometer, the upper-bound can be increased by introducing a range of integration times during the training phase that are dynamically selected based on the input power, therefore avoiding saturation. In terms of the spectral measurement range, the system was not limited by the range of the ground truth spectrometer, but rather by the example spectra employed during the training phase. Nevertheless, by leveraging the full range of a tunable supercontinuum laser, a training set was created that enabled successful blind reconstructions over a bandwidth of 270 nm (480-750 nm). By using alternative illumination sources 30 during training to fill the spectral measurement range of the ground truth spectrometer, future generations of learning-based spectroscopy approaches could further expand their reconstruction spectral range. The device 10 and framework described herein can be utilized for designing and optimizing application-driven on-chip spectrometers.

Compared to traditional grating-based spectrometer designs, the spectral reconstruction framework of the spectral analysis device 10 described herein offers several appealing features. First, the compact nature of the on-chip spectral analysis device 10 could enable inexpensive, lightweight designs with large fields-of-view for, e.g., remote, airborne, or even disposable sensing needs in field settings. Because the encoder chip 14 can be manufactured at low cost over large areas with the imprinting process, an array of spectrometers or a hyperspectral imaging grid could be fabricated without the need for cleanroom-based lithography tools. Since the presented device 10 bins the neighboring pixels, spectrometers using large-pixel size sensors or, conversely, spectrometers with even a smaller footprint (via less pixel binning) could be designed as well. Second, the traditional trade-off between the spectral resolution and SNR that is common in grating-based spectrometers is now pushed to a different optimum point: the resolution of the spectral reconstruction network 108 is primarily limited by the spectral resolution of the instrument used for ground truth measurements of the training data, and the individual filters of the encoder chip 14 do not need to be narrowband to match the ground truth resolution.

The data-driven approach utilized by the on-chip spectral analysis device 10 also offers key advantages when compared to common spectral reconstruction algorithms based on e.g., least-squares minimization employed in other computational spectrometer systems. Although the training process requires a large number of measurements to be obtained, this is a one-time effort, and it yields a forward model that can blindly recover unknown spectra from raw sensing signals in ~28 μs, orders of magnitude shorter than the time required to solve iterative minimization problems, employed in earlier spectral reconstruction methods. Spectral reconstruction timing can be important for various applications such as hyperspectral imaging, that may demand a spectral recovery across a large sequence of images 26 each with a large number of individual pixels. Additionally, some of the iterative reconstruction algorithms used earlier employ a 'smoothness' constraint in their optimization process, based on the second derivative of the target spectra. Although this may improve some spectral reconstructions, the selection of a singular weighting parameter on this constraint introduces a trade-off in performance between narrow-band and broad-band spectral reconstructions. Lastly, instead of using training data, these iterative reconstruction methods rely on precise measurements of the encoding operation and the spectral response of the underlying photosensors, which are both used as a priori information. This presents a separate array of challenges, because the reconstruction performance relies on how precisely one can characterize the underlying hardware. All of these challenges are considerably mitigated or eliminated using the presented deep learning-based spectroscopy approach, which also lends itself to a highly compact, field-portable, sensitive and high-resolution spectrometer design that can be used in various targeted applications, in both sensing and imaging.

Materials and Methods

Plasmonic Encoder

The plasmonic encoder chip 14 measures 4.8×3.6 mm and consists of 252 (14×18) tiles 20, with each tile 20 covering 100×100 μm. Each tile 20 consists of an array of plasmonic features 22 in the form of a nanohole array with a particular combination of periodicity (square or hexagonal), period (280-650 nm), and aspect ratio (period divided by hole diameter, spanning 1.5-3.0) (FIGS. 5B-5C). As a result, the 252 plasmonic tiles 20 support distinctive plasmon resonances in the visible range of optical spectrum, manifesting as diverse filter functions for the incident light.

The embedded plasmonic features 22 in the encoder chip 14 are molded from a silicon 'master' chip that contains the desired nanohole array designs. The silicon master was fabricated using Electron-beam lithography (Raith EBPG5000 ES) with a ZEP520A resist (FIG. 5A and FIG. 22). The SEP520A resist is spun on a silicon wafer (operation i) and is exposed by Ebeam and developed (operations ii and iii). This is followed by Chlorine etching operation (operation iv) (ULVAC NE 500 with 5 sccm Ar, 20 sccm $Cl_2$) followed by stripping of the resist (operation v) to create an inverse mold (operation vi). The inverse mold is removed and is used to sandwich the curable polymer between the mold and a glass substrate as seen in operation (vii) of FIG. 22. The inverse mold is then peeled off (operation viii) and subject to metal deposition (operation ix) to create the encoder chip 14. Additional details regarding the imprint molding process described herein may be found in, for example, Ballard, Z. S. et al., Computational Sensing Using Low-Cost and Mobile Plasmonic Readers Designed by Machine Learning, ACS Nano 11, 2266-2274 (2017), which is incorporated by reference. The silicon master chip is pressed against a polymer that is cured to form the physical features or structures that become plasmonic after coating/deposition with the gold, silver, or other plasmonic material. The silicon master chip may be re-used over and over. The final encoder chip 14 includes a UV-curable polymer NoA-81 (Norland Products, Inc.) backed by a standard microscope slide, with 50 nm of gold and 5 nm Titanium adhesion layer deposited via Electron Beam Evaporation (CHA Solution). Each "nanohole" thus has a layer of gold on the bottom of each hole or well.

Experimental Procedures

Optical spectra were generated by a programmable supercontinuum laser (~3 nm bandwidth) with up to eight independent emission channels (Fianium). Random spectra were created by turning on a random number of channels between 1 and 8. For each channel, the center wavelength was set randomly between 480 and 750 nm, and the power was set randomly between 0.1 and 0.7 (a.u.). All experiments were performed with random spectra, with the exception of the spectra with broader bandwidths (FIGS. 18A-18D), which were manually created by overlapping the 8 channels to form a single, broader peak. The output from the laser (light source 30) was coupled to a 50/50 2×1 fiber splitter (OZ Optics), with one arm coupled to the input aperture of the device 10 and the other arm coupled to a conventional spectrometer (Ocean Optics HR+) to capture a ground truth spectrum. For each spectrum, images 26 were captured by the CMOS image sensor 24 (Basler) at ten different exposure times (each separated by one "stop" or doubling), and the resulting images 26 were combined into a single high dynamic range (HDR) image 26, which mitigated pixel over- or under-saturation. Each spectrum was captured by the ground truth spectrometer five times and the resulting spectra were averaged to minimize the effects of noise. Spectra that were either over- or under-saturated due to randomness of peak location and power were removed from the dataset.

Training and validation spectra were captured over the course of ~3.75 days. The training dataset consisted of 50,352 spectra, while the validation dataset consisted of 8,824 spectra. Data for blind testing was captured immediately afterward, consisting of 14,648 spectra. Additionally, another blind testing dataset was captured starting ~5.8 days after the last training/validation samples were captured.

Spectral Reconstruction Network

Each HDR image 26 was registered (via feature-based registration of corners) onto a grid corresponding to the known geometry of the encoder tiles 20. This step was performed to account for any gradual drift/rotation of the encoder chip 14 relative to the CMOS image sensor 24 active area. Sub-array intensities for each tile 20 were extracted by dividing the tiles into 9×9 grids and averaging over the pixels corresponding to each of the 81 sub-arrays 21. The 252×9×9=20,412 sub-array intensities were combined into a vector and each element was normalized by its mean and standard deviation over the training dataset. For example, the intensity of the sub-array in the i-th row and j-th column of the tile in the m-th row and n-th column of the encoder chip 14 was normalized by subtracting the mean intensity of that sub-array 21 over all the training data and dividing by the standard deviation. The normalized 1×20,412 intensity vector serves as the input to the spectral reconstruction network 108.

The spectral reconstruction network 108 comprises three fully-connected layers of 2,048 neurons each, and an output layer with 1,185 nodes (FIG. 3). ReLU (rectified linear unit) nonlinearities were used after each of the hidden layers. Batch normalization and dropout layers (with a dropout probability of 3%) were used after each fully-connected layer as methods of regularization to prevent overfitting to the training spectra. The network 108 was trained using the Adam optimizer with an initial learning rate of 1e-5. The learning rate was decayed by a factor of $\sqrt{10}$ when the network performance on the validation data reached a plateau. The loss function to be optimized was the MSE between the ground truth spectrum and the network output over all 1,185 output wavelengths. All the image preprocessing and training/testing of the neural network 108 were performed in Python, using OpenCV and TensorFlow libraries. All spectral reconstructions were performed on a desktop computer 100 with a Titan RTX graphics processing card (NVIDIA). Note that networks 108 with a higher degree of pixel binning (i.e., a sub-array 21 grid of less than 9×9) showed progressively worse performance. FIGS. 21A-21H compares the results of a 7×7 sub-array 21 grid (with the same architecture and hyperparameters) to the 9×9 network. While the coarser subsampling causes a degradation of prediction performance, smaller networks 108 offer an advantage in terms of training time and data size.

While embodiments of the present invention have been shown and described, various modifications may be made without departing from the scope of the present invention. For example, in some embodiments, the signal values that are input to the trained neural network 108 may include differential intensity values that are calculated between sub-arrays 21 or pixels of different tiles, wherein each differential signal reports the relative increase or decrease of the light intensity of a selected sub-region or group of pixels with respect to another sub-region or group of pixels of the encoder chip 14. In addition, in other embodiments, the incident radiation 12 may be composed of a spatial array of different spectra (e.g., sub-beams) that interact with different parts or regions of the encoder chip 14 and the trained neural network 108 outputs a reconstructed spectrum for each of the sub-beams of the incident radiation 12 array. The invention, therefore, should not be limited, except to the following claims, and their equivalents.

What is claimed is:

1. A spectral analysis device for reconstructing the spectrum of incident radiation using a trained neural network;
   an image sensor;
   an encoder chip interposed on an optical path between the incident radiation and the image sensor, the encoder chip having a plurality of tiles formed thereon from a plasmonic material, the plurality of tiles each having a plurality of plasmonic features formed therein in differing geometries and/or dimensions among different tiles, wherein the image sensor is disposed axially close to the encoder chip without any lenses or optical components therebetween; and a computing device operatively configured to receive image(s) of incident radiation transmitted through or reflected from the plurality of tiles and obtained by the image sensor, wherein the computing device executes a trained neural network to output a reconstructed spectrum of the incident radiation based on light intensities of the plurality of tiles captured in one or more images obtained by the image sensor that are input to the trained neural network.

2. The spectral analysis device of claim 1, wherein the computing device further comprises image processing software configured to segment the image(s) into sub-arrays for the plurality of tiles, and wherein the light intensity values of the sub-arrays are fed to the trained neural network.

3. The spectral analysis device of claim 2, wherein the image sensor captures a plurality of images of the incident radiation at different exposure times.

4. The spectral analysis device of claim 3, wherein the image processing software generates a high dynamic range (HDR) image based on the plurality of images prior to segmentation.

5. The spectral analysis device of claim 1, wherein the plasmonic material comprises at least one type of metal or alloy thereof.

6. The spectral analysis device of claim 1, wherein the plasmonic features comprise holes of various sizes and/or geometries formed in a polymer.

7. The spectral analysis device of claim 1, wherein the image sensor comprises a CCD or CMOS image sensor.

8. The spectral analysis device of claim 1, wherein the trained neural network parameters are updated and learned in a calibration or training process based on deep learning using a plurality of training spectra that are known and/or measured using another spectrum analyzer method that constitutes the ground truth for the calibration or training process.

9. The spectral analysis device of claim 1, wherein the incident radiation is composed of a spatial array of different spectra or sub-beams that interact with different parts of the encoder chip and the trained neural network outputs a reconstructed spectrum for each one of the sub-beams of the incident radiation array.

10. A method of reconstructing the spectrum of incident radiation using a trained neural network comprising:

providing an image sensor and an encoder chip interposed on an optical path between the incident radiation and the image sensor, the encoder chip having a plurality of tiles formed thereon from a plasmonic material, the plurality of tiles each having a plurality of plasmonic features formed therein in differing geometries and/or dimensions among different tiles, wherein the image sensor is disposed axially close to the encoder chip without any lenses or optical components therebetween;

capturing one or more images of radiation transmitted through or reflected from the plurality of tiles with the image sensor;

segmenting the one or more images with image processing software into sub-arrays for the plurality of tiles; and inputting light intensity values of the sub-arrays or pixels of the plurality of tiles to a trained neural network executed by at least one computing device that output(s) a reconstructed spectrum of the incident radiation.

11. The method of claim 10, wherein the image sensor captures a plurality of images of the radiation at different exposure times.

12. The method of claim 11, wherein the image processing software generates a high dynamic range (HDR) image based on the one or more images captured with the image sensor and prior to segmenting the one or more images.

13. The method of claim 10, wherein the computing device comprises at least one of a local or a remote computing device.

14. The method of claim 10, wherein the plasmonic material comprises a metal or alloy thereof.

15. The method of claim 10, wherein the image sensor comprises a CCD or CMOS image sensor.

16. The method of claim 10, wherein the trained neural network parameters are updated and learned in a calibration or training process based on deep learning using a plurality of training spectra that are known and/or measured using another spectrum analyzer method that constitutes the ground truth for the calibration or training process.

17. The method of claim 16, wherein the parameters of the trained neural network are updated by the backpropagation algorithm that minimizes a loss function between the ground truth spectra and the spectra predicted by the neural network.

18. The method of claim 10, wherein the light intensity values of the sub-arrays that are input to the trained neural network comprise binned/average light intensity values over multiple pixels of the sub-arrays or pixels of the plurality of tiles.

19. The method of claim 10, wherein the incident radiation is composed of a spatial array of different spectra or sub-beams that interact with different parts of the encoder chip and the trained neural network outputs a reconstructed spectrum for each one of the sub-beams of the incident radiation array.

20. The method of claim 10, wherein the light intensity values of the sub-arrays that are input to the trained neural network comprise differential intensity values calculated between sub-arrays or pixels of different tiles, wherein each differential signal reports the relative increase or decrease of the light intensity of a selected sub-region or group of pixels with respect to another sub-region or group of pixels of the encoder chip.

* * * * *